(12) United States Patent
Slutzky et al.

(10) Patent No.: US 7,242,346 B1
(45) Date of Patent: Jul. 10, 2007

(54) PULSE DESCRIPTOR WORD GENERATOR

(75) Inventors: Barry Slutzky, Williams, IN (US);
Paul Martis, Bloomington, IN (US);
Doug Morgan, Bloomington, IN (US)

(73) Assignee: United States of America represented by the Secretary of the Navy, Washington, DC (US)

(*) Notice: Subject to any disclaimer, the term of this patent is extended or adjusted under 35 U.S.C. 154(b) by 137 days.

(21) Appl. No.: 11/107,997

(22) Filed: Apr. 18, 2005

(51) Int. Cl.
*G01S 7/40* (2006.01)

(52) U.S. Cl. .................. 342/169; 342/13; 342/165

(58) Field of Classification Search ............... 342/169
See application file for complete search history.

(56) References Cited

U.S. PATENT DOCUMENTS

| | | | | |
|---|---|---|---|---|
| 4,145,691 | A * | 3/1979 | Freeling et al. ............... | 342/15 |
| 4,192,082 | A * | 3/1980 | Deaton et al. ................. | 434/2 |
| 4,217,580 | A * | 8/1980 | Lowenschuss ............... | 342/13 |
| 4,713,662 | A * | 12/1987 | Wiegand ...................... | 342/13 |
| 4,743,905 | A * | 5/1988 | Wiegand ...................... | 342/14 |
| 4,879,561 | A * | 11/1989 | Inkol ........................... | 342/195 |
| 4,885,587 | A * | 12/1989 | Wiegand et al. ............. | 342/14 |
| 4,891,646 | A * | 1/1990 | Wiegand ...................... | 342/15 |
| 4,928,104 | A * | 5/1990 | Schaffer ....................... | 342/15 |
| 5,032,839 | A * | 7/1991 | Even-Or ....................... | 342/15 |
| 5,134,412 | A * | 7/1992 | Baseghi et al. .............. | 342/169 |
| 5,341,146 | A * | 8/1994 | Vennum et al. .............. | 342/170 |
| 6,177,902 | B1 * | 1/2001 | Huntley et al. ............... | 342/20 |
| 6,876,321 | B1 * | 4/2005 | Slutzky et al. ............... | 342/13 |

FOREIGN PATENT DOCUMENTS

GB        2149624 A   *  6/1985

OTHER PUBLICATIONS

Varilog Research, Inc. "VariGen for SLQ-32: Electronic Warfare Environment Generator/ Simulator for the AN/SLQ-32 Electronic Warfare System". Jun. 3, 2004. Accessed online Oct. 27, 2006. http://web.archive.org/web/20040603114043/http://www.varilog.com/products.htm.*
Chandra et al. "A Radar Environment Simulator for Testing of ESM Systems". IEEE Proceedings of the Twentieth Southeastern Symposium on System Theory. Mar. 22, 1988. pp. 640-644.*

* cited by examiner

*Primary Examiner*—Thomas H. Tarcza
*Assistant Examiner*—Matthew M. Barker
(74) *Attorney, Agent, or Firm*—Michael P. Stanley

(57) ABSTRACT

A portable apparatus and a method for inserting digitized previously recorded or fabricated radio frequency (RF) pulse descriptor word (PDW) data files into an electronic surveillance (ES) system to realistically simulate a complex RF environment. The apparatus includes a personal computer and an electronics unit configured for easy integration into an ES system between the receiver and pulse processor. PDW data files are created on the personal computer and transmitted to the electronics unit as supplied PDW data. In the primary embodiment, real RF pulse data from the receiver is halted in the electronics unit and supplied PDW data and data from the receiver unrelated to PDW data, is passed in a continuous stream to the pulse processor. In a secondary embodiment, an upgrade in the electronics unit multiplexes both real RF pulse data and supplied PDW data for transmission to the pulse processor.

8 Claims, 92 Drawing Sheets

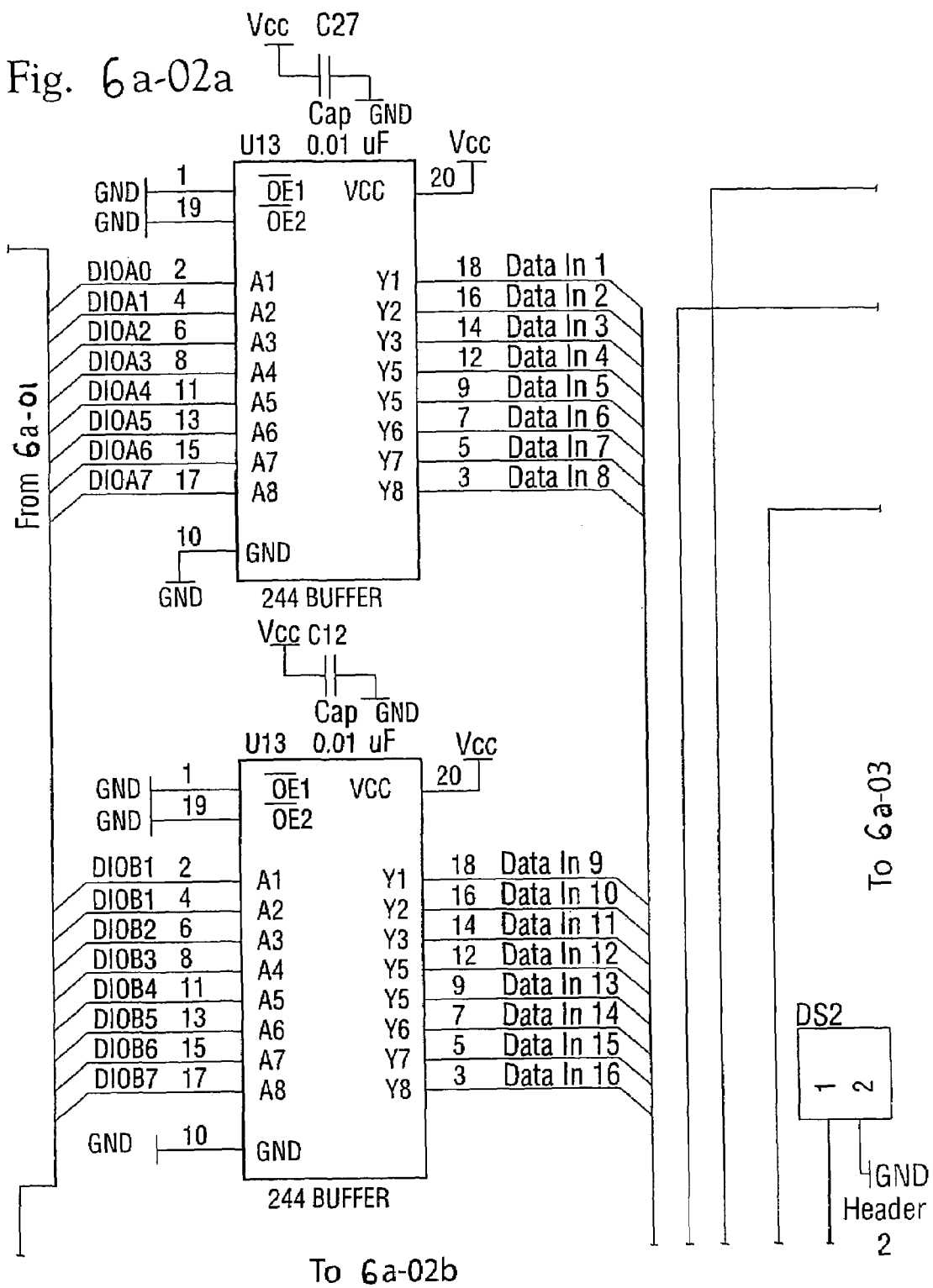

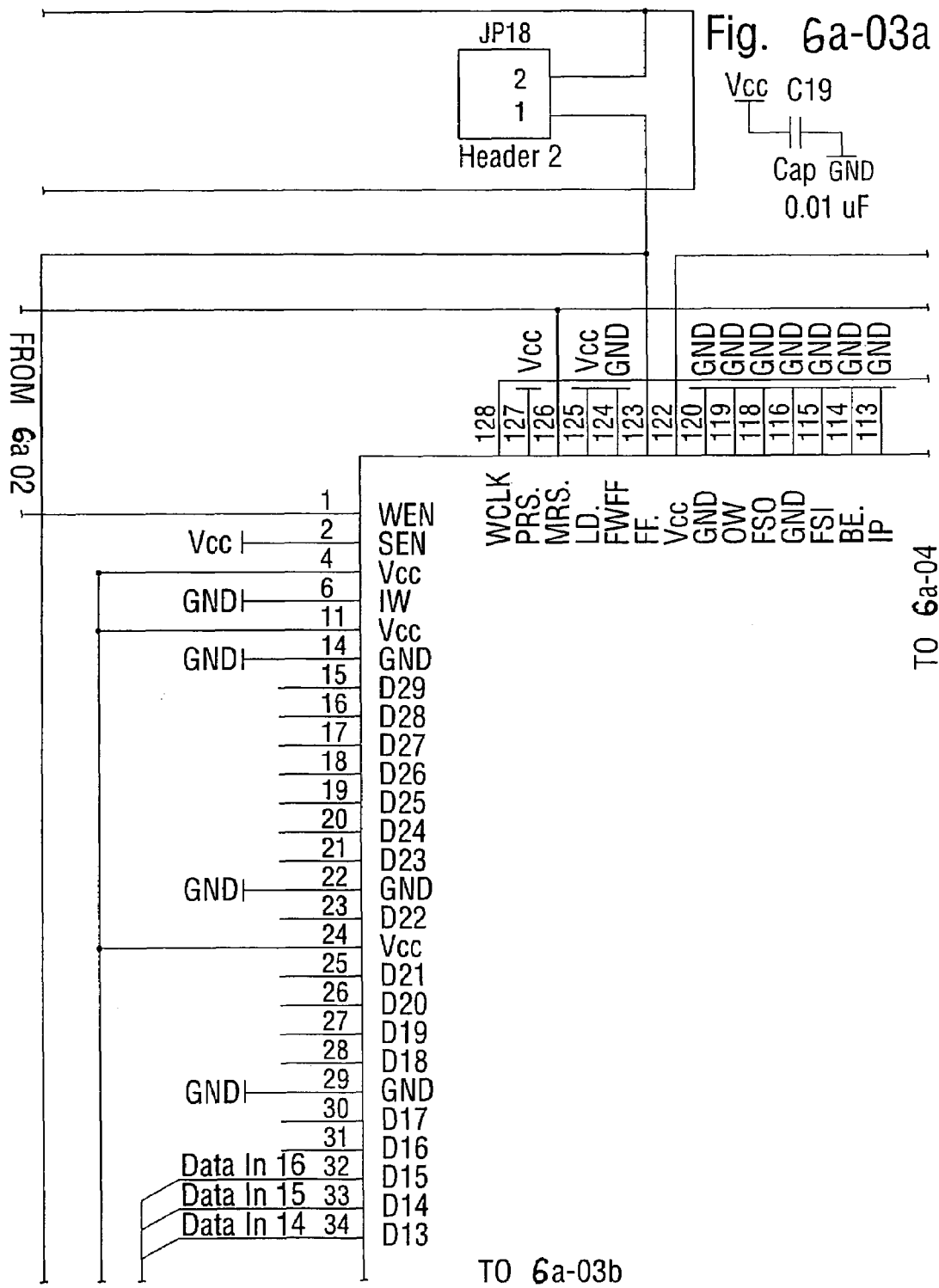

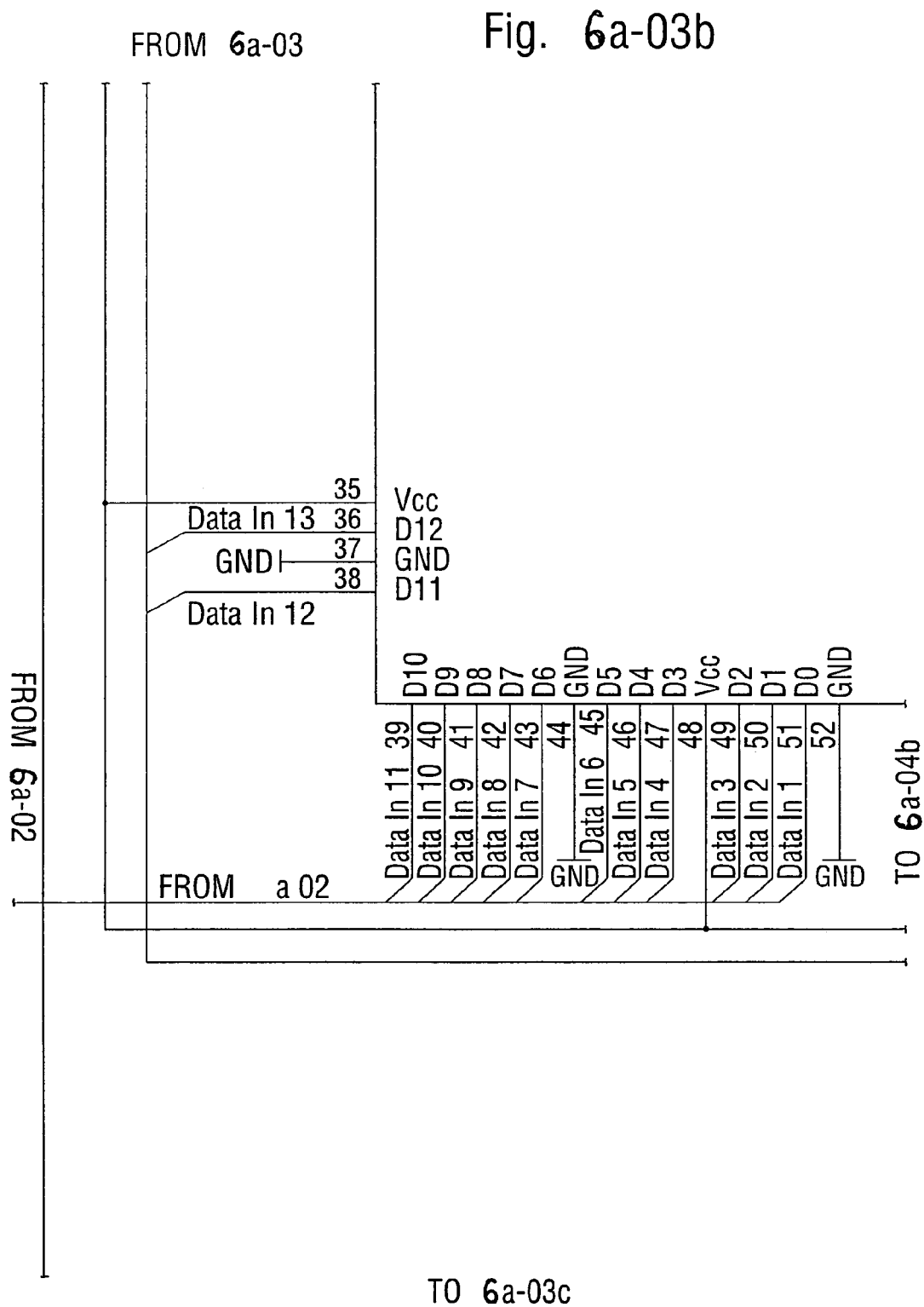

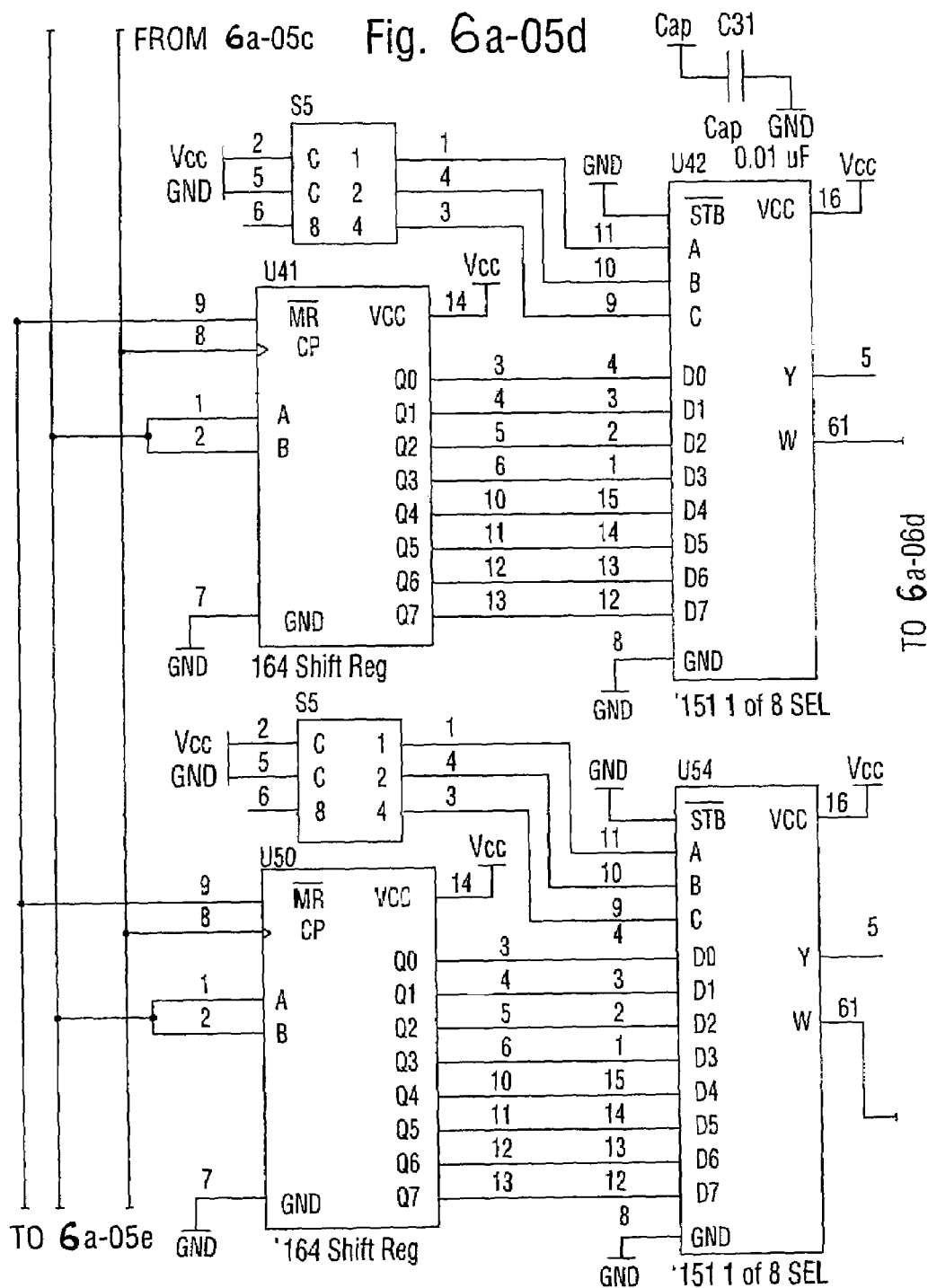

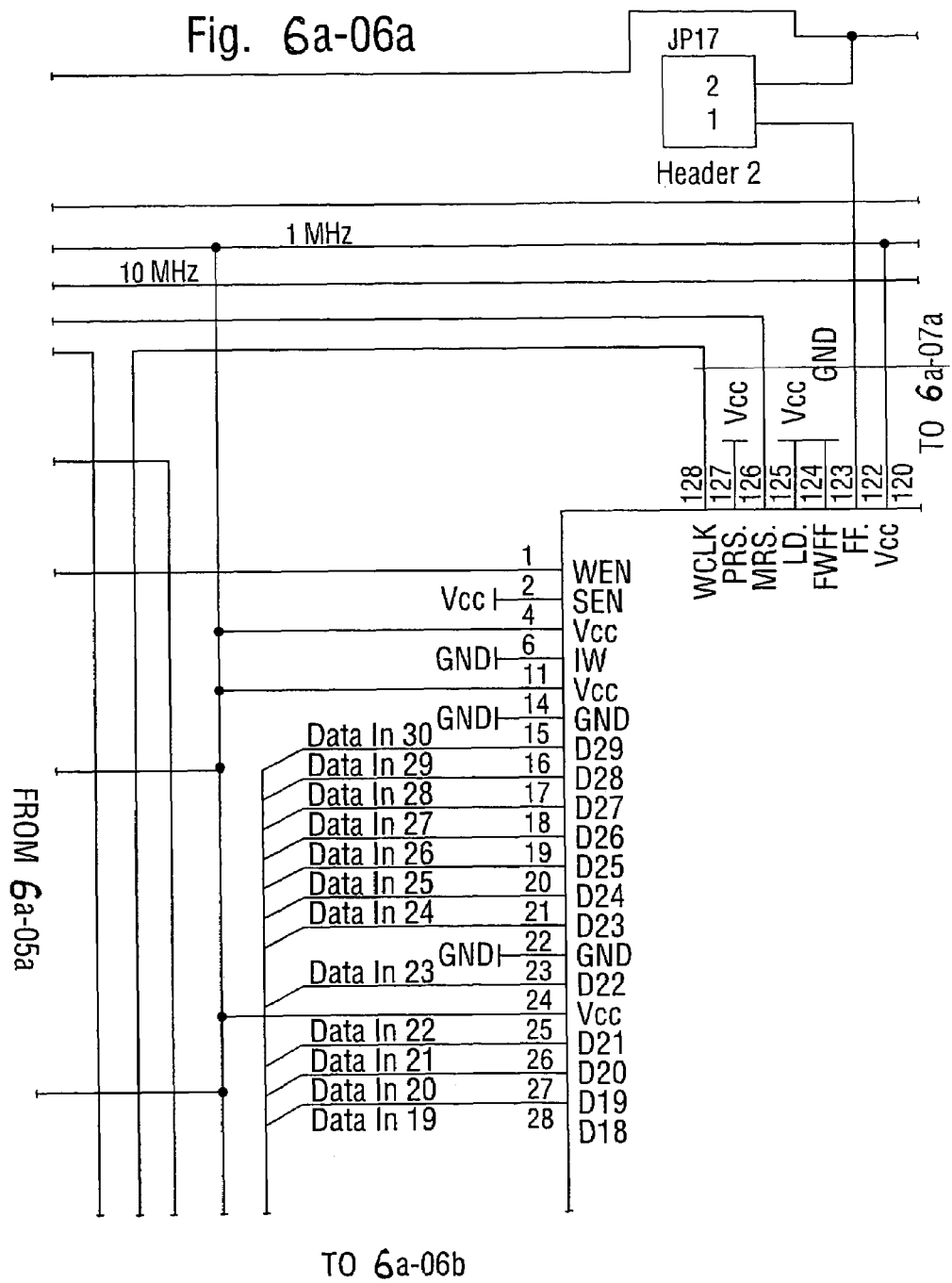

Fig. 6a-06d
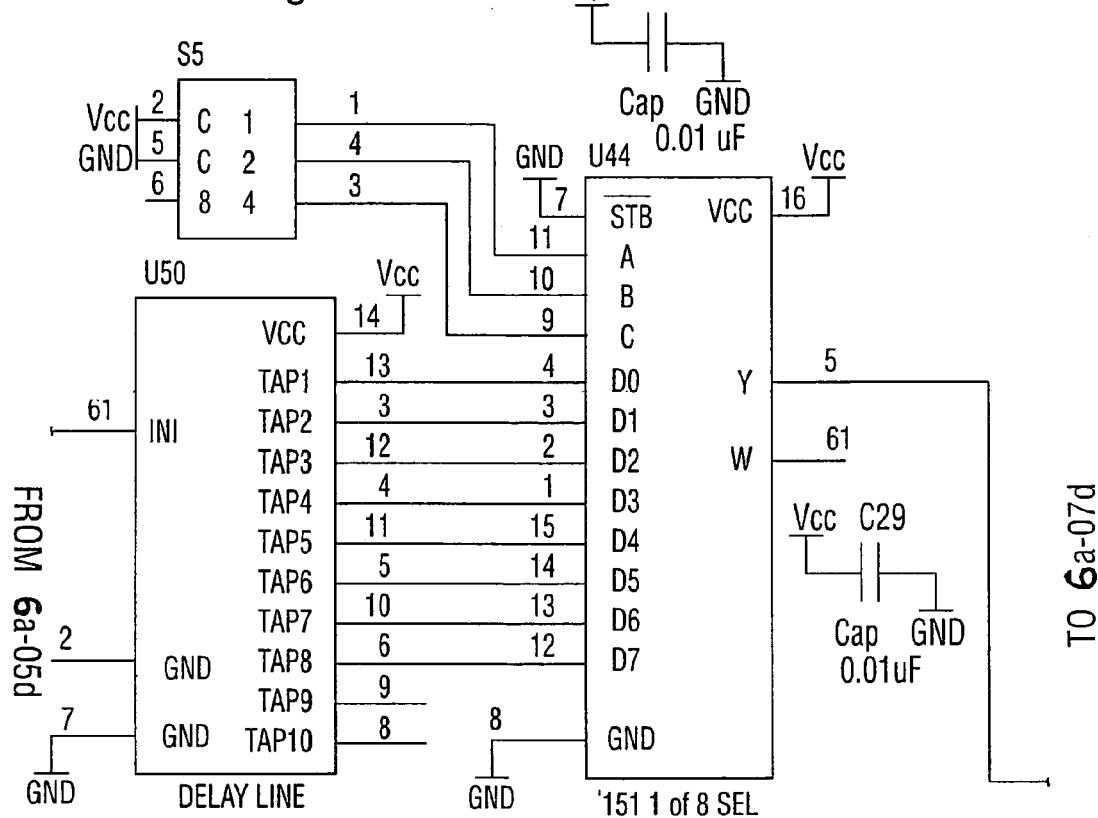
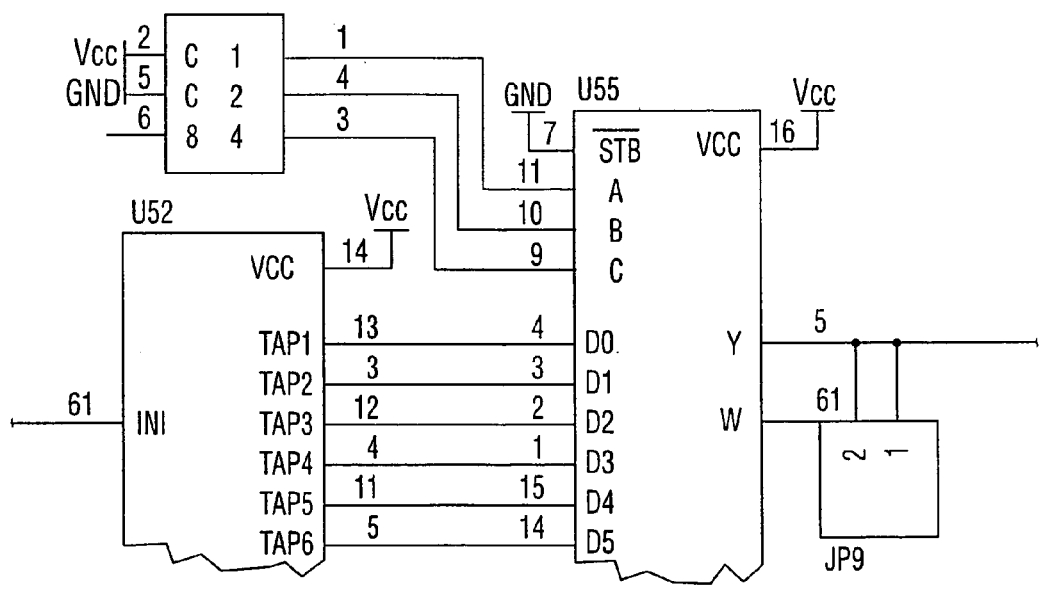

TO 6a-07b

Fig. 6a-08a
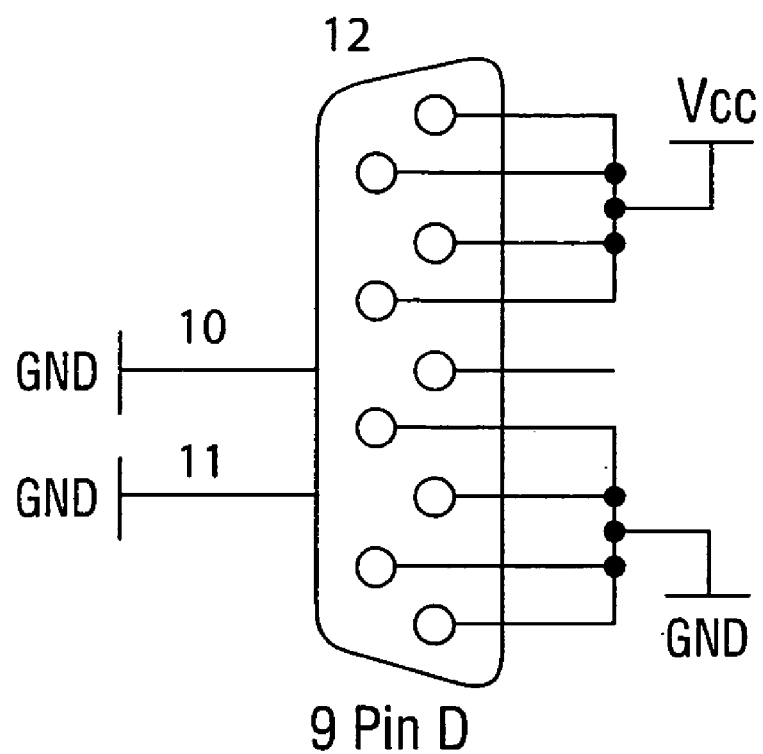
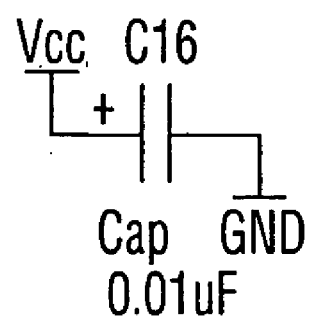

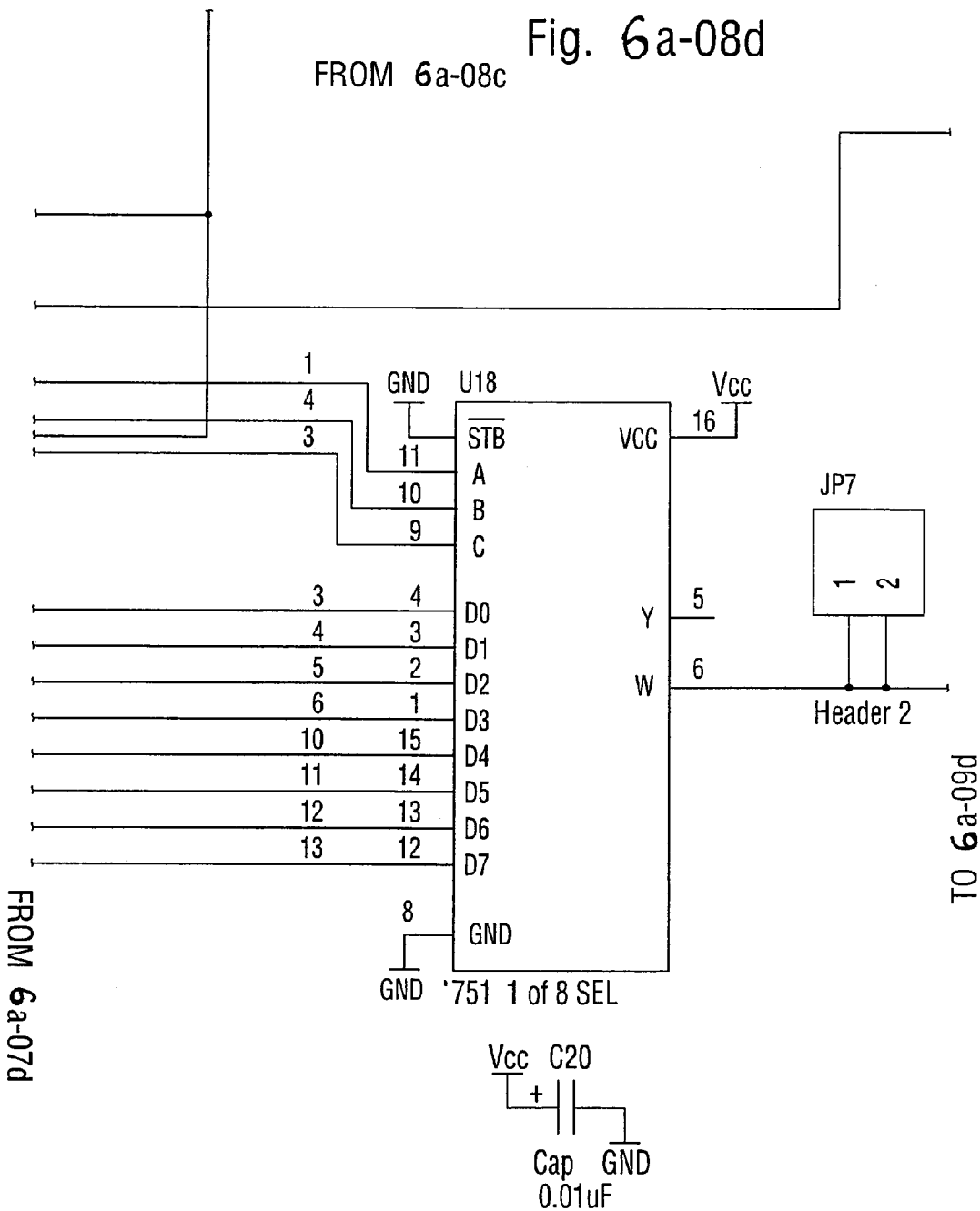

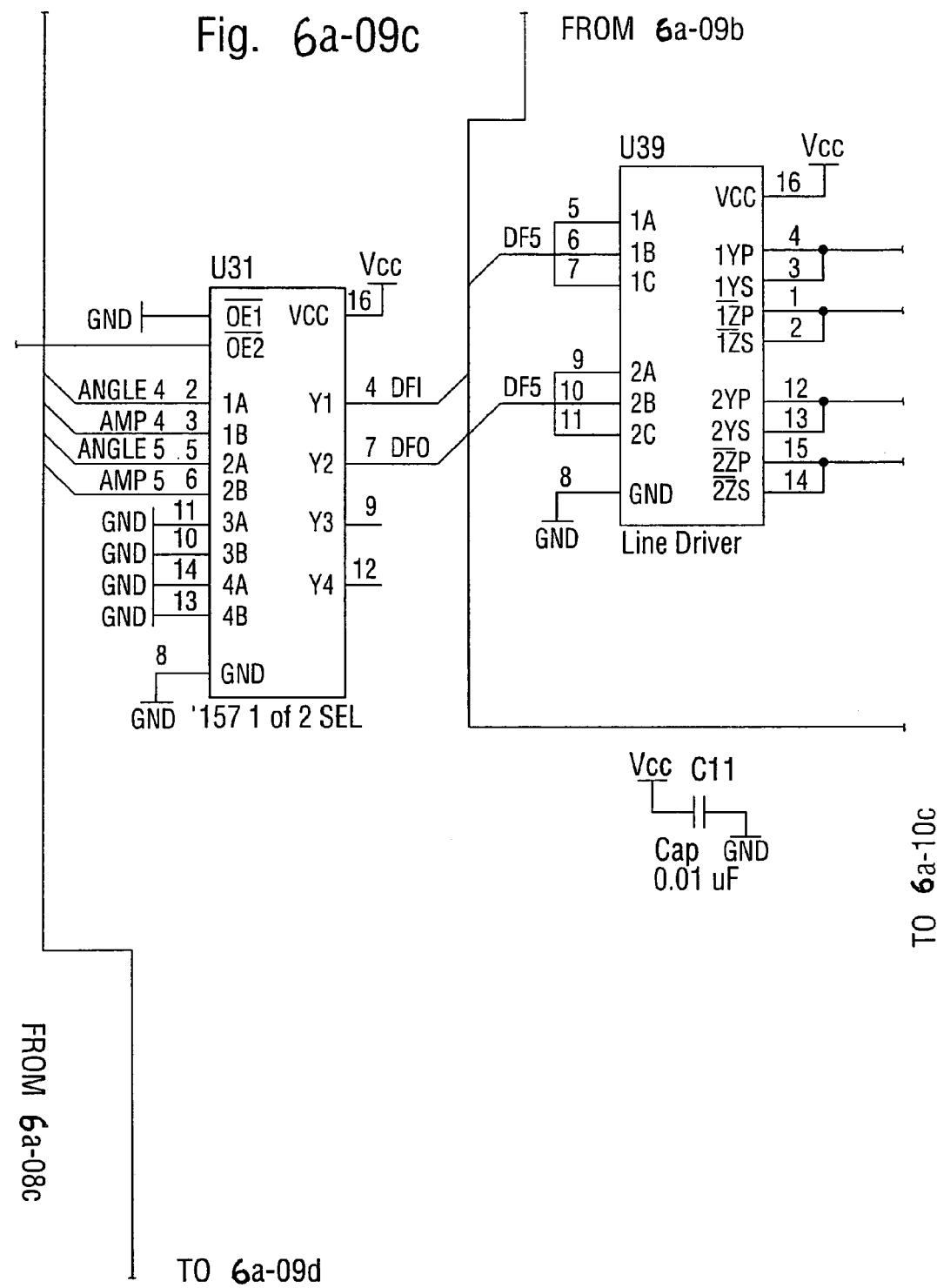

Fig. 6a-10c
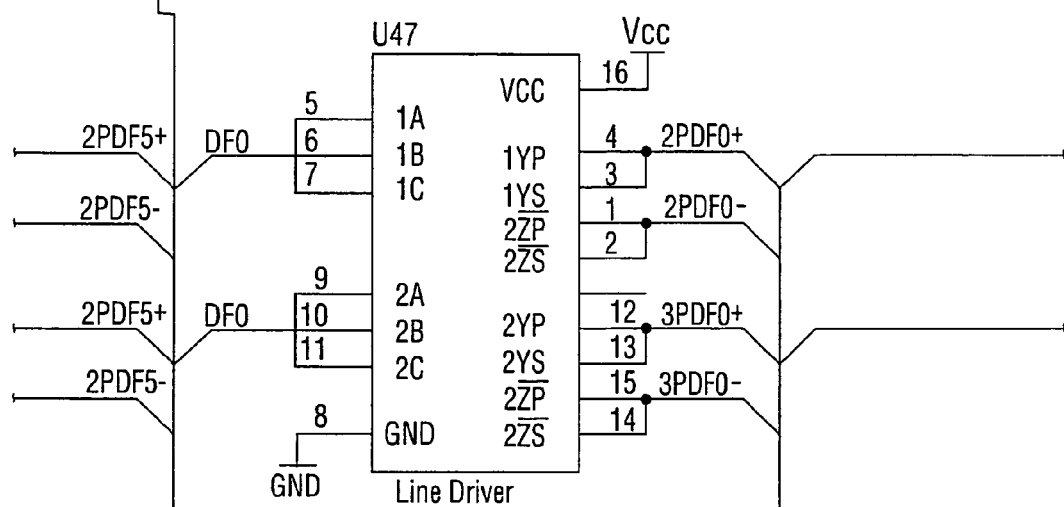
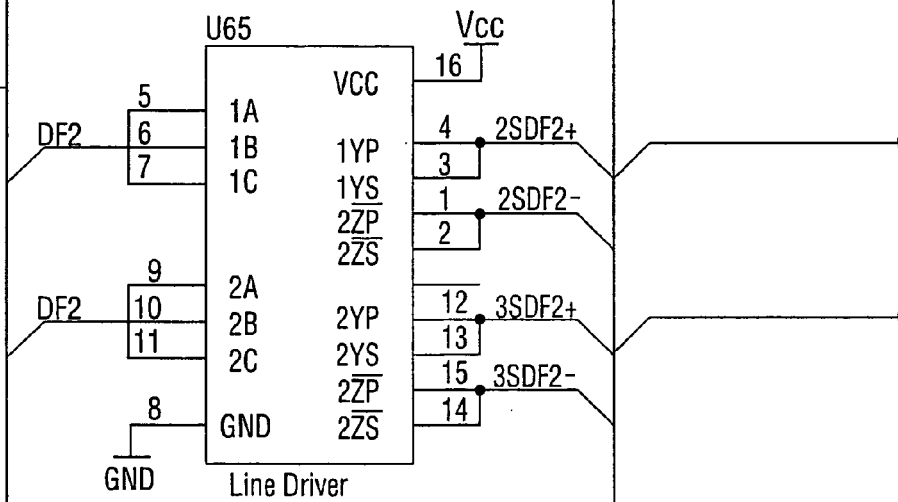

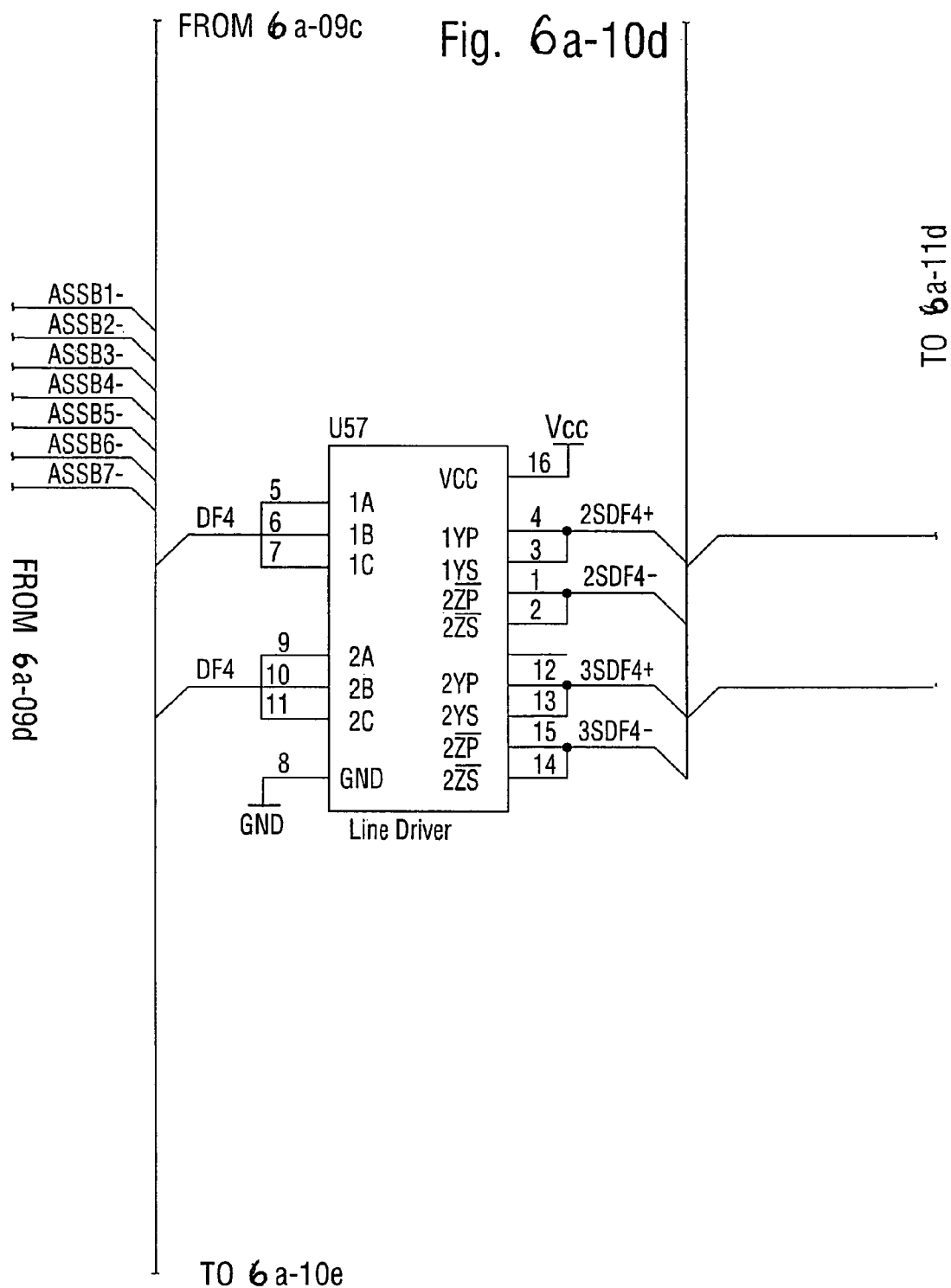

Fig. 6a-10e

FROM 6a-09d

2PAN+
2SAN+
3PAN+
3SAN+
2PAM+
2SAM+
3PAM+
3SAM+

FROM 6a-09e

2PAN+
2SAN+
3PAN+
3SAN+
2PAM+
2SAM+
3PAM+
3SAM+

Fig. 6a-11c
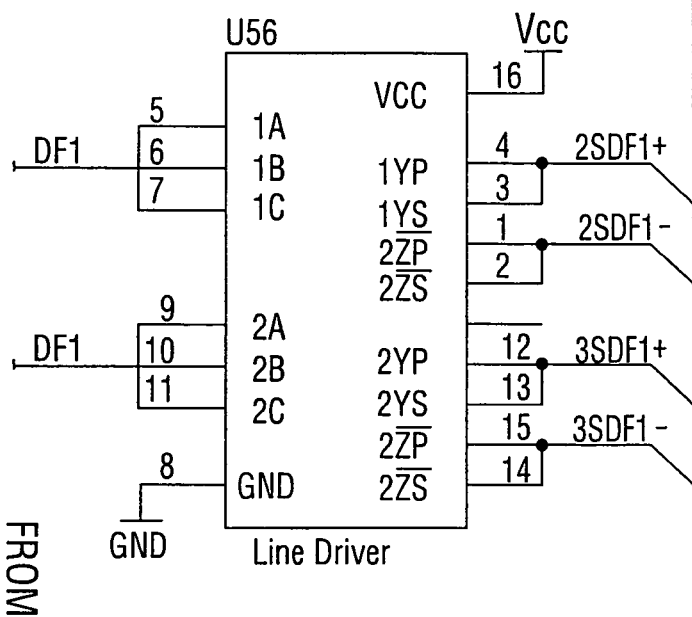
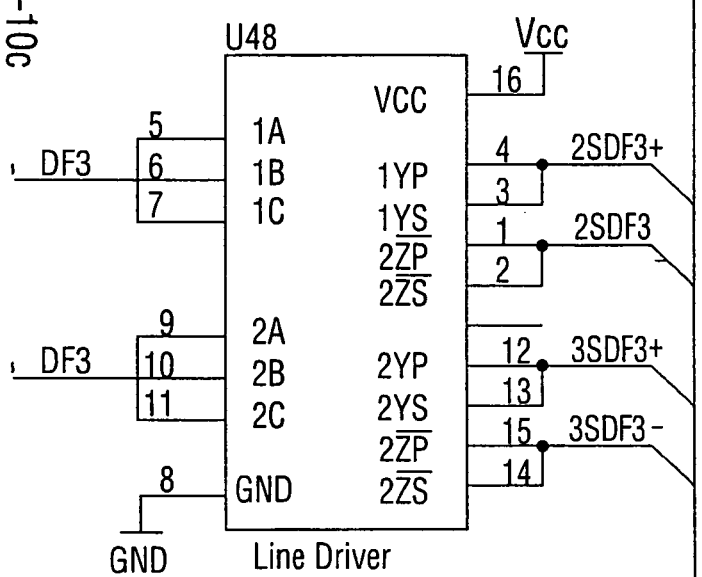

TO 7a-02a

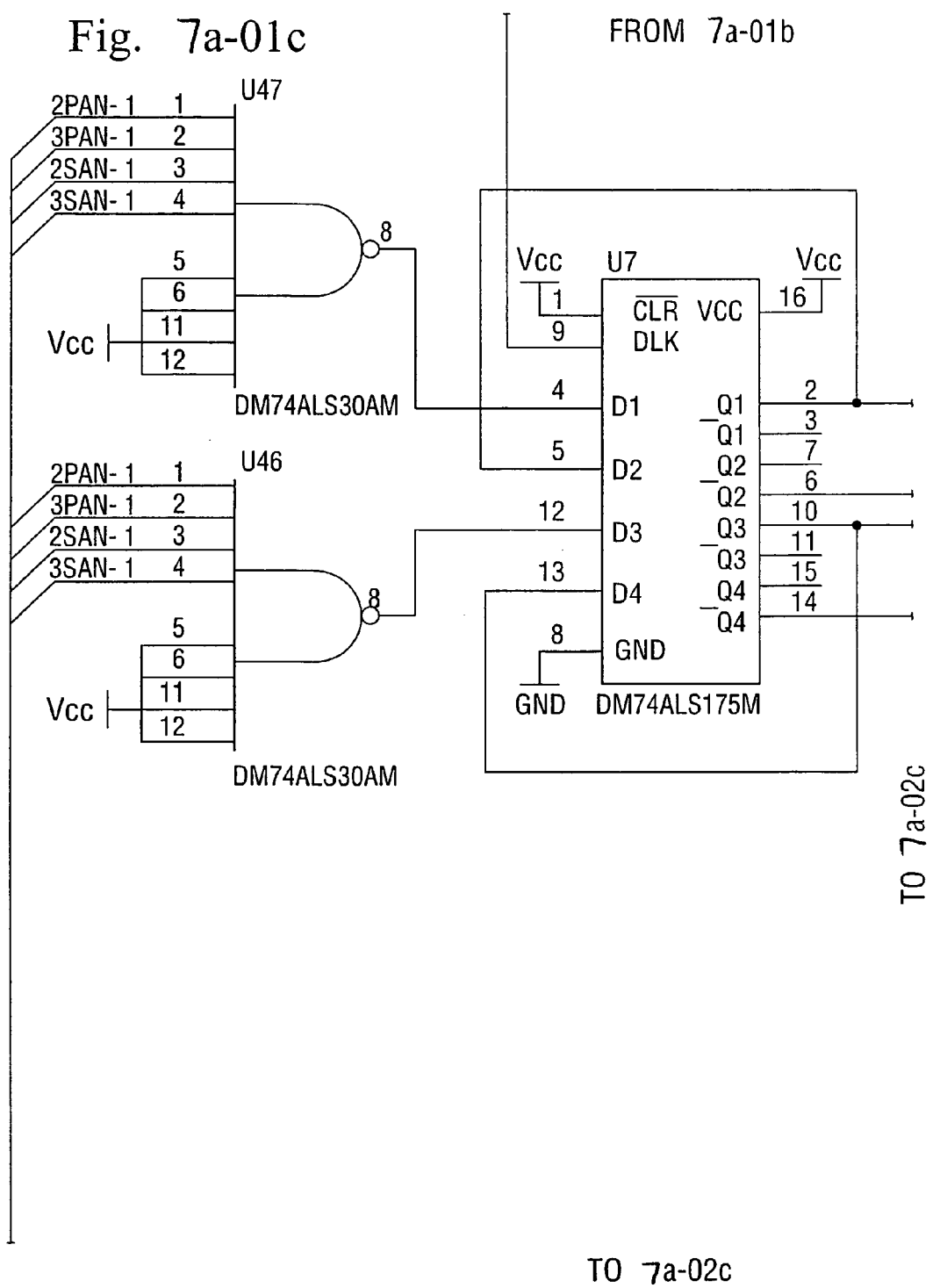

TO 7a-02b

Fig. 7a-02b    FROM 7a-02a
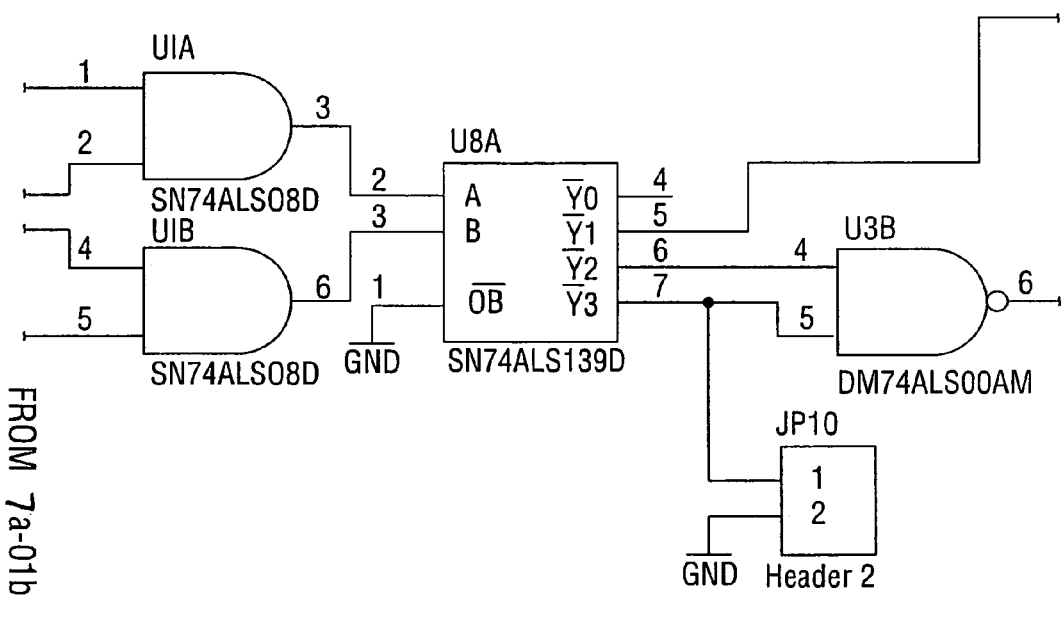
TO 7a-02c

Fig. 7a-02d

- 3PDF0+ R
- 3PDF0- R
- 3PDF1+ R
- 3PDF1- R
- 3PDF2+ R
- 3PDF2- R
- 3PDF3+ R
- 3PDF3- R
- 3PDF4+ R
- 3PDF4- R
- 3PDF5+ R
- 3PDF5 R
- 3PAM+ R
- 3PAM- R
- 3PAM+ R
- 3PAM- R

FROM 7a-01d

TO 7a-02e

Fig. 7a-03e
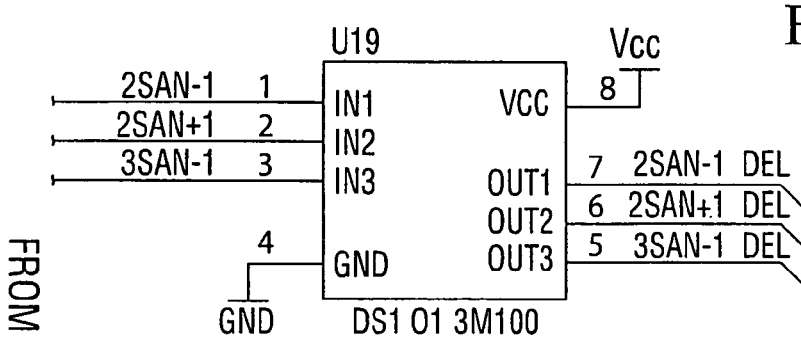
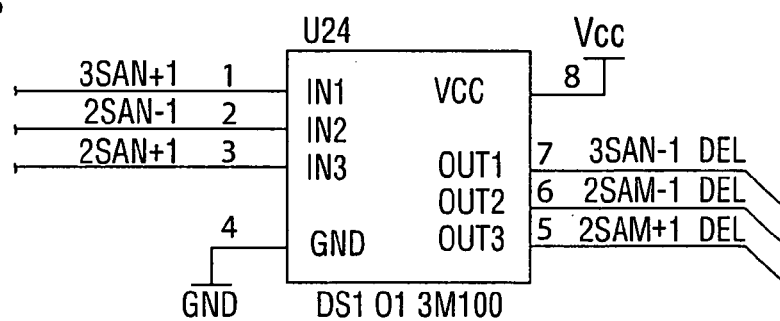
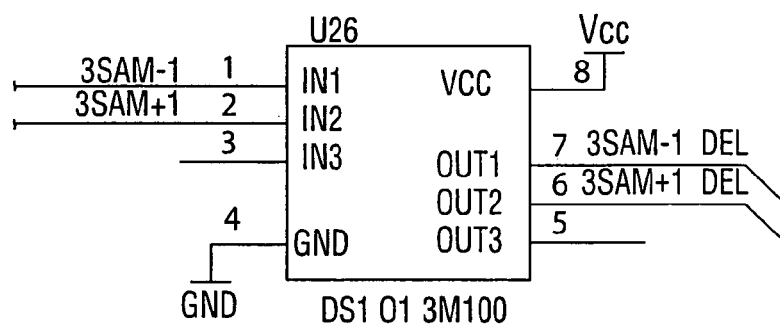
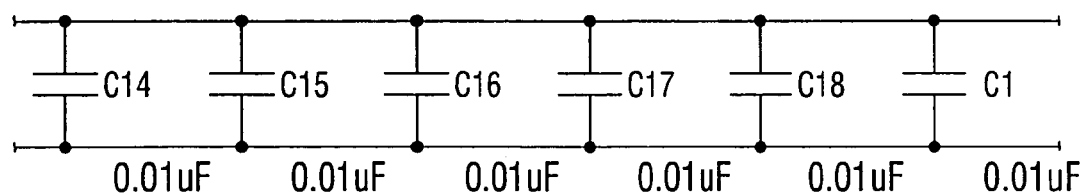

FROM 7a-04a    Fig. 7a-04b
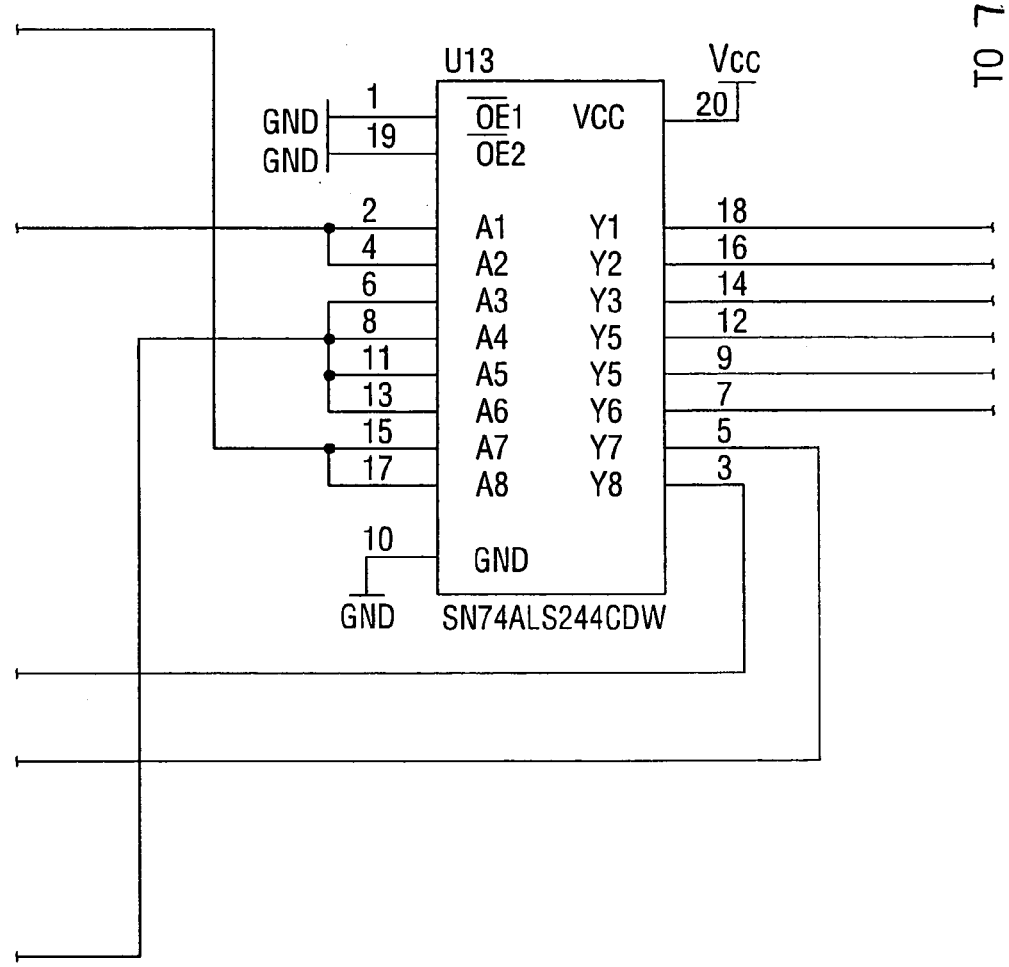
TO 7a-04c

Fig. 7a-04c   FROM 7a-04b
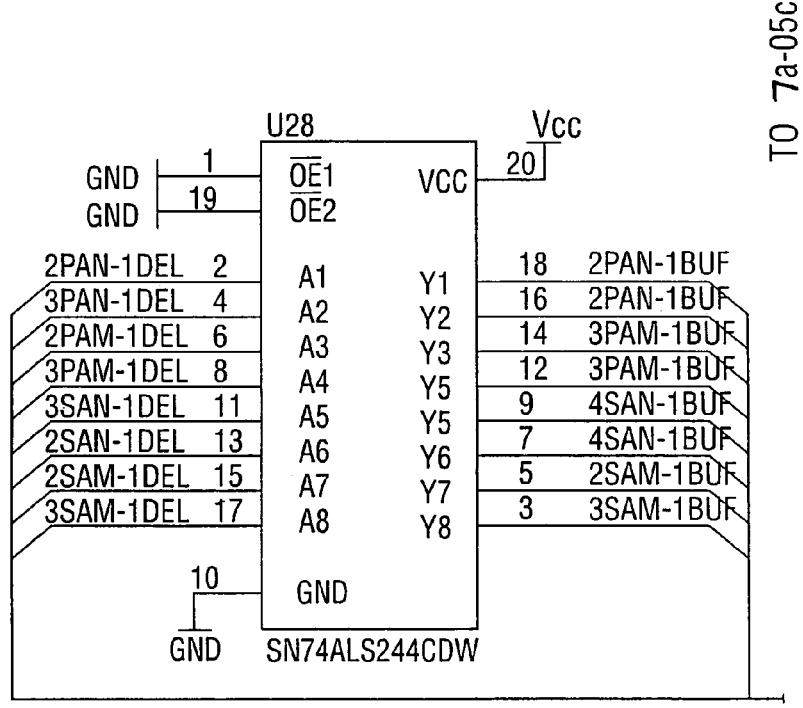
TO 7a-024d

Fig. 7a-04d    FROM 7a-04c
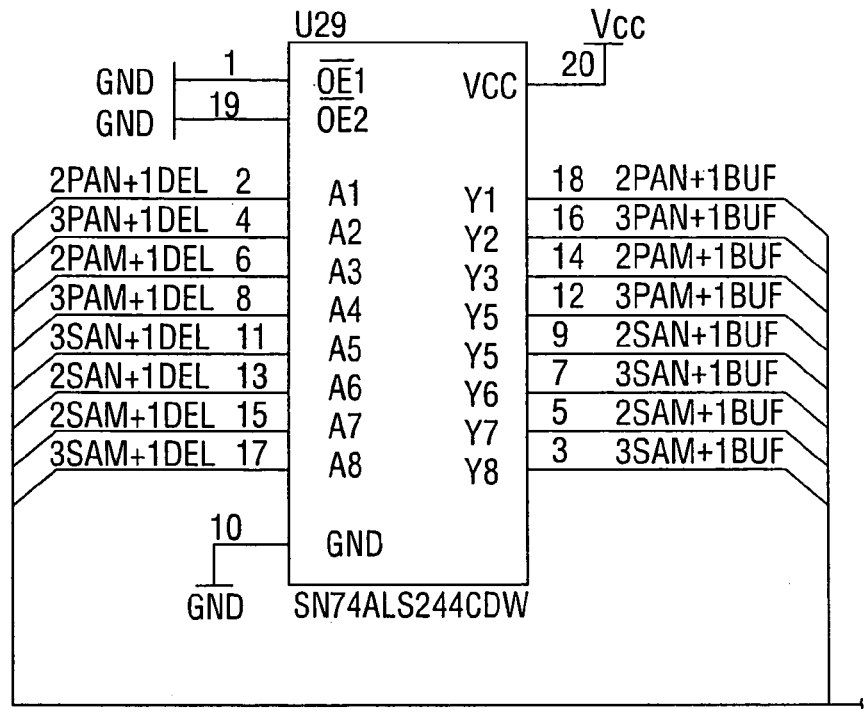
TO 7a-024e

Fig. 7a-04e    FROM 7a-04d
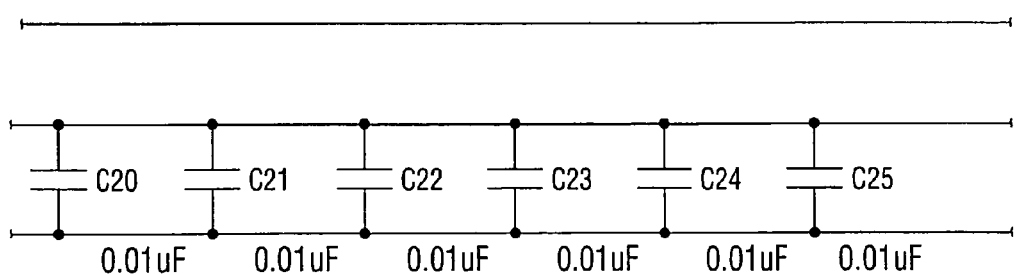

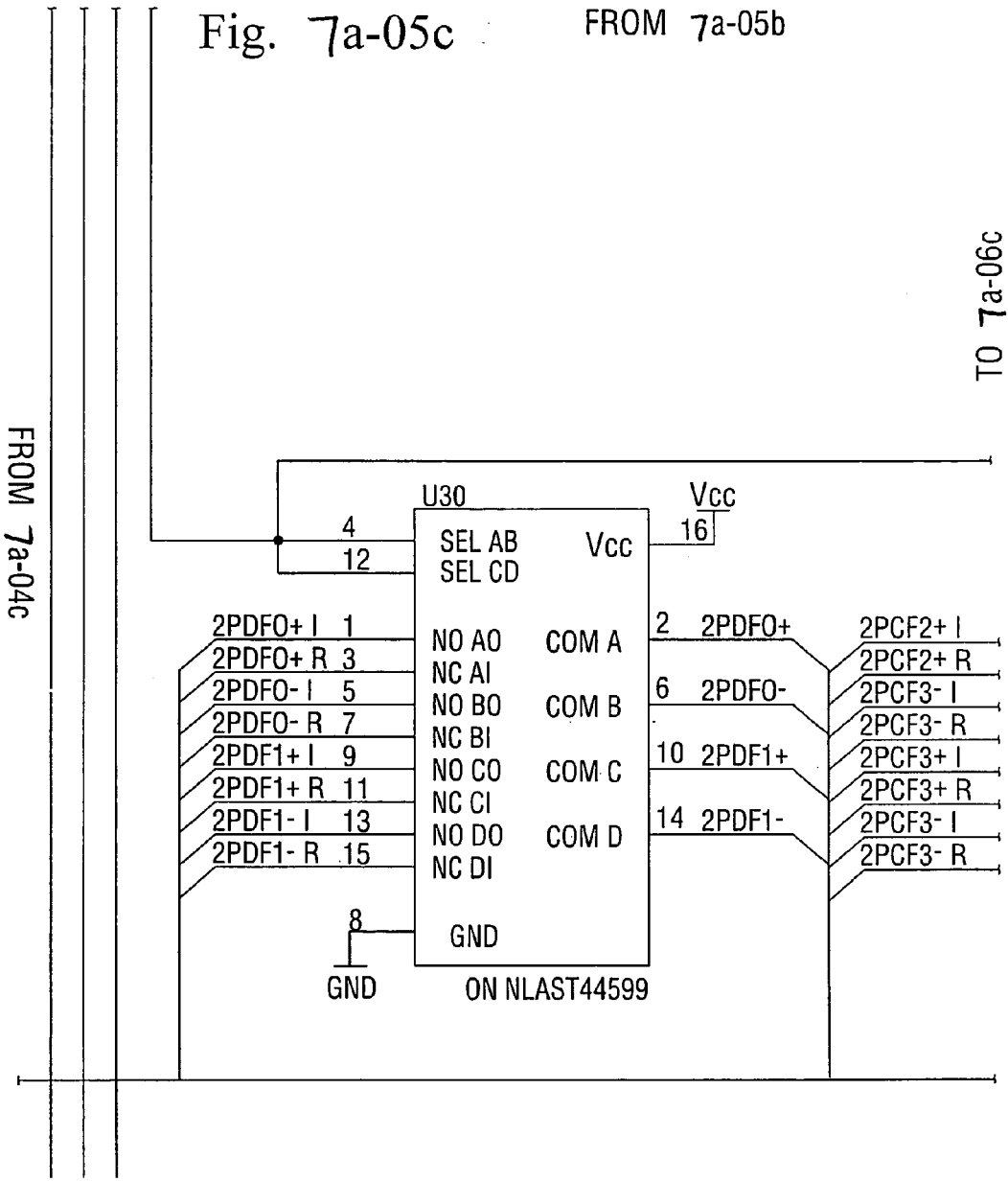

Fig. 7a-06b    FROM 7a-06a
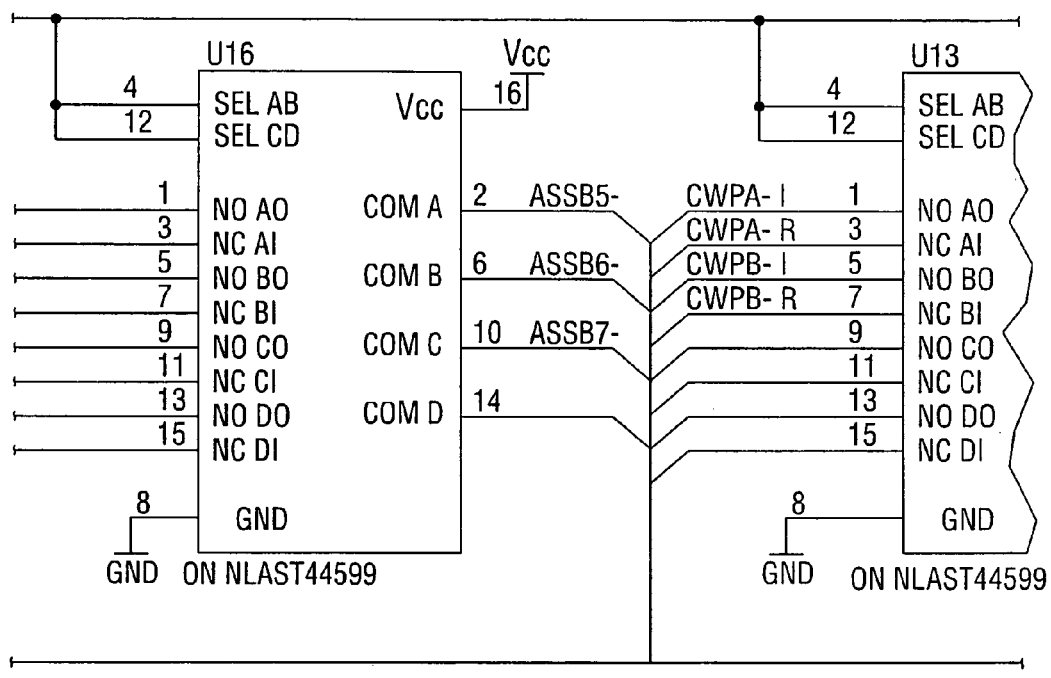

TO 7a-07c

Fig. 7a-07d
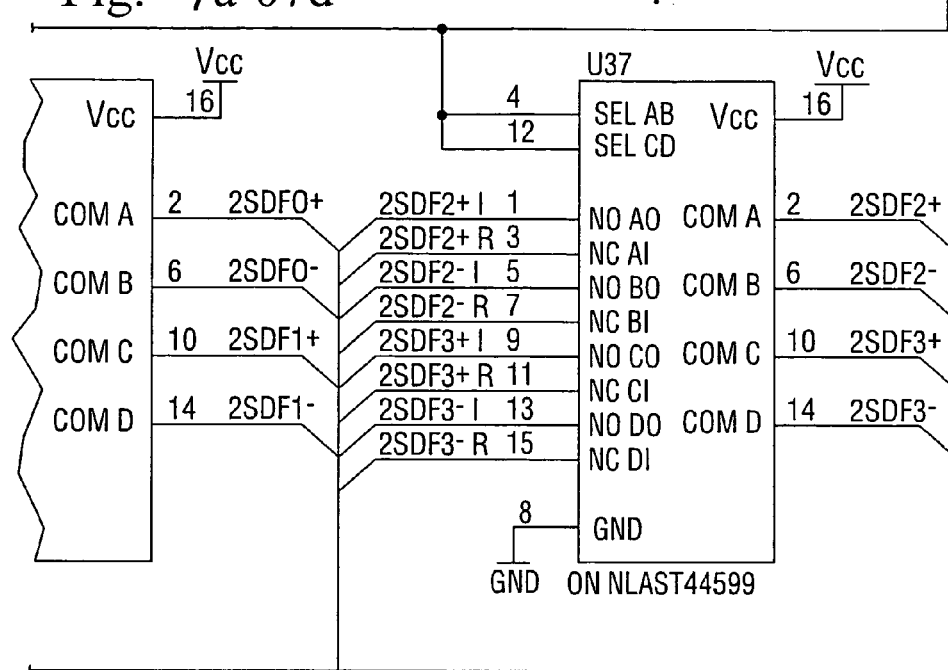
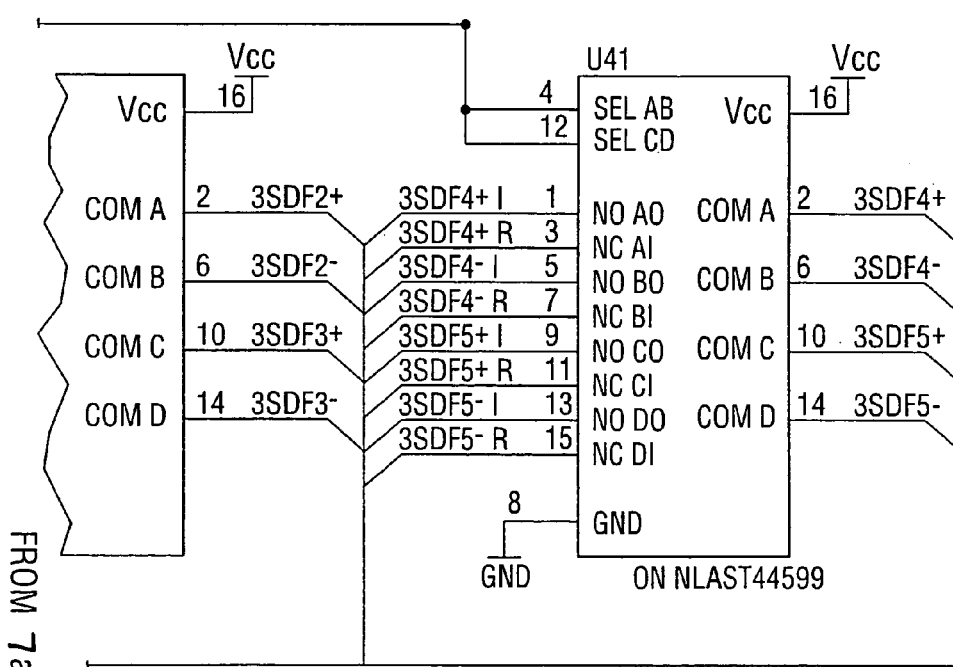

PULSE DESCRIPTOR WORD GENERATOR

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

1. Field of the Invention

The invention relates to electronic surveillance (ES) and electronic counter measure (ECM) systems and, in particular, to a portable device capable of inserting previously collected and stored or fabricated digitized radio frequency (RF) pulsed data into an electronic surveillance system to realistically simulate the complex and dense RF environment of a particular theater of operation or threat scenario. The invention further relates to the method by which the device creates and inserts said data.

2. Description of the Background

Electronic Surveillance ("ES") systems are used on modern United States (U.S.) Navy ships. These systems receive RF signatures in the form of pulse data and digitize them. The data is then processed in order to identify signals and determine the nature of the signals, threatening or non-threatening, for the purpose of threat awareness and self-defense. The data processing is typically accomplished by sending the data through a pulse processor, filtering it, and comparing the filtered data to stored sets of parameters. Monitoring the performance of processors within ES systems currently in use on U.S. Navy ships is required for continued improvement in recognition capabilities.

Up until now, such monitoring was accomplished by analyzing recordings of the ES system's response to known external stimuli. The external stimuli is supplied by radiating RF modulated pulses at the ES system antennas, injecting RF modulated pulses into the ES system cables, or using system specific built-in-test (BIT) capabilities. Each of these methods supply RF modulated pulses that the ES system has to process into digital pulse descriptor words (PDWs). However, due to the ever-increasing complexity and density of emissions in the RF spectrum, this method of assessing ES system performance is out-dated and insufficient. Both injecting RF and built-in-test (BIT) do not provide the total RF environment. Radiating at the antennas on a ship will capture the RF environment, reflections, etc but is often costly and time consuming. Adequate assessment of the performance capabilities of an ES system requires an in-depth analysis of the system's response in light of all of the RF pulse activity for a given time period. Only with such an assessment can there be a realistic improvement in the development of radar and threat recognition algorithms.

Many ES systems and electronic counter measure (ECM) systems have the ability to sample and temporarily store the RF parameter data of a singular received RF pulse. This pulse is finely sampled across its duration. This sampling of information allows the re-creation of the pulse for output. However, modern ES and ECM systems do not possess long-term multi-pulse storage capability. In ECM systems the goal of the memory is to affect a short delay in the retransmission of data. This delay equates to range when viewed from a hostile perspective. Digital radio frequency memory (DRFM) or other memory is used to capture, store and then retransmit RF energy a short time later. This is often referred to as an RF delay line. Once the data has been re-transmitted, it is no longer held in memory. For example, U.S. Pat. Nos. 4,891,646, 4,713,662 and 4,743,905 to Wiegand, U.S. Pat. No. 4,885,587 to Wiegand, et. al., and U.S. Pat. No. 4,928,104 to Schaffer all discuss various forms of DRFM for use within ECM systems. Specifically, these DRFMs are designed for use within active radar jamming systems. In each form the purpose of the DRFM is to allow the radar jamming system to capture received radar signals, manipulate or alter them in time or phase, as necessary, and return them on demand to confuse enemy radar systems. U.S. Pat. No. 5,032,839 to Even-Or employs optical RF memory for the same purpose.

Several other prior art references also disclose the use of short-term memory to improve the speed and accuracy of ECM or ES systems.

U.S. Pat. No. 4,145,691 to Freeling et al. patents a memory system which finds particular use in ECM systems. It uses memory to establish a feedback loop to re-circulate RF burst signals which are emitted by enemy radar systems.

U.S. Pat. No. 4,217,580 to Lowenschuss discloses a complete ECM system. In this system RF signals are converted to digital words. The digital words are then pre-sorted. Once a predetermined number of digital words associated with one radio frequency signal is collected, that data is passed to a computer. This computer will then compare the signature to that of a library, recognize the threat and determine the counter technique called jamming.

U.S. Pat. No. 4,879,561 to Inkol discloses a filter system for analyzing interleaved PDWs received from a multiplicity of radar signals. This system incorporates a buffer memory. The buffer memory is organized to allow data corresponding to a particular radar emitter to be efficiently accessed for further analysis within the radar system.

U.S. Pat. No. 4,025,920 to Reitboeck et al. discloses an apparatus and method for identifying incoming radar signals by comparing them with stored sets of parameters. Similarly, a radio frequency detection and collection system (RFD/CS) produced by Wide Band Systems, Inc. uses an antenna array and instantaneous frequency measurement (IFM) receivers to collect RF signals and convert them into PDWs. The PDWs are then transmitted to a computer workstation for analysis. The purpose of the computer workstation in this RFD/CS system is to compare the incoming PDWs with stored parameters in order to identify the intercepted emissions.

Parent application Ser. No. 10/774,643 filed on Feb. 6, 2004, for "Descriptor Word Collector"; inventors: Slutzky, Barry; Kluender, Andrew, describes a portable PDW Collector for passively capturing and storing (as extractor files) all digitized RF pulse data received by an ES system receiver prior to filtering by the ES system pulse processor. The PDW Collector is comprised of a personal computer and an electronics unit, called a PDW Extractor. This PDW Collector is designed for easy and unobtrusive integration with an ES system. It is also easily removable to a laboratory environment for play back of the received data and analysis of the system's response thereto. The PDW Collector does not, however, allow collected extractor files to be inserted back into an ES system.

A simulator called VariGen™ has recently been introduced by Varilog Research, Inc. This simulator system employs Windows™ based software which allows the user to describe complex emitter parametric agility and allows the user to approve the emitter description. Hardware units then create and insert simulated pulsed and constant wave (CW) RF signals into an electronic warfare (EW) system, such as the AN/SLQ-32(V). However, this simulator is incapable of inserting into the ES system actual recorded PDW data that captures all the nuances of a ship, including own-ship reflections, sea reflections, roll and pitch effects, and electromagnetic interference (EMI).

None of the above-mentioned references discloses a system that is capable of inserting previously recorded or fabricated RF pulse data into an ES system to realistically simulate a complete RF pulse environment.

Thus, there is a need for a portable PDW Generator (generator) designed to insert previously recorded or fabricated digitized RF pulse data into an ES system. This portable generator will allow for an accurate and realistic simulation of a total RF pulse environment present in a given threat scenario. For example, a PDW Collector captures and records an actual threat situation (i.e. missile attack against a naval vessel) and stores the data as extractor files. The extractor files are then are uploaded to a generator, converted to generator files and inserted into the ES system of the same ship or another ship in another part of the world to realistically simulate the particular event. Such a generator would provide a realistic, convenient and cost-effective portable simulation device and testing tool that can be easily integrated into an ES system. Additionally, such a system is needed for use as a trouble-shooting tool. For example, ships that are having problems with their ES system will be able to use the PDW Collector to capture and record a problem and then use the generator to systems analysts to troubleshoot the problem by controlled insertion back into the ES system.

SUMMARY OF THE INVENTION

The primary object of the present invention is to provide an apparatus capable of inserting previously recorded or fabricated digitized RF pulse data into an ES system (i.e. AN/SLQ-32(V). The digitized data typically includes parameters such as time of arrival, angle of arrival, amplitude, and frequency. The purpose of inserting the digitized RF pulse data is to simulate an RF pulse environment. An analysis of either the ES system's response to the inserted data may be done to test the detection and identification capabilities of the ES system and to improve upon those detection and identification capabilities. Additionally, an analysis of the crew's response to the simulated threat environment may be done to test and, if necessary, improve upon the crew's readiness.

A secondary object of the present is to provide such an apparatus for use as an on-board trouble-shooting tool for a ship's ES system.

It is another object of this invention to provide a method for inserting digitized RF pulse data into an ES system.

In a conventional ES system (i.e. AN/SLQ-32(V)), the ES system receiver receives RF pulse data and forwards the data to the ES system pulse processor. The foregoing and other objects of the present invention are generally accomplished by providing a PDW Generator, comprised of a personal computer (PC) and a portable custom electronics unit. The generator is integrated into an ES system between the receiver and pulse processor without intruding upon the ES system. (i.e. without effecting the Ship Replaceable Units (SRUs) of the ES system). Real-time RF pulse data and other unrelated data are transmitted normally from the receiver towards the pulse processor but are diverted to the generator.

In the primary embodiment of the present invention the flow of real-time RF data is halted in the generator, but transmissions unrelated to the pulse data are permitted to flow through the generator to the pulse processor, unaltered and uninterrupted. The generator coincidentally inserts previously recorded or fabricated RF PDW data into the ES system pulse processor. In a secondary embodiment of the present invention, the primary embodiment is upgraded such that the system allows for the successful multiplexing of both simulated RF PDW data and real-time RF data.

The objects of the PC are to provide the programming and graphical user interface (GUI) for allowing a user: (1) to upload extractor files, (2) to store extractor and generator files, (3) to create new generator files by converting a single extractor file, by combining more than one extractor file and converting them into a single generator file, or by fabricating data files, (4) to view generator files, and (5) to select a generator file for insertion into the ES system and to initiate and control the insertion process. The foregoing objects of the PC are accomplished by using a standard high-speed personal computer configured with a hard drive, random access memory (RAM), a high-speed Digital Input/Output (DIO) card, and a peripheral control interface (PCI) bus. The PC is further programmed with customized software.

The objects of the electronics unit are (1) to receive selected generator files from the PC and (2) to transmit those selected generator files to the ES system pulse processor. To accomplish this object the electronics unit configuration includes dual flow control buffers (one for frequency, angle and amplitude PDW data and the other for time of arrival PDW data), data counters, a first-in-first-out control logic, a data routing and control circuit, a strobe generator and timer, and output drivers and buffers. The electronics unit is capable of storing only that amount of data that its flow control buffers can hold. Transferring the generator files between in the PC and electronics unit is accomplished by burst mode handshaking. There is no such handshaking between the electronics unit and the ship's ES system (AN/SLQ-32(V)). The AN/SLQ-32(V) simply latches onto the data upon receiving strobes from the electronics unit.

The foregoing generator is capable of being internally and externally clocked and has enough speed and memory to insert continuous streams of RF pulse data into an ES system to accurately simulate the dense and complex pulse environments of modern theaters of operation. Specifically, the generator is capable of inserting into an ES system the exact play back of pulse data recorded and stored as extractor files. This is limited to a maximum rate of one million RF pulses per second.

Lastly, the above-described apparatus is portable (easily moved from ship to ship or laboratory to ship).

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIGS. 6a-01 to 6a-11d are a detailed schematic diagram of the custom circuitry for the electronics unit of the primary embodiment of the present invention.

FIGS. 7a-01a to 7a-08b are a detailed schematic diagram of the custom circuitry for the electronics unit of the secondary embodiment of the present invention incorporating the system upgrade.

FIG. 8 is a flowchart setting out the methods steps of the present invention.

DETAILED DESCRIPTION OF THE PREFERRED EMBODIMENT

The figures and the detailed description below illustrate the preferred embodiments of the device and method of the present invention used in conjunction with an AN/SLQ-32 (V) electronic surveillance system. However, those skilled in the art will appreciate that the present invention can be easily adapted for use with any similar electronic surveillance system without departing from the scope and spirit of the present invention.

Figure 1:
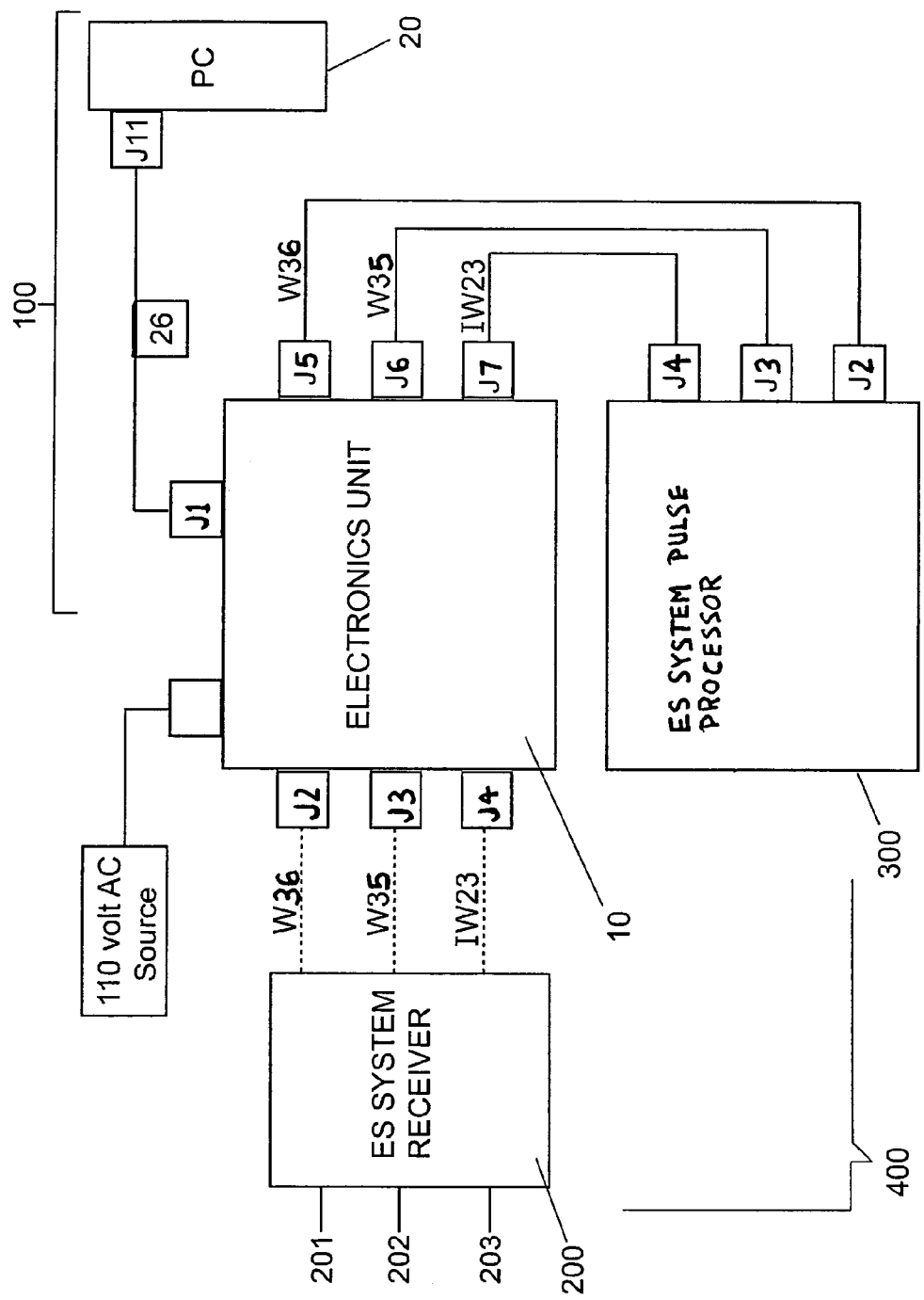
FIG. 1 is a block diagram illustrating the integration of the generator of the present invention, including the personal computer (PC) and electronics unit, into an ES system between the receiver and the pulse processor.

Referring to FIG. 1, the AN/SLQ-32(V) is an ES system 400 commonly used on board U.S. Navy ships. The AN/SLQ-32(V) system receiver 200 includes a starboard antenna angle encoder 201, a port antenna angle encoder 202 and a coarse frequency receiver (CFR) 203. These angle encoders produce digital word data based on both the amplitude (AMP) and the angle of arrival (AOA) of received RF signals. The starboard antenna angle encoder 201 transmits AMP/AOA pulse data via the ship's cable W35 to input J3 on the pulse processor 300. The port antenna angle encoder 202 transmits AMP/AOA pulse data via ship's cable W36 to input J2 to the pulse processor 300. The CFR 203 produces pulse data based on the frequency (FREQ) of received RFs and transmits this data via ship's cable IW23 to input J4 of the pulse processor 300.

The present invention is a pulse descriptor word generator 100 for inserting previously recorded and/or fabricated RF pulse data into an electronic surveillance (ES) system, such as the AN/SLQ-32(V) described above.

Referring to FIG. 1, the generator 100 includes: (1) a portable electronics unit 10, and (2) a high-speed personal computer (PC) 20. The generator 100 is integrated into an ES system 400 after the point at which real-time RF signals have been received by the receiver 200 and prior to the point where they are processed and assigned a time-of-arrival (TOA) by the pulse processor 300. Similar to the pulse processor 300, the electronics unit 10 has an input connection for powering the unit and input connections J3, J2, and J4 connected to ship's cables W36, W35, and IW23, respectively, which are in turn connectable to the receiver 200. Additionally, the electronics unit 10 has output connections J5, J6, and J7, which can communicate via cables W5, W6, and W7, to the pulse processor 300 through pulse processor input connections J2, J3, and J4, respectively. Communication between the PC 20 and the electronics unit 10 occurs via a peripheral control interface (PCI) bus 26 at input/output connections J1 on the electronics unit 10 and J11 on the PC 20.

As stated-above, the preferred embodiment of this invention is described in conjunction with the AN/SLQ-32(V) ES system 400. Therefore, inserted PDW data that corresponds to AMP/AOA data from the starboard antenna angle encoder 201 is transmitted through output connection J5 of the electronics unit 10 via the ship's cable W5 and into input J2 on the pulse processor 300. PDW data that corresponds to AMP/AOA data from the port antenna angle encoder 202 is transmitted through output connection J6 via ship's cable W6 and into input J3 on the pulse processor 300. Similarly, PDW data corresponding to FREQ data is transmitted through output connection J7 via ship's cable IW23 and into input connection J4 on pulse processor 300.

Figure 2:
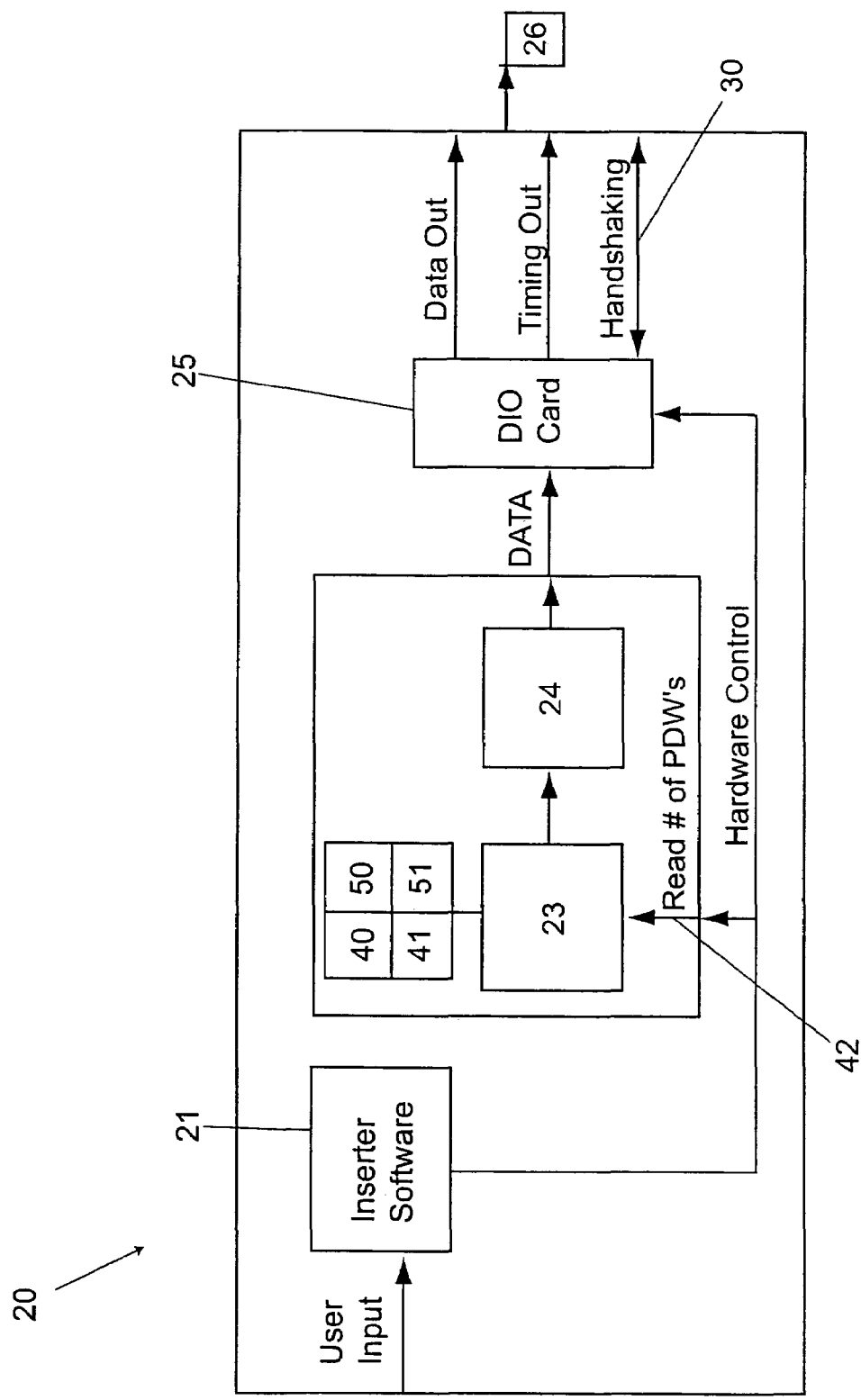
FIG. 2 is a block diagram illustrating the hardware configuration the PC.

FIG. 2 is a block diagram illustrating the hardware and software configuration of the preferred embodiment of PC 20. The hardware of PC 20 includes a hard-drive 23, a random access memory (RAM) 24, a high-speed digital input/output (DIO) card 25, and a standard peripheral control interface (PCI) bus 26.

The preferred software of PC 20 includes a Windows 2000® operating system with customized software 21 developed using LabView® advanced programming tools. However, those skilled in the art will appreciate that the present invention can be easily adapted for use with any similar operating system or other software similarly customized without departing from the scope and spirit of the present invention.

The custom software 21 of the present invention serves four main functions that allow the user to: (1) to create generator files 40, (2) to select one or more extractor files 50 and convert them into a generator file 40, (3) to view selected generator files 40, and (4) to transmit selected generator files 40 to the electronics unit and control its insertion into the ES system 400.

FIGS. 3a–e are exemplary printouts of GUI screens for the present invention displayed by the Windows® operating system.

Figure 3A:
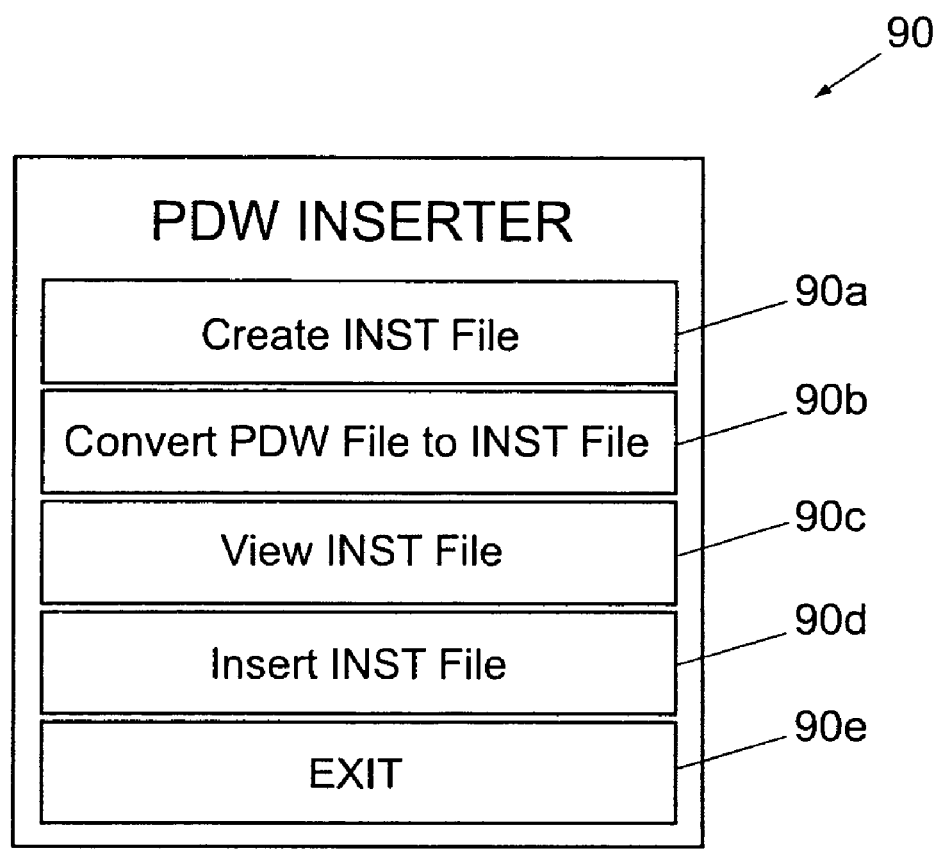
FIG. 3a–e are exemplary printouts of GUI screens for the preset invention illustrating the main menu, create a generator file, convert an extractor file to a generator file, view a generator file, and insert a generator file screens, respectively.

Specifically, FIG. 3a shows an exemplary GUI screen used for the main menu display 90 from which the user may select from a number of buttons (90a–e) to create a generator file (90a), convert an extractor file to a generator file (90b), view a generator file (90c), insert a generator file (90d) or exit the program (90e).

Figure 3B:
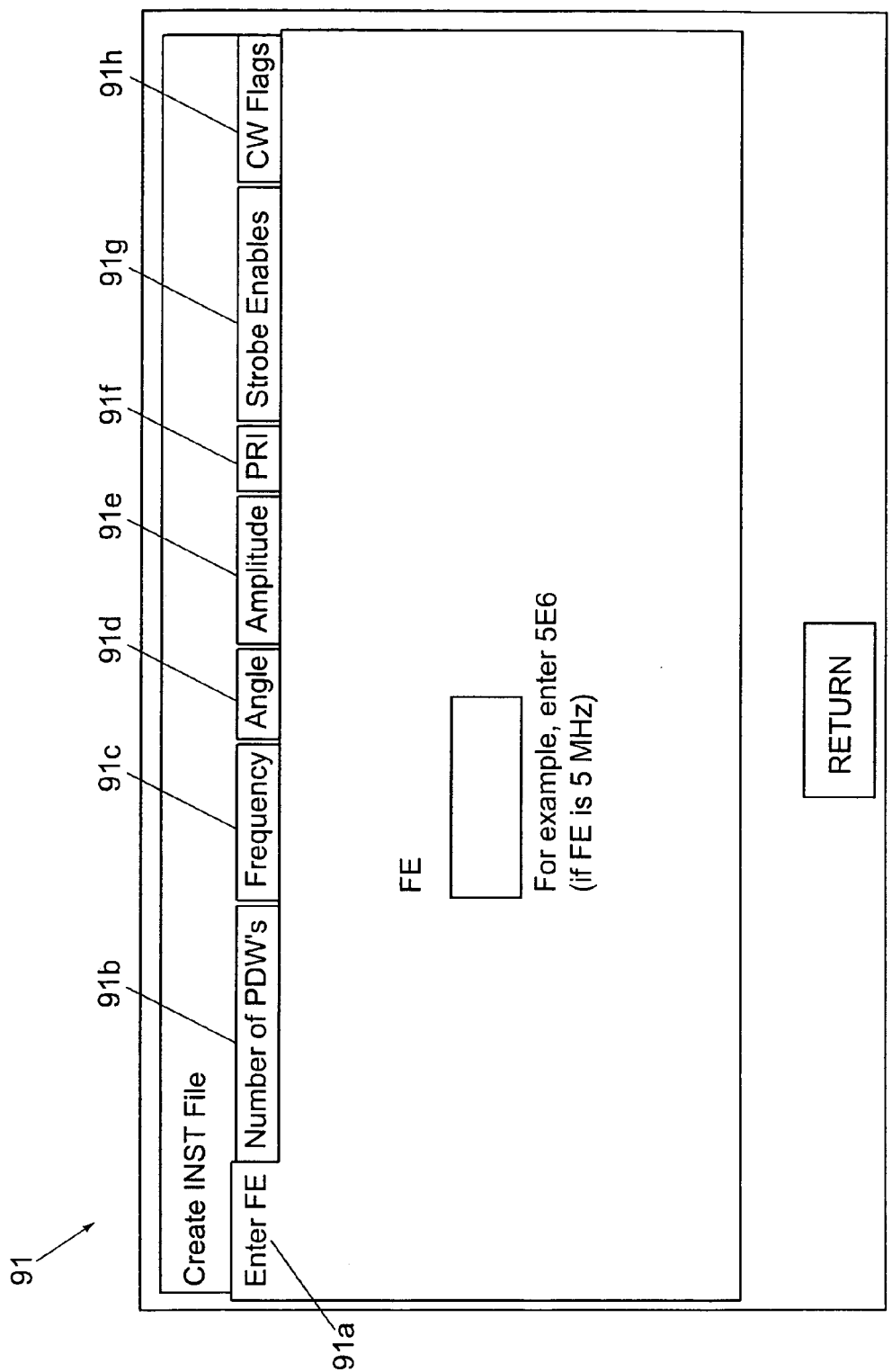

FIG. 3b shows an exemplary GUI screen 91 used for creating a generator file 40. The screen 91 allows the user to create a generator file by using multiple buttons (i.e. 91a–h) that will allow the user to input file parameters including a frequency value (FE), number of PDWs, frequency, angle, amplitude, pulse repetition interval (PRI), strobes, and constant wave (CW) flags.

Figure 3C:
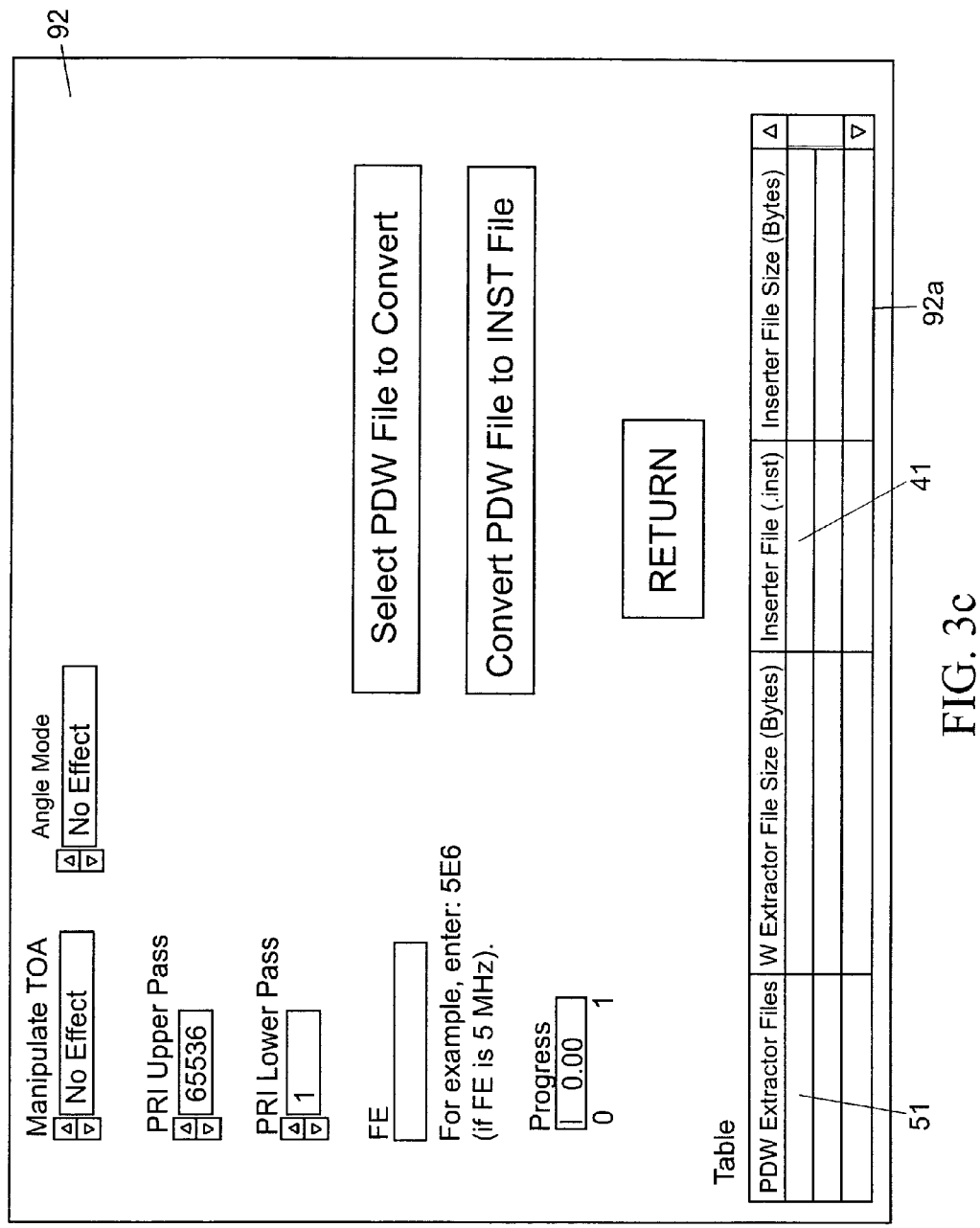

FIG. 3c shows an exemplary GUI screen 92 used for selecting one or more previously stored extractor files 50 from a table 92a and converting them into a generator file 40. Extractor files 50 are uploaded to the PC 20 from a PDW Collector or other memory source for extractor files 50. The hard-drive 23 on the PC 20 maintains both a generator files database 41 and an extractor files database 51 (See table 92a of FIG. 3c). Using GUI screen 92 (FIG. 3c), one or more extractor files 50 may be combined and converted to create a single generator file 40. In the primary embodiment of the present invention, the PC software 21 is responsible for converting the extractor files 50 into generator files 40, thereby allowing the user to input additional parameters such as, the Angle Enable (EN), Frequency EN, CW A, and CW B. However, an alternate embodiment is anticipated wherein the conversion function is accomplished through hardware of the electronics unit 10.

As background, it should be noted that PDW Extractor 50 and Generator 40 files are formatted differently. The main difference between the Extractor and Generator files 50, 40 is in the representation of frequency. In a PDW Extractor file 50 the frequency is represented as a bit word. However, in a PDW Generator file 40 it is represented as a sub-band frequency plus or minus an offset frequency. Sub-bands are used because the RF frequency is mixed to a common IF Frequency within the ES system 400 (i.e. AN/SLQ-32(V)). For example, the AN/SLQ-32(V) represents all of its frequencies within 7 sub-bands. When the present invention is used to play-back a PDW Extractor file into the ES system 400, it must format the frequency word to the sub-band plus or minus an offset representation that the pulse processor inputs expect.

Figure 3D:
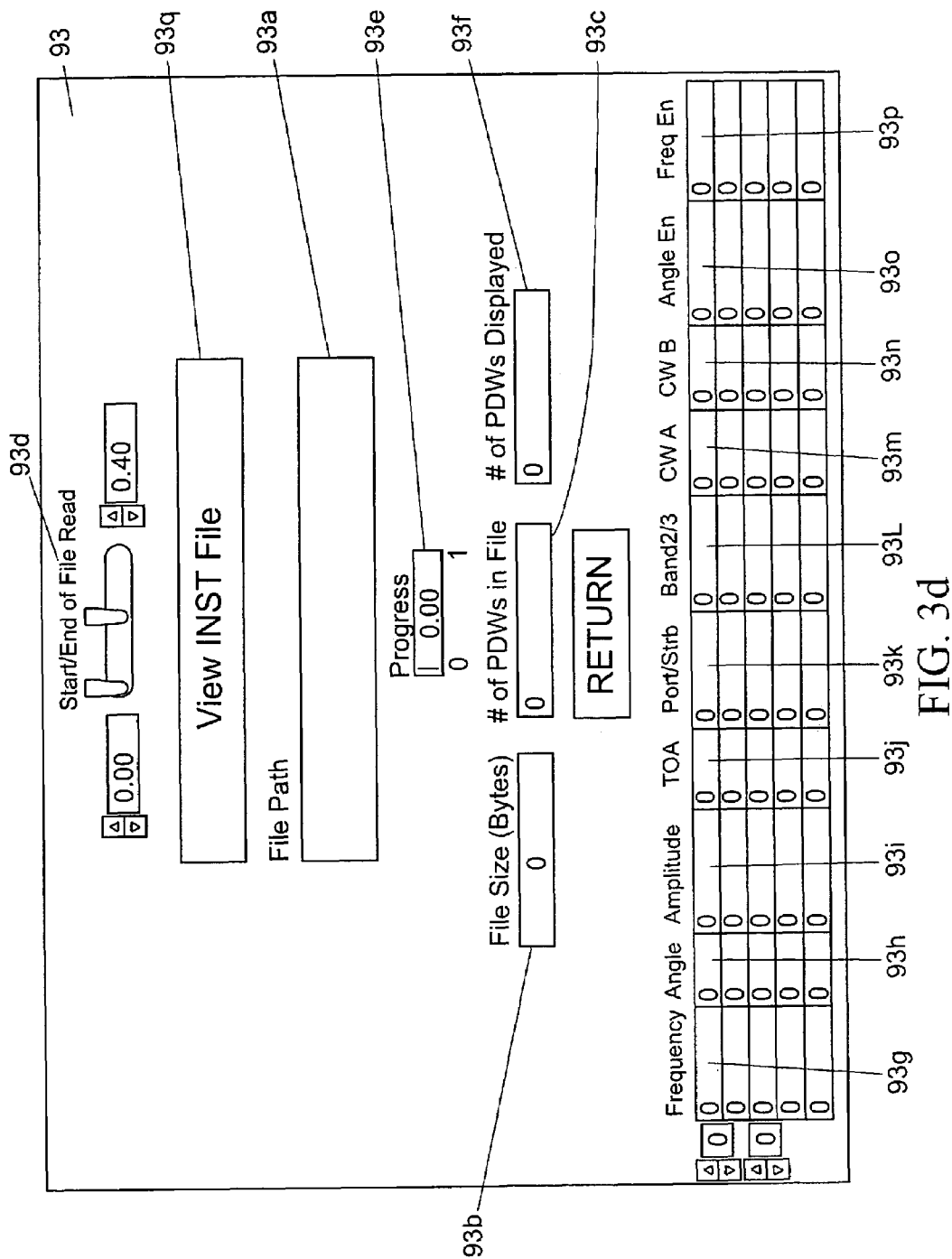

FIG. 3d shows an exemplary GUI screen 93 used for selecting a particular generator file for viewing by identifying the path name 93a and pushing the view file command button 93q. Displayed file properties include file size 93b and number of PDWs in the file 93c. The generator file 40 may be viewed in its entirety or by selected portions by inputting the start and end of the file read 93d. As the file is viewed, the user is able to monitor the viewing progress 93e and number of PDWs displayed 93f. Signal information and parameters contained in the file 40 and viewable include frequency, angle, amplitude, time of arrival, whether it is received by port or starboard receiver, band 2/3, CW A, CW B, the Angle EN and the Frequency EN (See reference numbers 93g–p, respectively).

Figure 3E:
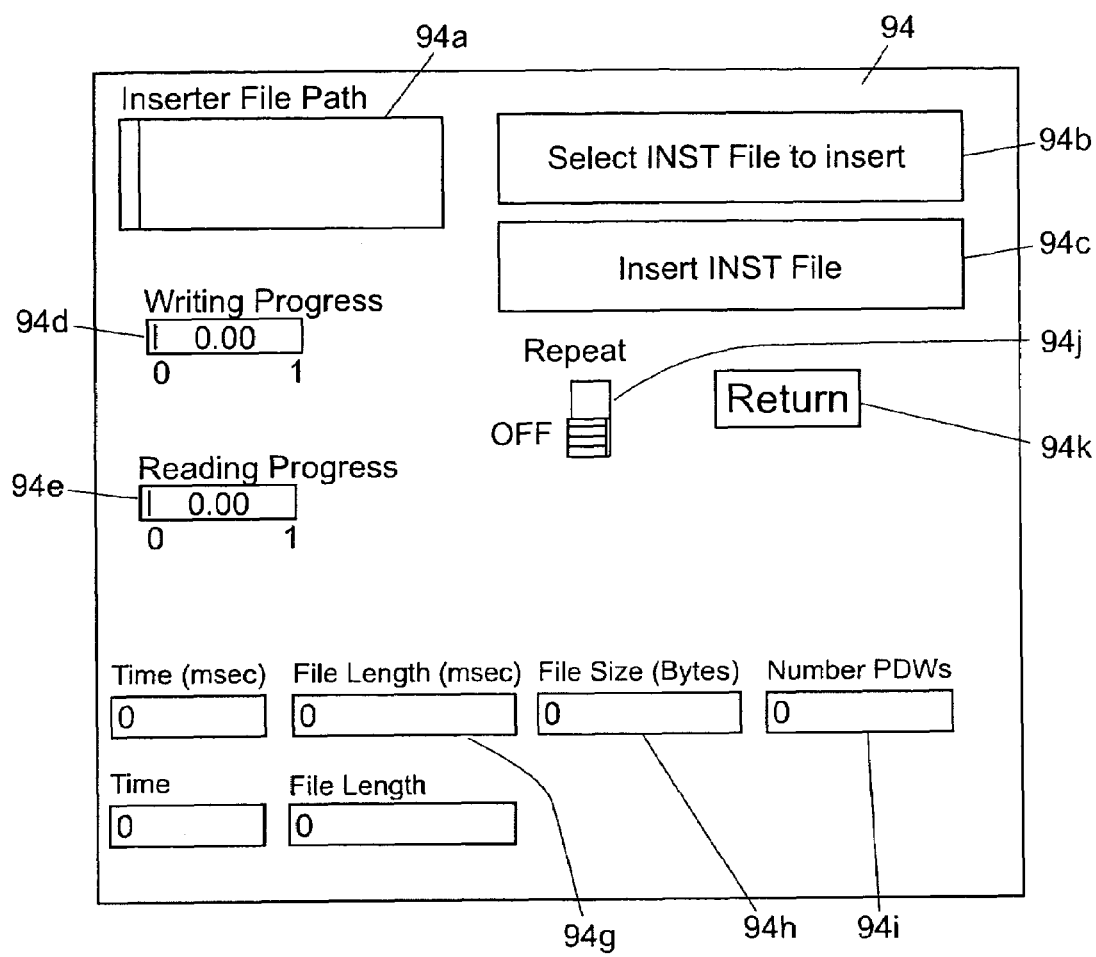

FIG. 3e shows an exemplary GUI screen 94 used for selecting a particular generator file for inserting into the ES system. To initiate file insertion the user identifies the file path name 94a and pushes the select file and insert file command buttons (94b–c). As the insertion process is underway, the GUI screen 94 allows the user to monitor the process including writing progress 94d and reading progress 94e.) File lengths 94g, file sizes 94h, and numbers of PDWs 94i are displayed upon initiating the insert file command. File lengths and times may be displayed in msec or hours:mins:secs, counting up until the value of the file length is reached. Additionally, the user may choose that the selected file be inserted one or multiple times by turning on or off the repeat command button 94j. A return button 94k allows the user to return to the main menu, stopping a file transfer.

The insertion process proceeds as follows. Pushing the insert file command button 94c, initiates a file read request 42. Once a file read request 42 is made, a fixed portion of that selected file 40 will be up-loaded from the hard-drive 23 to the RAM 24. After the file portion is received by the RAM 24, the DIO card 25 transmits that file portion 43 to the electronics unit 10 via the standard PCI bus. Additionally, the control of the transfer of data from the DIO card 25 to the electronics unit 10 is accomplished using burst mode protocol (BMP) handshaking 30. Request (REQ) and Acknowledge (ACK) signals are used to make sure both the PC 20 and the electronics unit 10 are ready for the data transfer.

Figure 4:
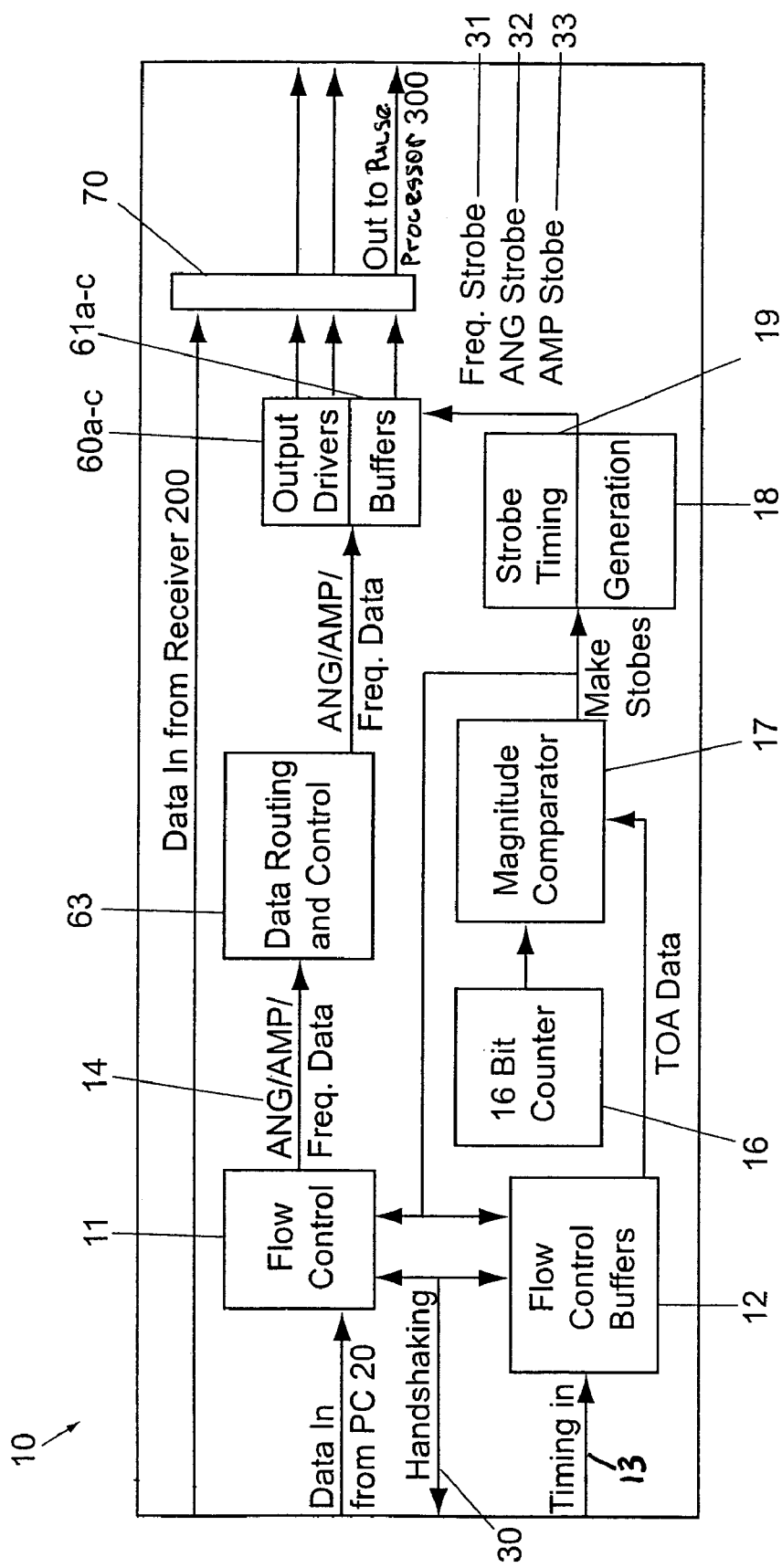
FIG. 4 is a detailed block diagram of the custom electronics unit 10 of the generator 100.
Figure 5:
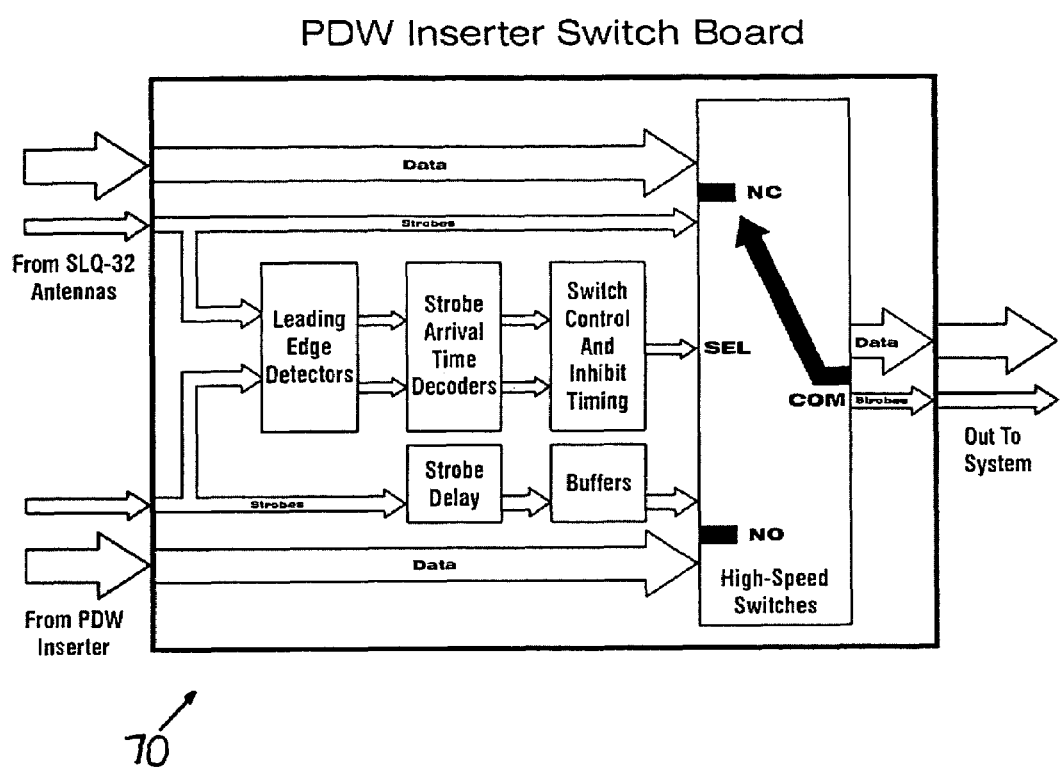
FIG. 5 is a block diagram of the an embodiment of the output of FIG. 4.

FIG. 4 and is a block diagram of the custom electronics unit 10 of the generator 100. FIG. 5 is a larger view of the PDW inserter switchboard 70 of FIG. 4, and FIGS. 6-01a to 6-11d are a detailed schematic diagram of the circuitry for the electronics unit according to a primary embodiment of the present invention.

The electronics unit 10 includes: (1) two flow control buffers (11 and 12), (2) timing data in 13, (3) a first-in-first-out (FIFO) control logic 14, (4) a 16-bit free running counter 16, (5) a magnitude comparator 17, (6) data routing and control circuit 63, (7) strobe generator 18, (8) strobe timer 19, (9) output buffers 61a–c, (10) output drivers 60a–c, and PDW inserter board 70. A larger view of the inserter board 70 showing a block diagram of the board 70 operation is included as FIG. 5.

As stated above, the generator 100 is integrated into an ES system 400 (i.e. AN/SLQ-32(V)) between the system receiver 200 and pulse processor 300. All data transmitted by the receiver 200 to the pulse processor 300 is diverted to the electronics unit 10. Any information and/or data diverted to the electronics unit 10 that is unrelated to PDW angle of arrival, amplitude and frequency data is forwarded unaltered and uninterrupted through the electronics unit 10 to the pulse processor 300. Information unrelated to PDW data includes such information as the operating condition of the antennas, the angle encoders (201 and 202) or the CFR 203. Allowing this type of information to be forwarded allows for a more realistic simulation.

The electronics unit 10 of the primary embodiment of the present invention is only capable of processing supplied PDW data from generator files 40 transmitted by the PC 20. Therefore, the PDW data incoming in real-time from the receiver 200 is simply disconnected, neither forwarded nor processed. A secondary embodiment of the present invention, discussed in more detail below, provides for a systems upgrade that allows the electronics unit 10 to successfully multiplex both simulated and real-time RF PDW data.

The electronics unit 10 of the primary embodiment of the present invention includes two separate flow control buffers for PDW data, flow control buffer 11 for frequency, angle and amplitude data, and flow control buffer 12 for time of arrival data. As generator file portions arrive in the electronics unit 10 the PDW angle, amplitude and frequency data is directed into buffer 11 and the time of arrival of each pulse descriptor word is clocked by clock generator 13. This time of arrival data corresponding to each pulse descriptor word for angle, amplitude and frequency data is then held in buffer 12.

Since burst mode handshaking 30 is used to transmit only a fixed portion of a selected generator file at a time, there is an access time requirement for reading from the hard-drive 23 and loading it to the RAM 24. Therefore, the flow control buffers 11 and 12 are designed to be deep enough to temporarily store an amount of PDW data equal to or greater than the maximum throughput times the access time for the particular ES system.

PDW angle, amplitude, and frequency data is clocked in to (TOA) and out of buffer 12 using a first in-first out (FiFo) control logic 14. The time period between the arrivals of each pulse descriptor word, called the Pulse Repetition Interval (PRI) 15, is used to trigger transmission of PDW data from buffer 11 to the pulse processor 300. The PRI 15 is determined by clocking the time of arrival of the PDW data into flow control buffer 12. As the time of arrival data enters buffer 12 it is counted by a 16-bit free running counter 16. A magnitude comparator 17 compares the quantity of TOA data in the control buffer 12 with the 16-bit free running counter 16. When the first TOA data stored in the buffer 12 matches the 16-bit counter, a read enable (REN) signal is asserted and strobe generation is initiated by strobe generator 18 as coordinated by strobe timer 19. This triggers the read-out of the PDW data from buffer 11 to the pulse processor 300. Simultaneously, FIFO control logic 14 issues a FIFO full-flag to de-assert the request (REQ) in the burst mode handshaking so that the PC 20 does not continue to stream PDW data when the buffers 12 in the electronics unit 10 cannot hold anymore.

The read out is controlled by FIFO control logic 14. PDW data from flow control buffer 11 is initially read to data routing and control circuit 62. The inserted PDW data is then routed within the electronics unit 10 according to which antenna system the data indicates received it. Specifically, inserted PDW data contains information that indicates it is (a) AMP/AOA data received by the port antenna 201, (b) AMP/AOA data received by the starboard antenna 202, or (c) FREQ data received by the CFR 203. Data routing and control circuit 62 routes AMP/AOA data received by the port antenna 201 to output buffer 61a, AMP/AOA data received by the starboard antenna 202 to output buffer 61b and FREQ data received by the CFR 203 to output buffer 61c. Once made available in the output buffers 61a–c, the data may immediately latched by the pulse processor 300. However, in one embodiment of the invention, the output data may be further processed by the PDW inserter switchboard 70.

The generation and timing of strobes is important to ensure that the pulse processor 300 properly latches, correlates, and processes the digitized RF pulse data (PDW data). Specifically, in order to properly process the inserted PDW data, the pulse processor 300 must receive the strobes in the following order: frequency strobe 31, angle strobe 32, and then amplitude strobe 33. These strobes (31, 32, and 33) indicate to the pulse processor 300 that there is RF pulse data waiting in output buffers 61a–c to be read. Note that one particular advantage of software 21 is that it allows the user to control strobe generation on a pulse by pulse basis. Specifically, it allows the user to cause strobe generator 18 to generate both FREQ and AOA/AMP strobes, only FREQ strobes, only AOA/AMP strobes, or no strobes at all. For example, referring to FIG. 3c the user may input parameters for Angle Enable (EN) or Frequency EN to enable or disable the angle or frequency strobes. This disabling of strobes simulates the removal or dysfunction of the respective antenna systems, including the encoders (201 or 202) or the CFR 203. In a preferred embodiment of the invention, processing the timing of the strobe 30, 31, 32 insertion into the pulse processor 300 is done by the PDW inserter switchboard 70.

Once the pulse processor 300 receives the strobes 31, 32, and 33, it latches the data from buffers 61a–c, using FIFO control logic 14. As if being transmitted directly by receiver 200 to the pulse processor 300, port antenna AMP/AOA data is transmitted via ship's cable W35 to input connection J3, starboard antenna AMP/AOA data is transmitted via ship's cable W36 to input connection J2, and FREQ data is transmitted via ship's cable IW23 to input connection J4.

Lastly, output drivers 60a–c, corresponding to each output buffer 61a–c ensure that the electronics unit 10 and pulse processor 300 are able to communicate with each other. The process of inserting supplied PDW data into the pulse processor 300 occurs during PDW detection windows of pre-defined parameters and is continuous. As the flow control buffers (11 and 12) release data to the routing and control circuit 62, the PC 20 will continue to upload the selected generator file 40 to the RAM 24 for transmission to the electronics unit 10. This process will continue until the entire file 40 is inserted or until the generator 100 is reset or powered-off.

As stated above, the primary embodiment of the present invention includes an electronics unit 10 that limits the ES system pulse processor 300 to receiving only supplied RF PDW data downloaded from the selected generator files 40 saved on the PC 20. In a secondary embodiment of the present invention, electronics unit 10 is upgraded with a switchboard 70.

FIGS. 7a-01a to 7a-08b are a detailed schematic diagram of the custom circuitry for the electronics unit of the secondary embodiment of the present invention incorporating the system upgrade that allows the ES system pulse processor 300 to simultaneously receive real RF pulse data from its antennas. Specifically, the switchboard 70 system upgrade allows the electronics unit 10 to multiplex all simulated and real RF data including: frequency sub-band strobes, band 2/3 port/starboard angle strobes, band 2/3 port/starboard amplitude strobes, channel a/b frequency sub-band offset data, band 2/3 port/starboard angle of arrival side offset data, band 2/3 port/starboard amplitude data, and continuous wave data. The switchboard 70 allows only one frequency/angle strobe with its corresponding supplied or real RF data pass to the pulse processor 300 during single detection window. If a real and a supplied frequency/angle strobe occur during the same detection window, the real RF data will pass to the pulse processor by default. If a real and a supplied frequency/angle strobe occur within one PDW detection window of each other, the strobe that occurs first will pass with its corresponding data. If all frequency/angle strobes are separated in time by more than one PDW detection window, then all will pass with their corresponding data.

Figures 1, 6A:
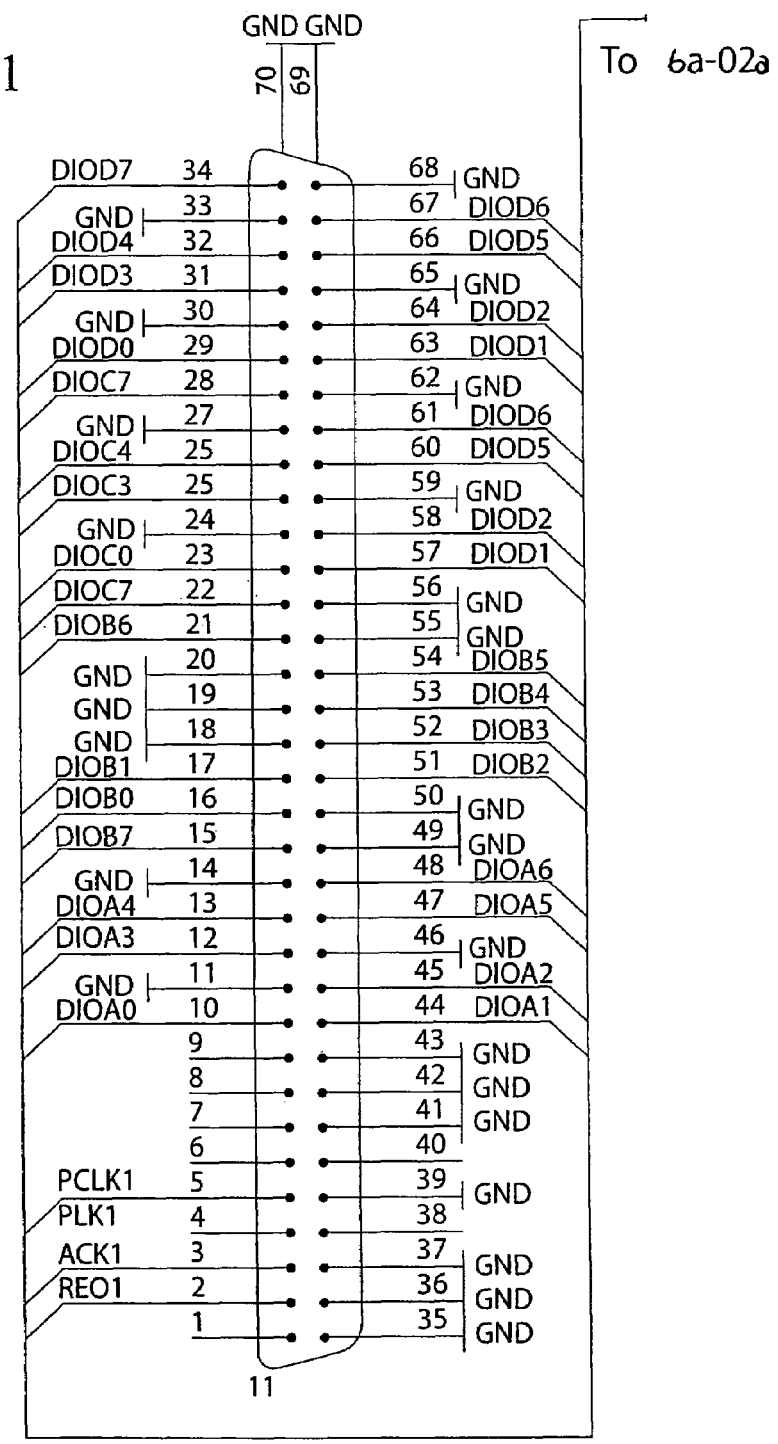
Figures 2B, 6A:
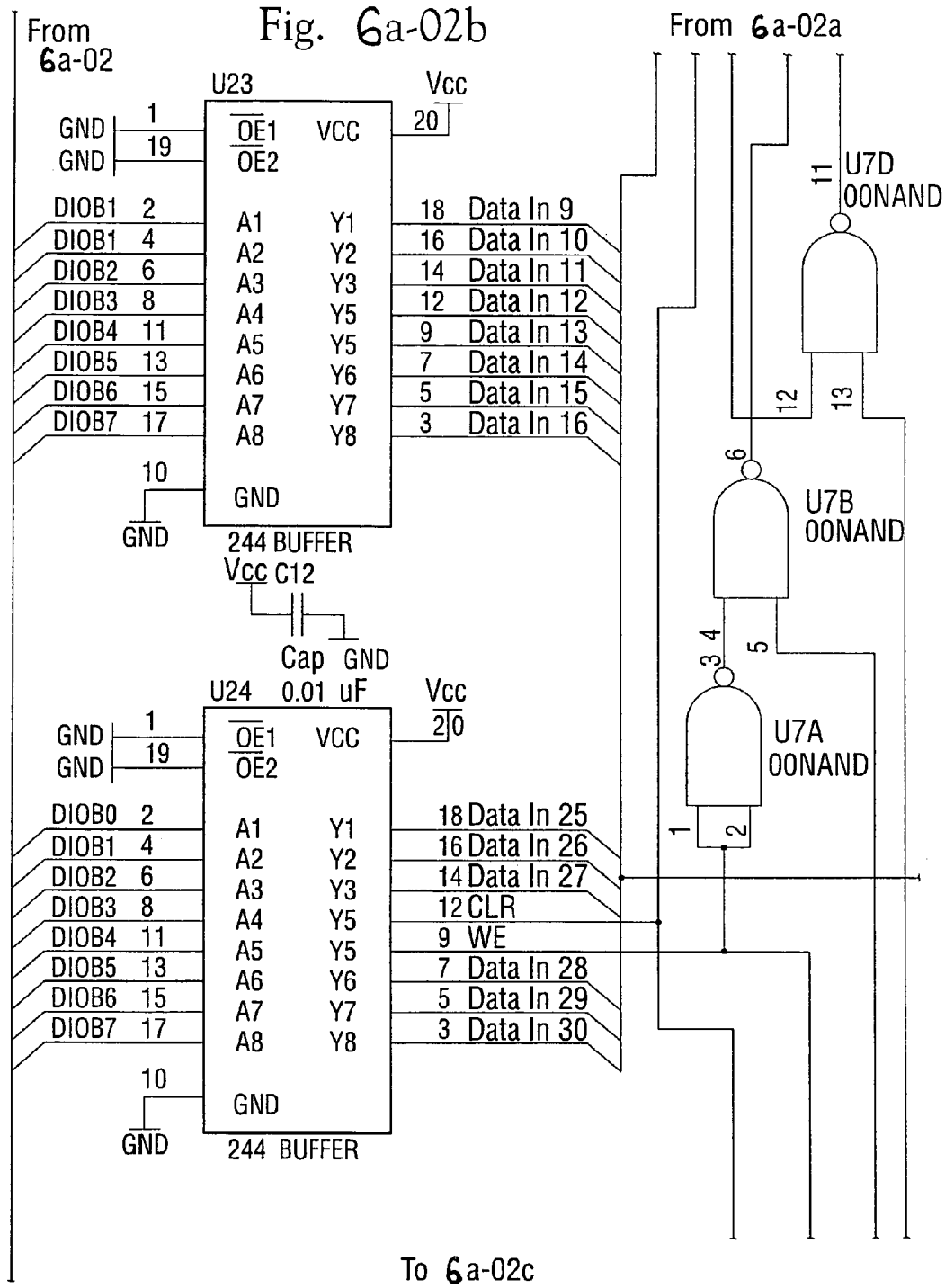
Figures 2C, 6A:
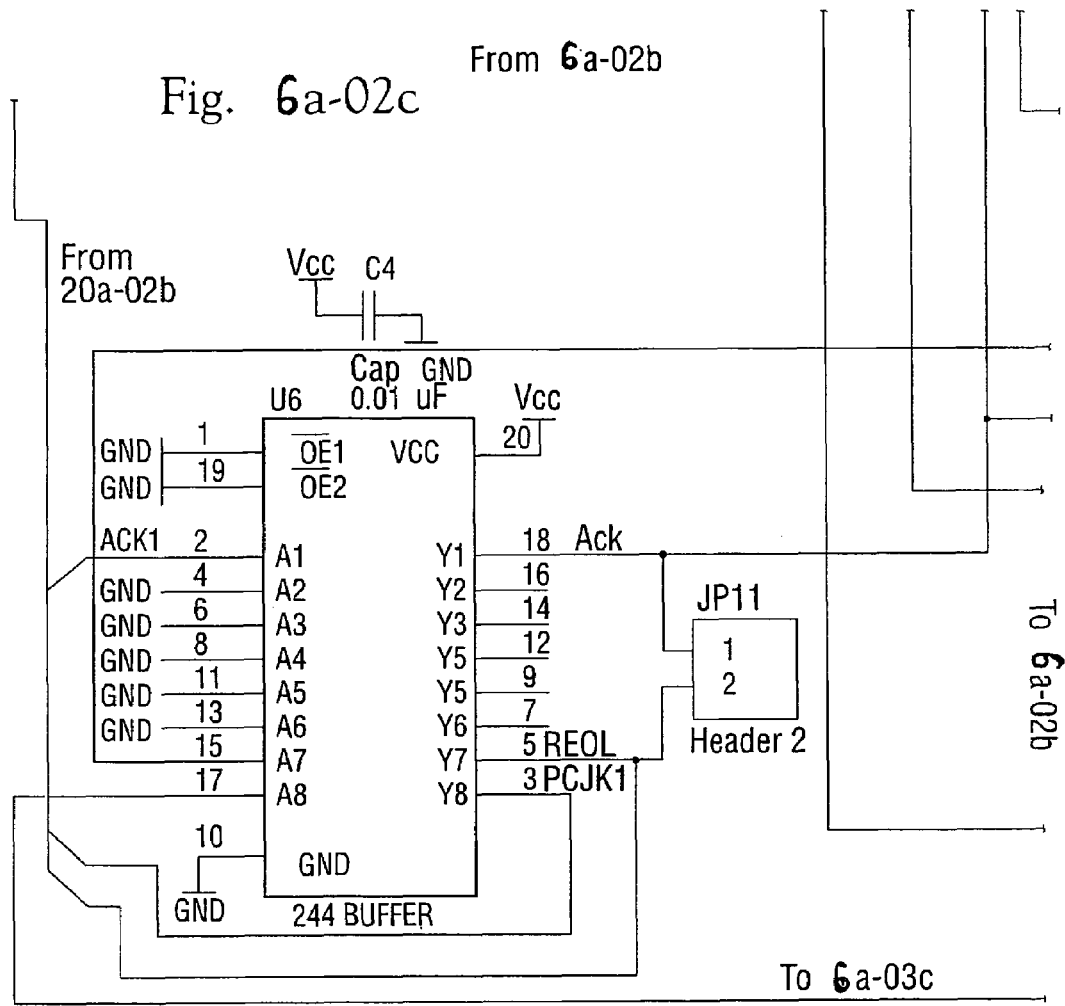
Figures 3C, 6A:
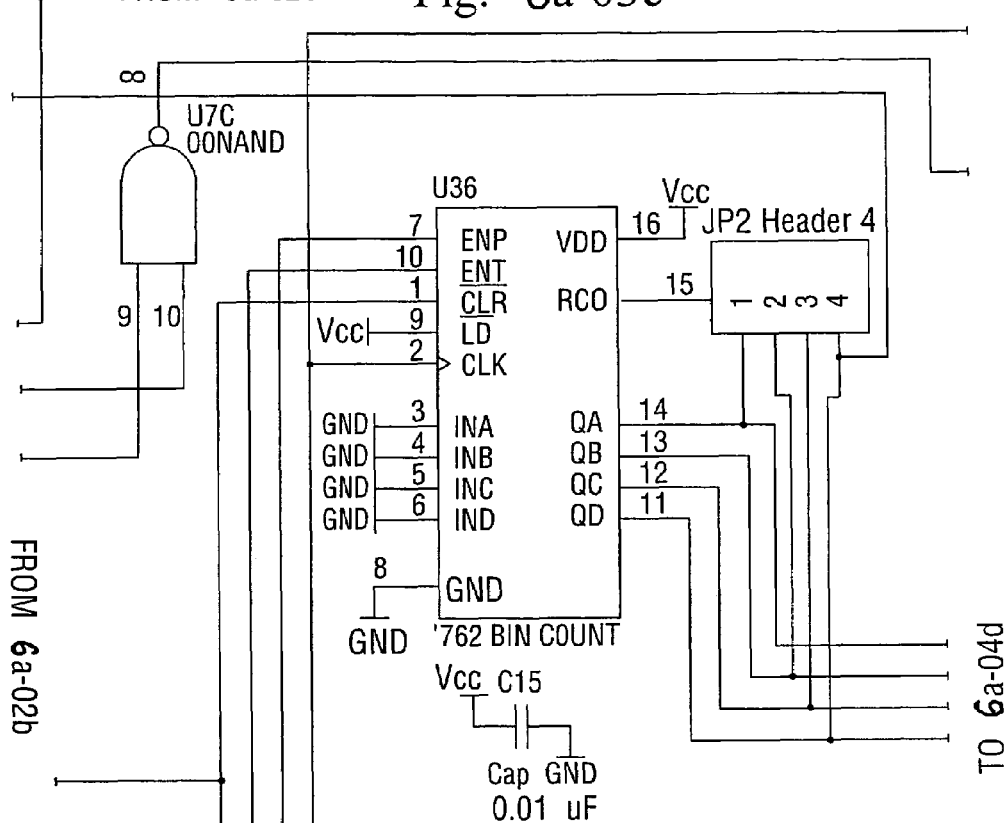
Figures 3D, 6A:
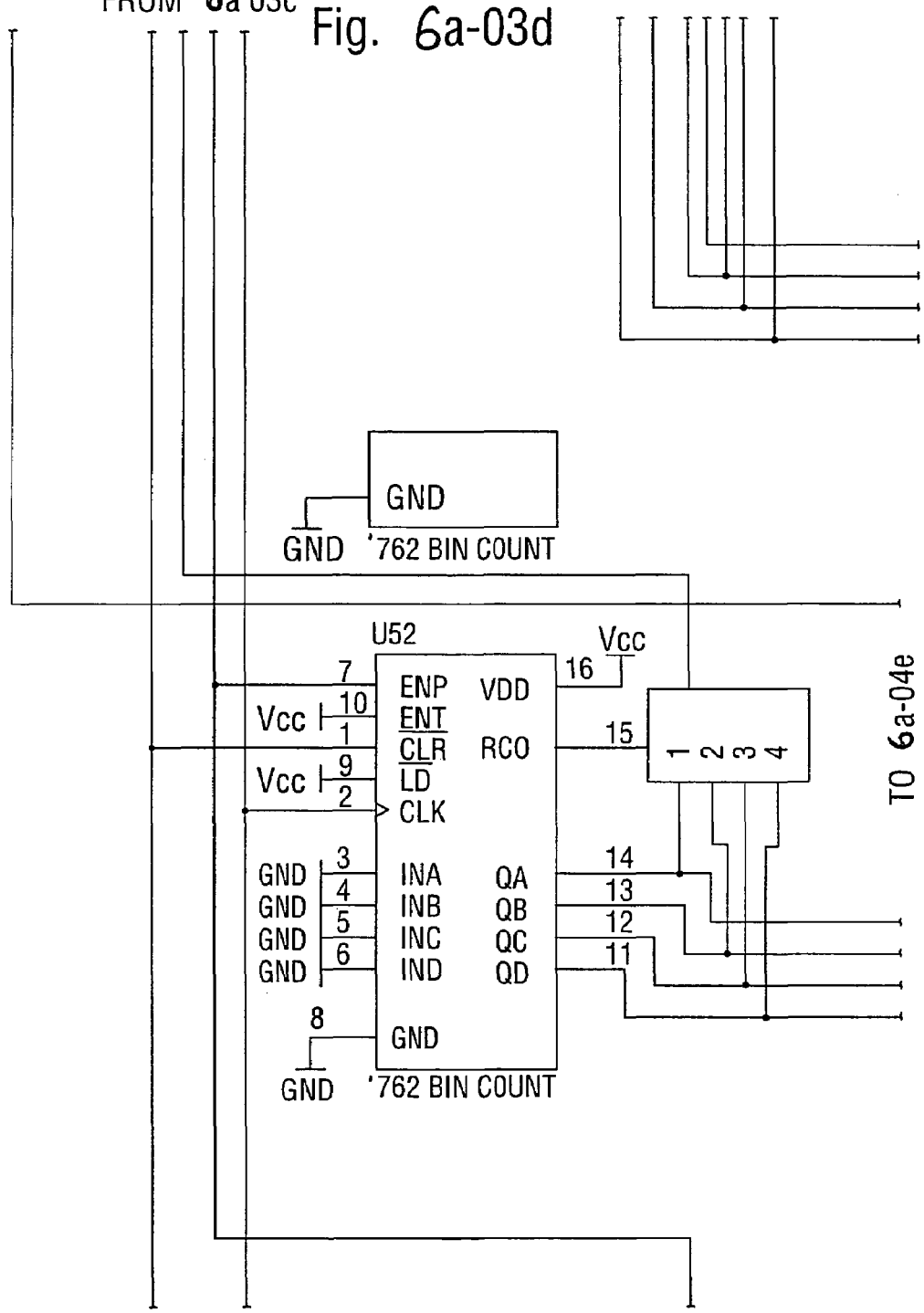
Figures 3E, 6A:
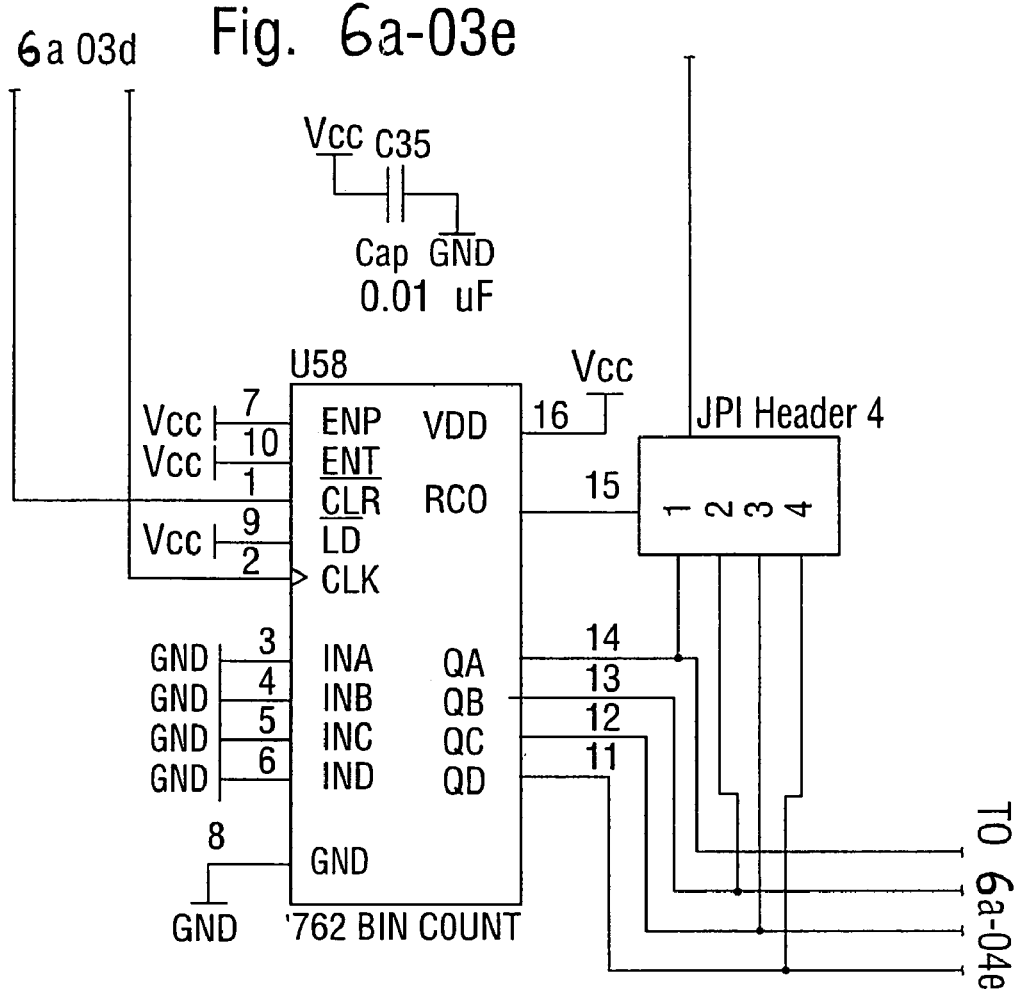
Figures 4A, 6A:
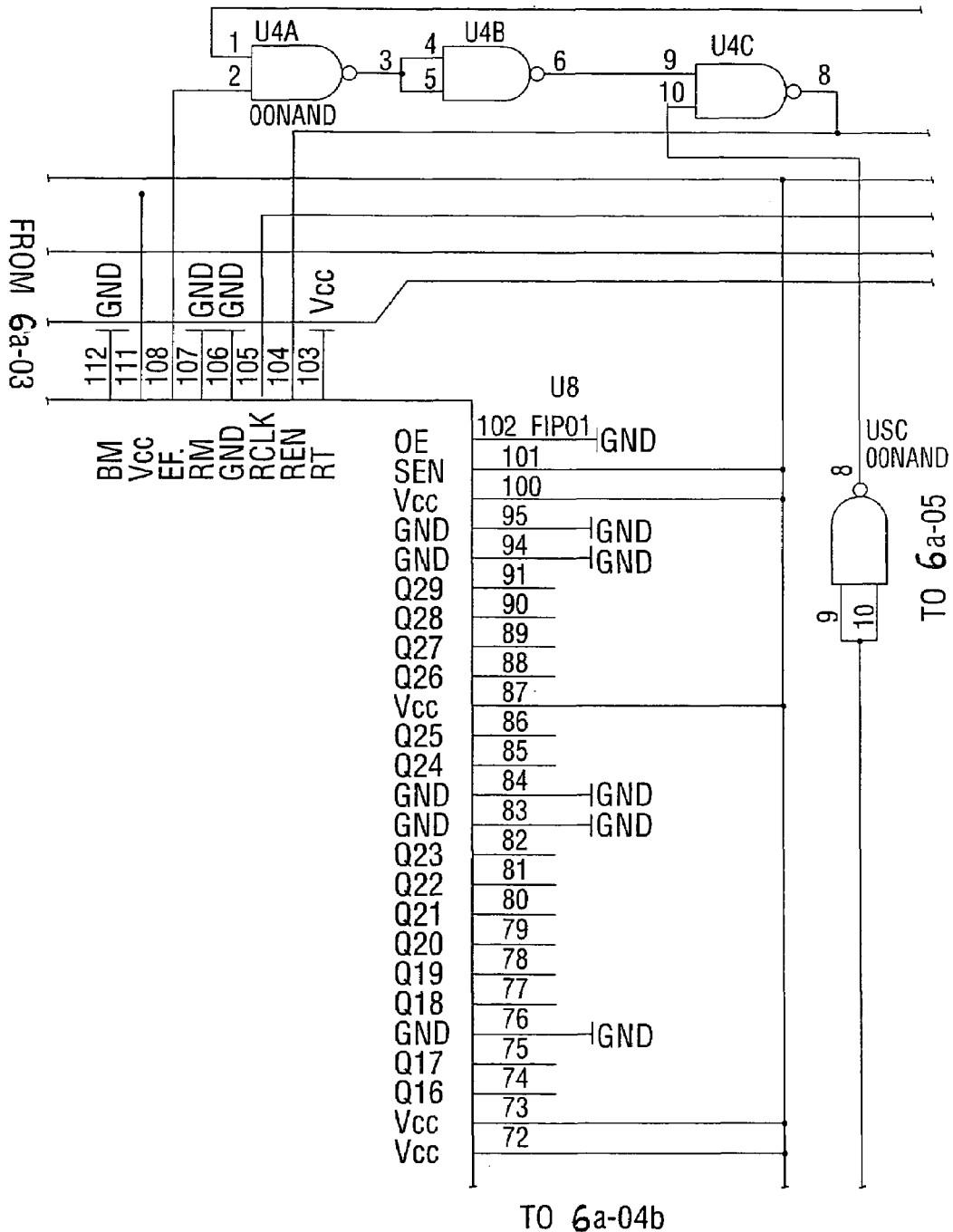
Figures 4B, 6A:
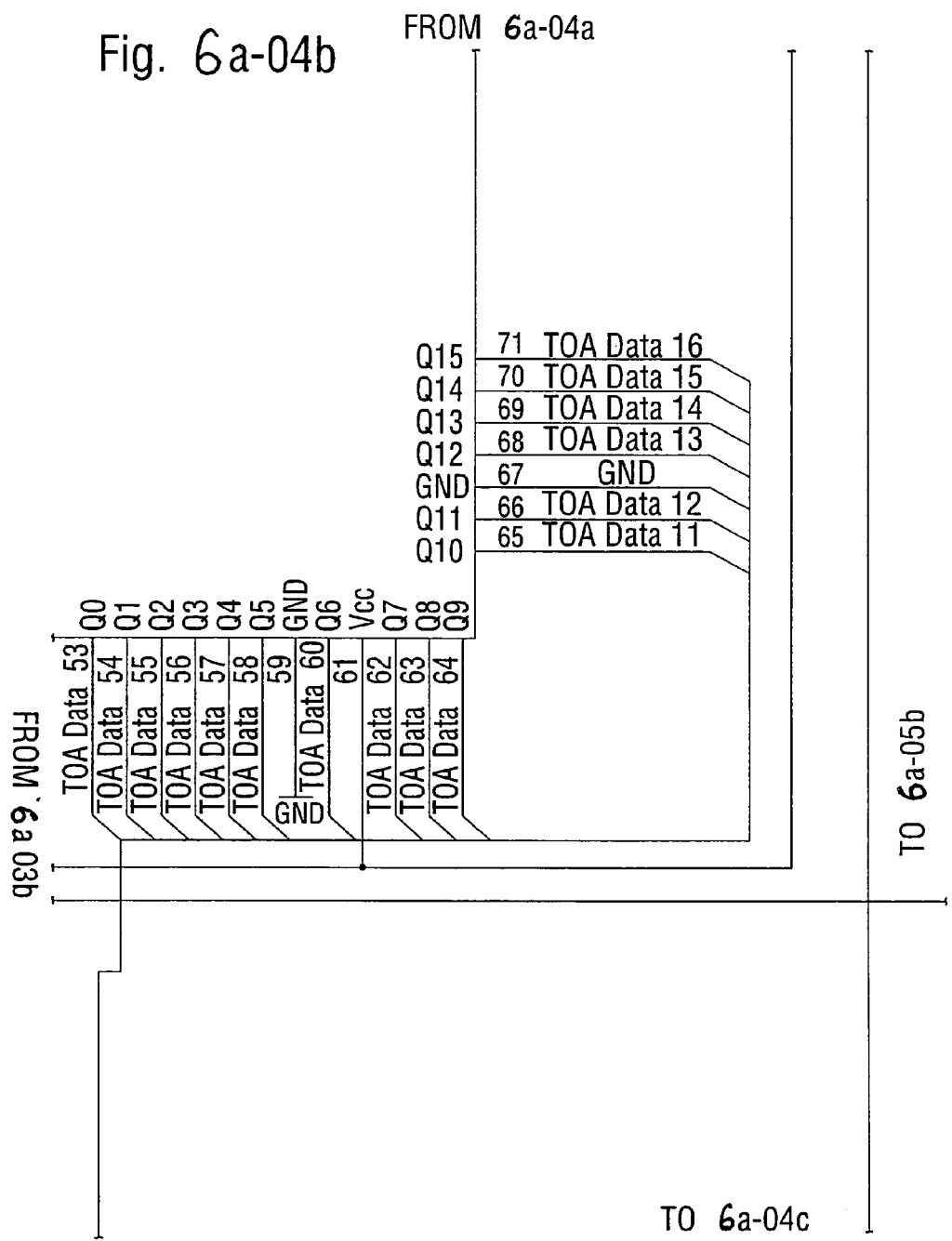
Figures 4C, 6A:
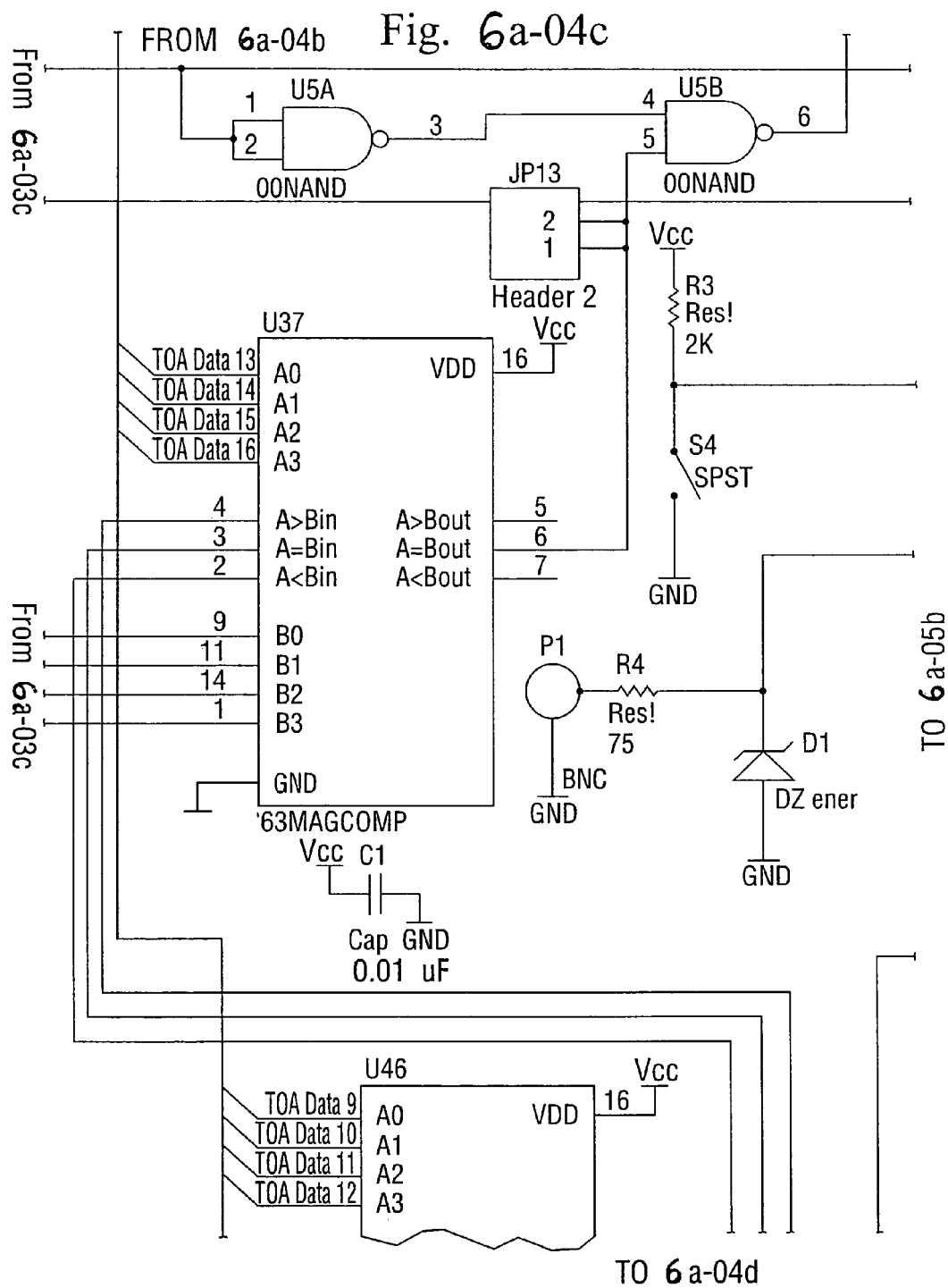
Figures 4D, 6A:
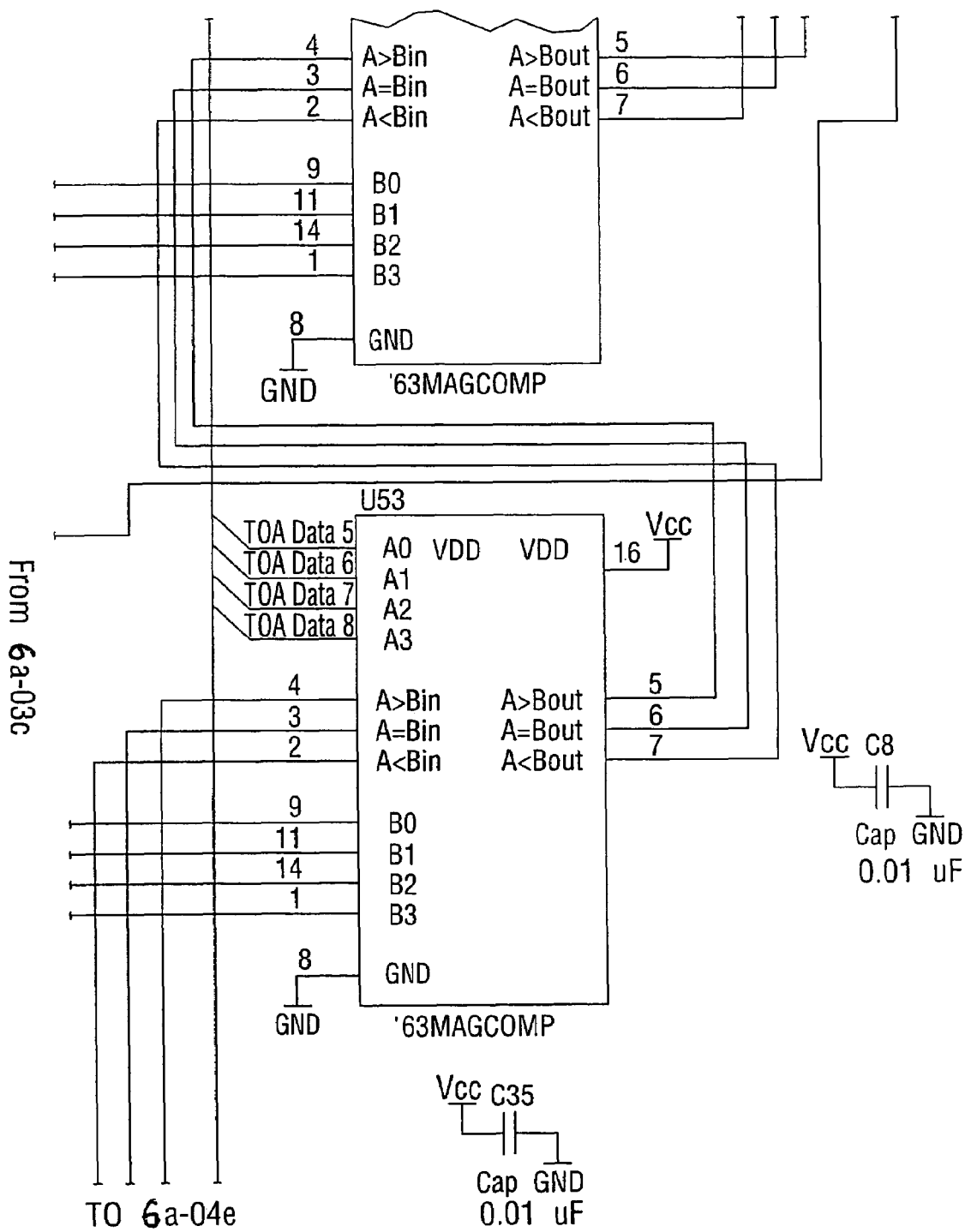
Figures 4E, 6A:
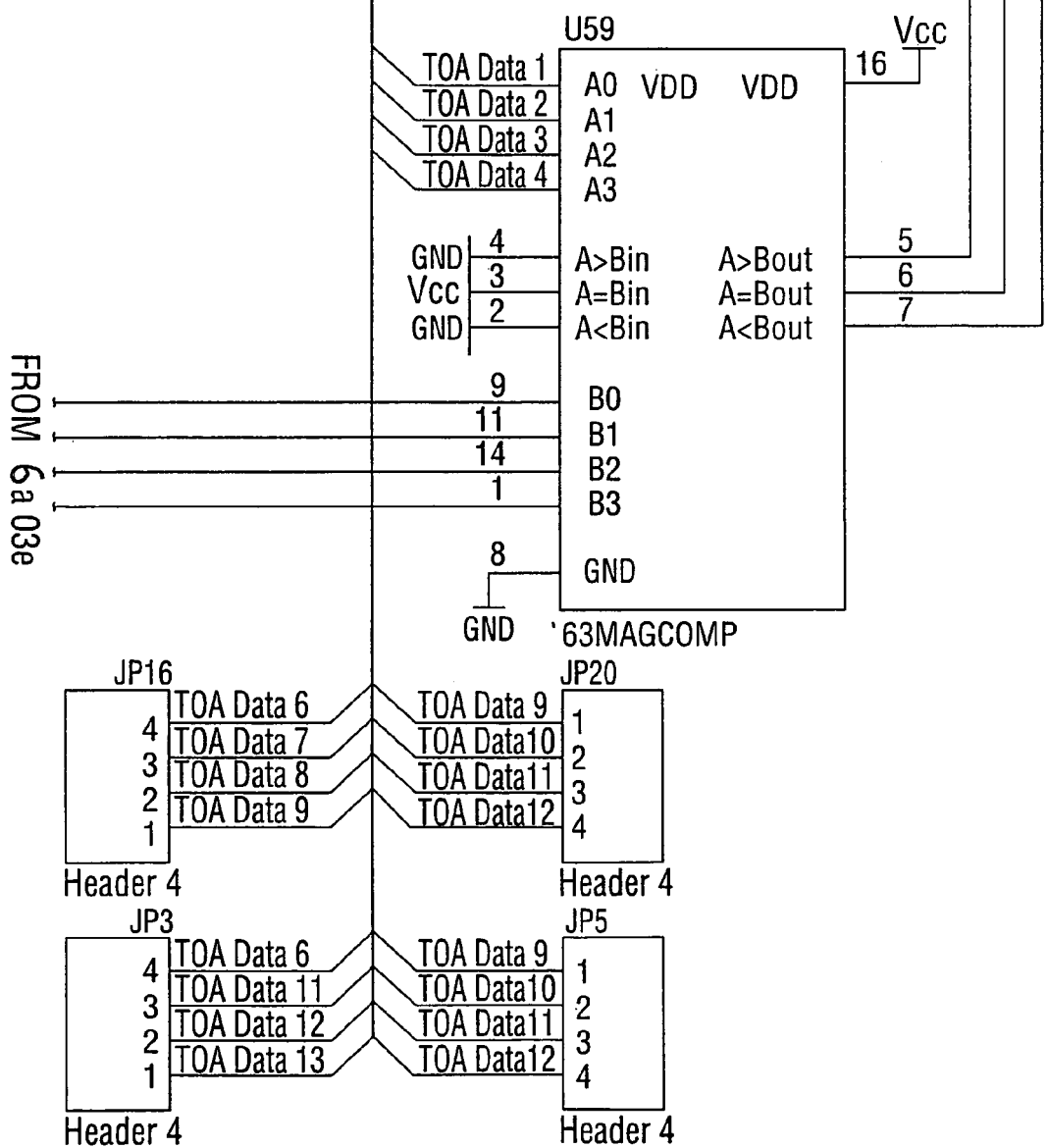
Figures 5A, 6A:
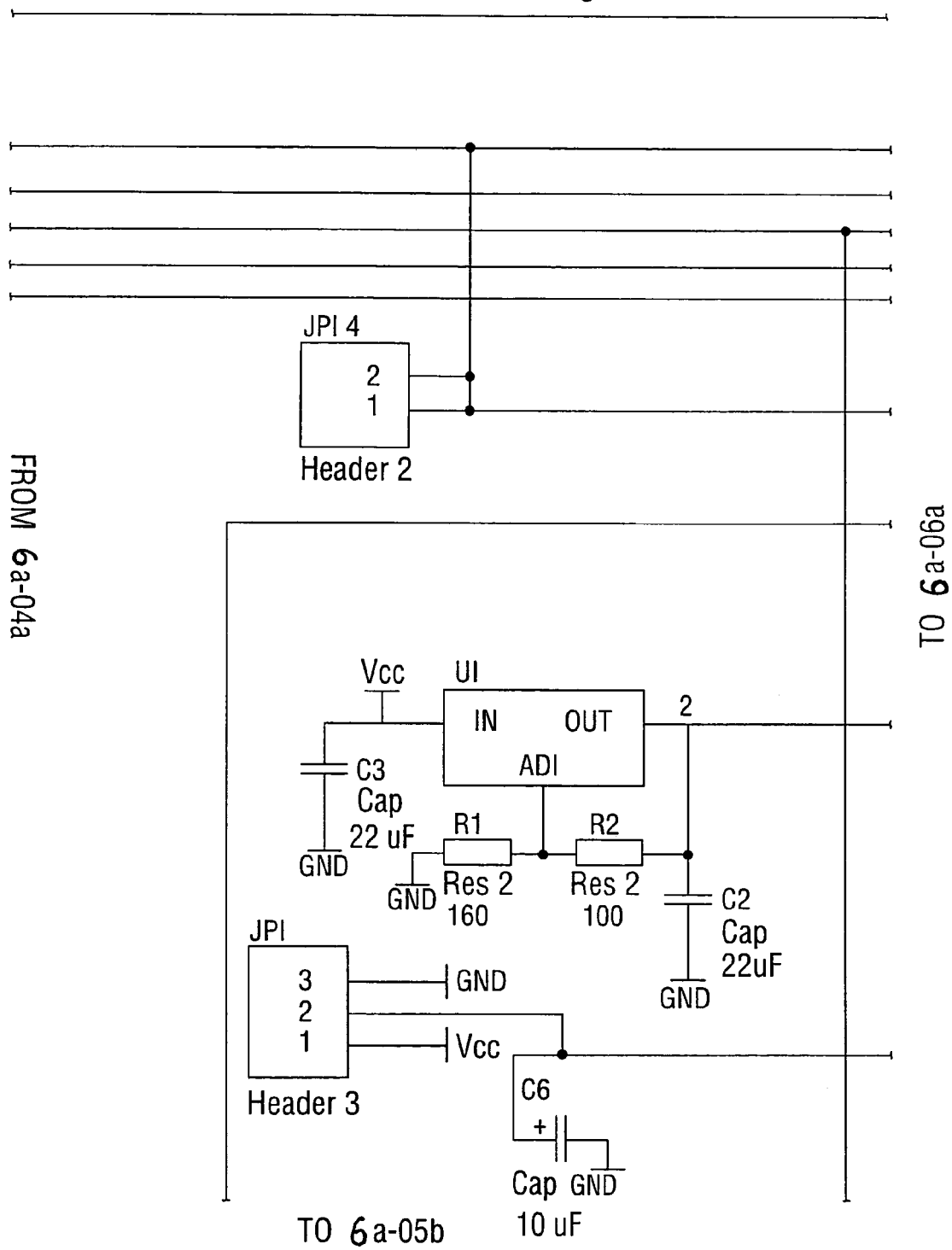
Figures 5B, 6A:
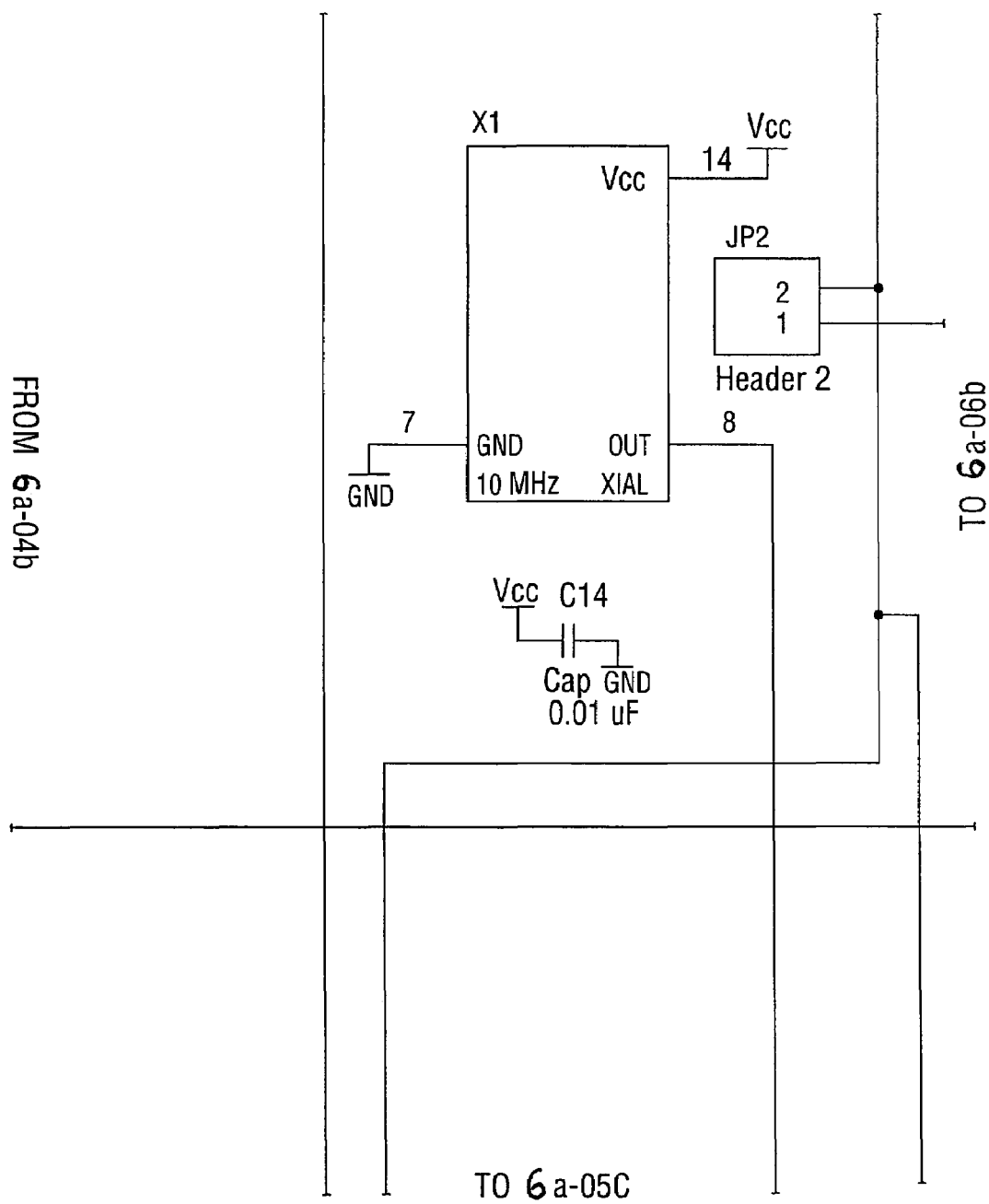
Figures 5C, 6A:
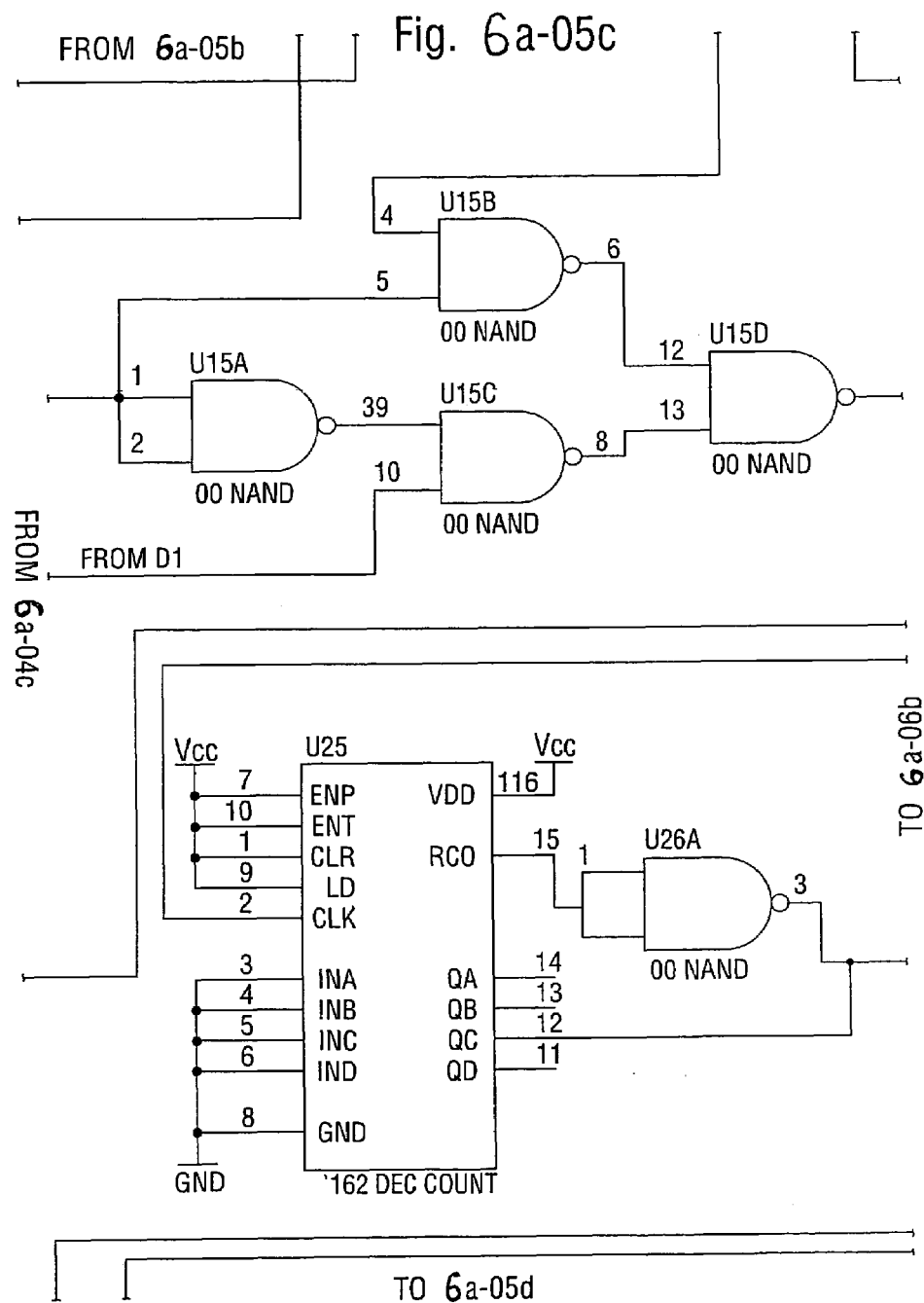
Figures 5E, 6A:
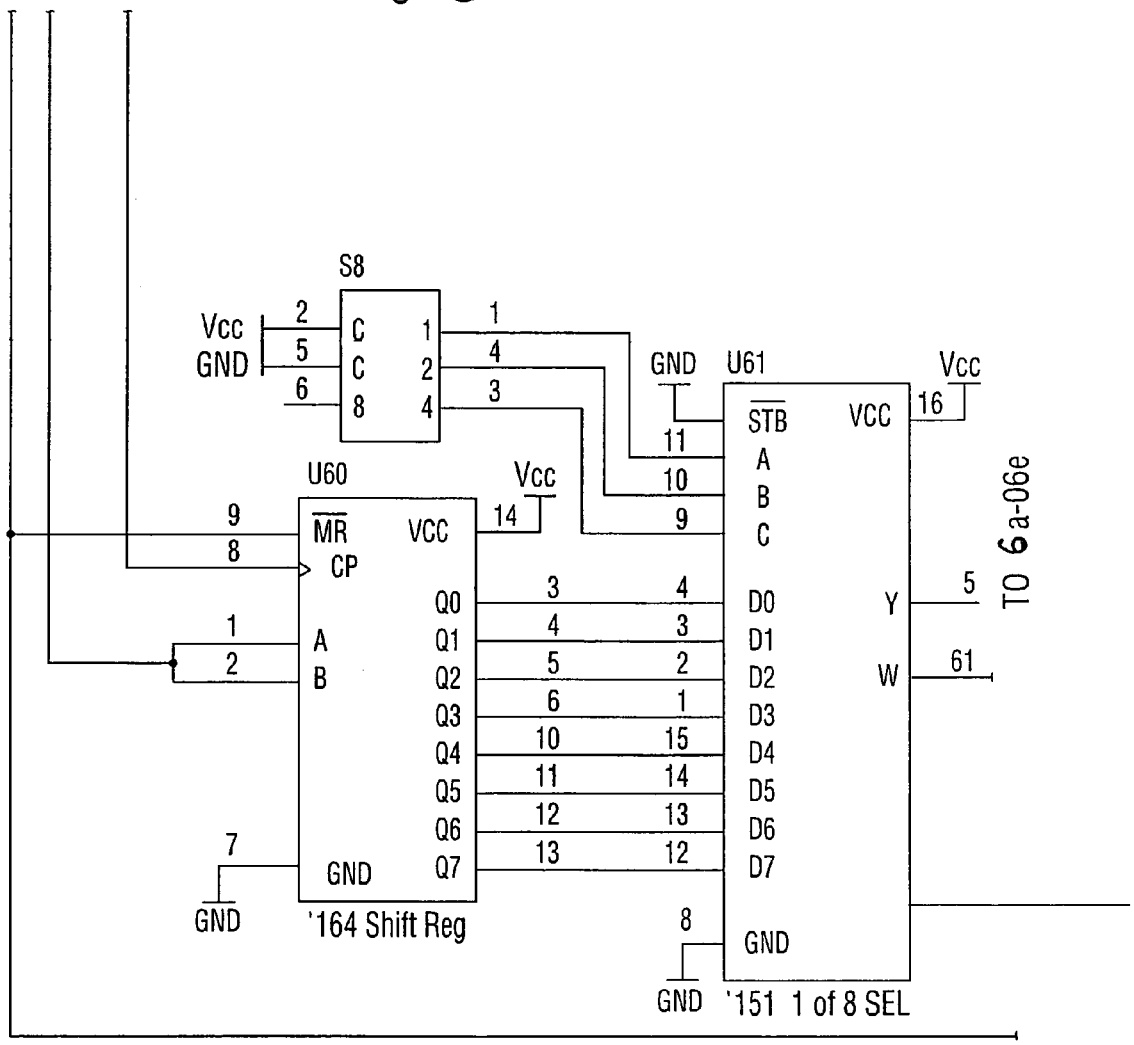
Figures 6A, 6B:
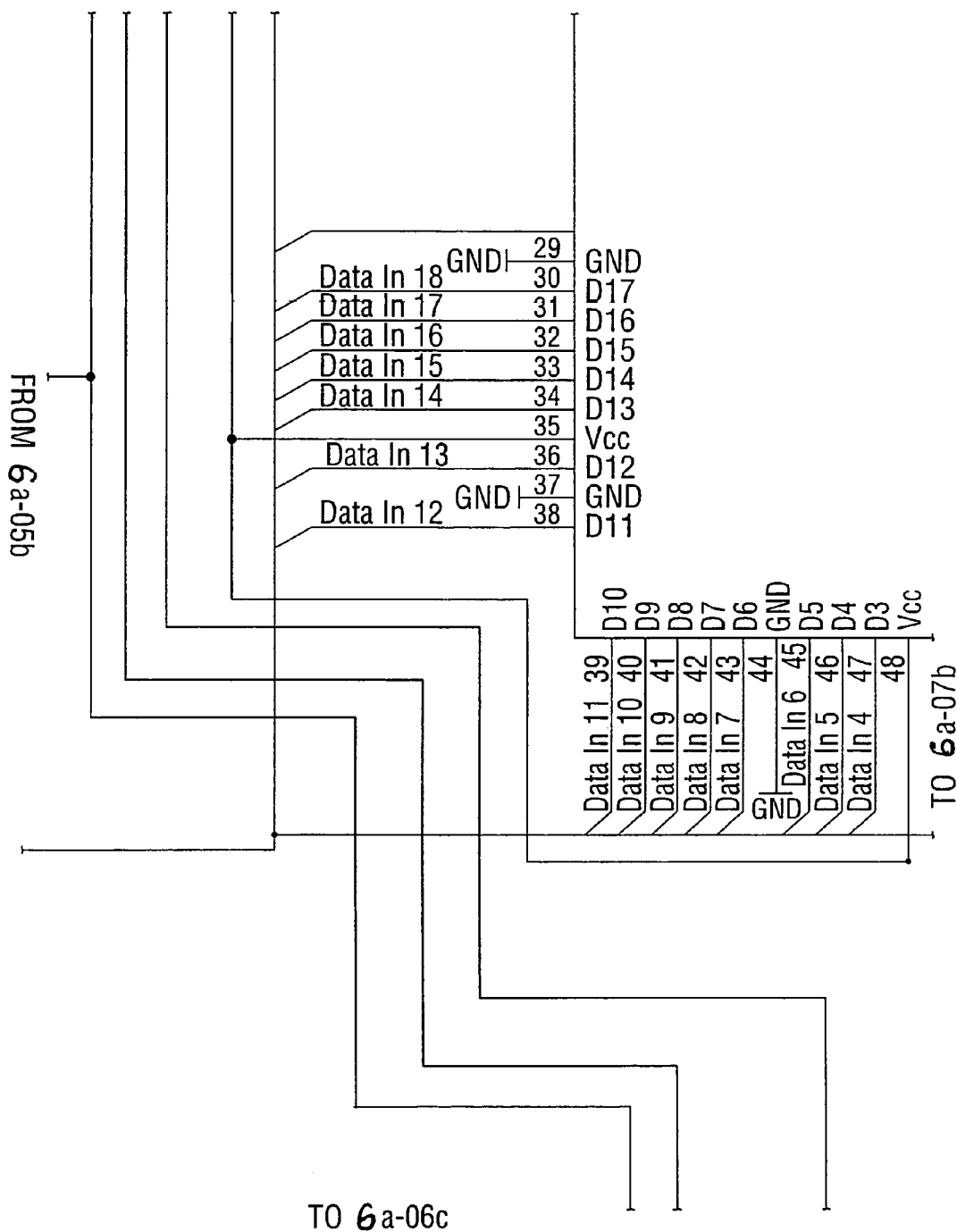
Figures 6A, 6B, 6C:
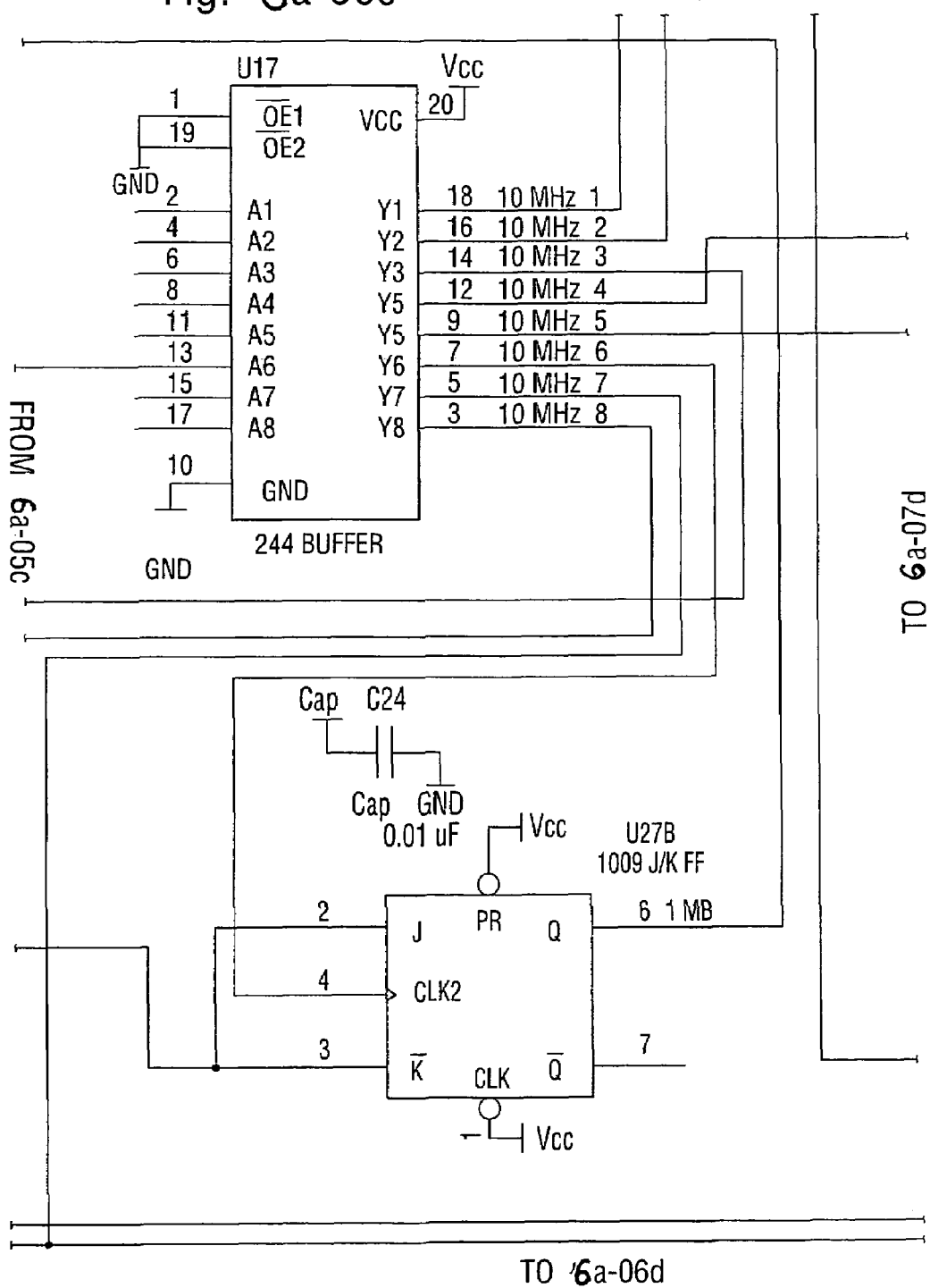
Figures 6, 6A, 7, 7A:
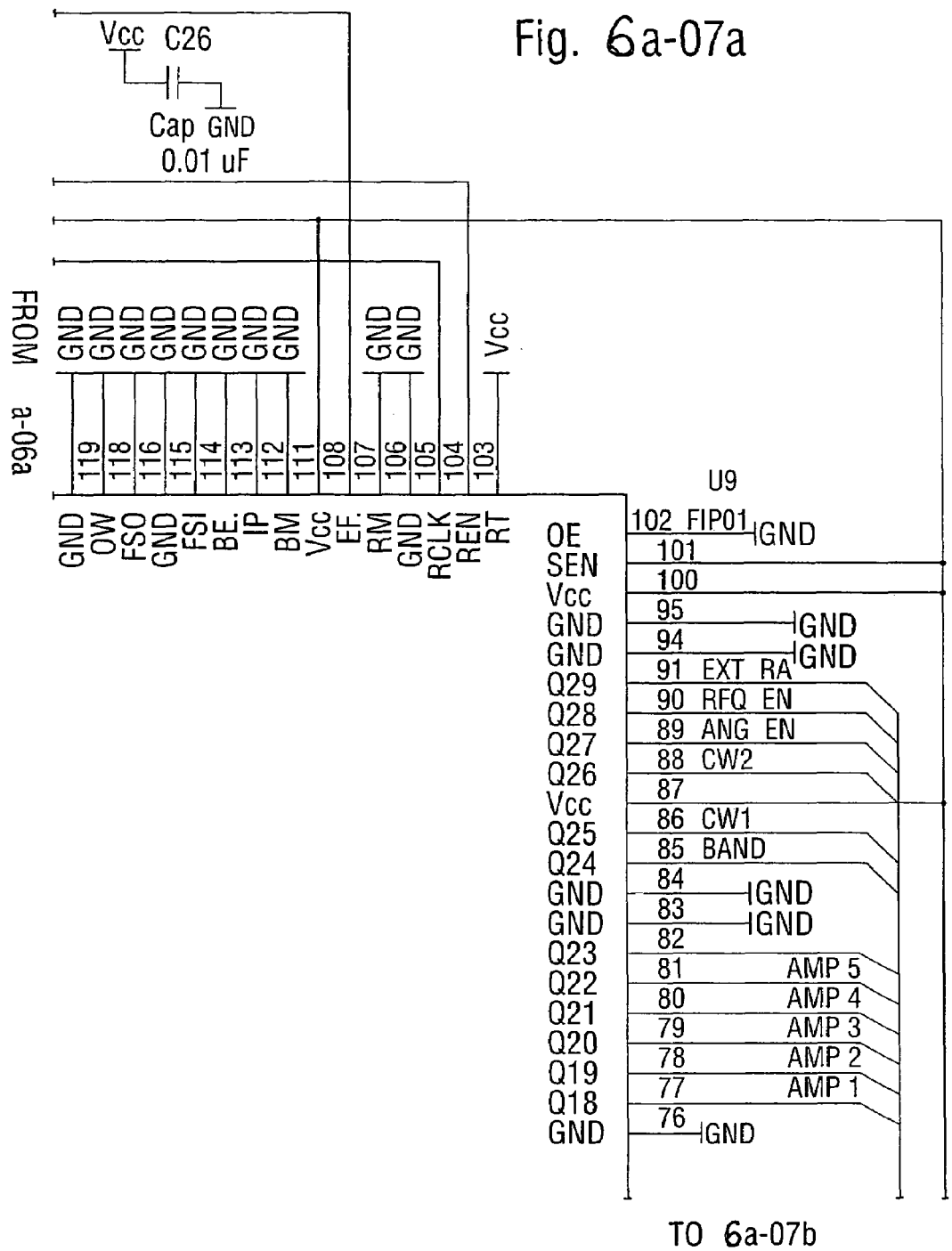
Figures 6, 6A, 7, 7B:
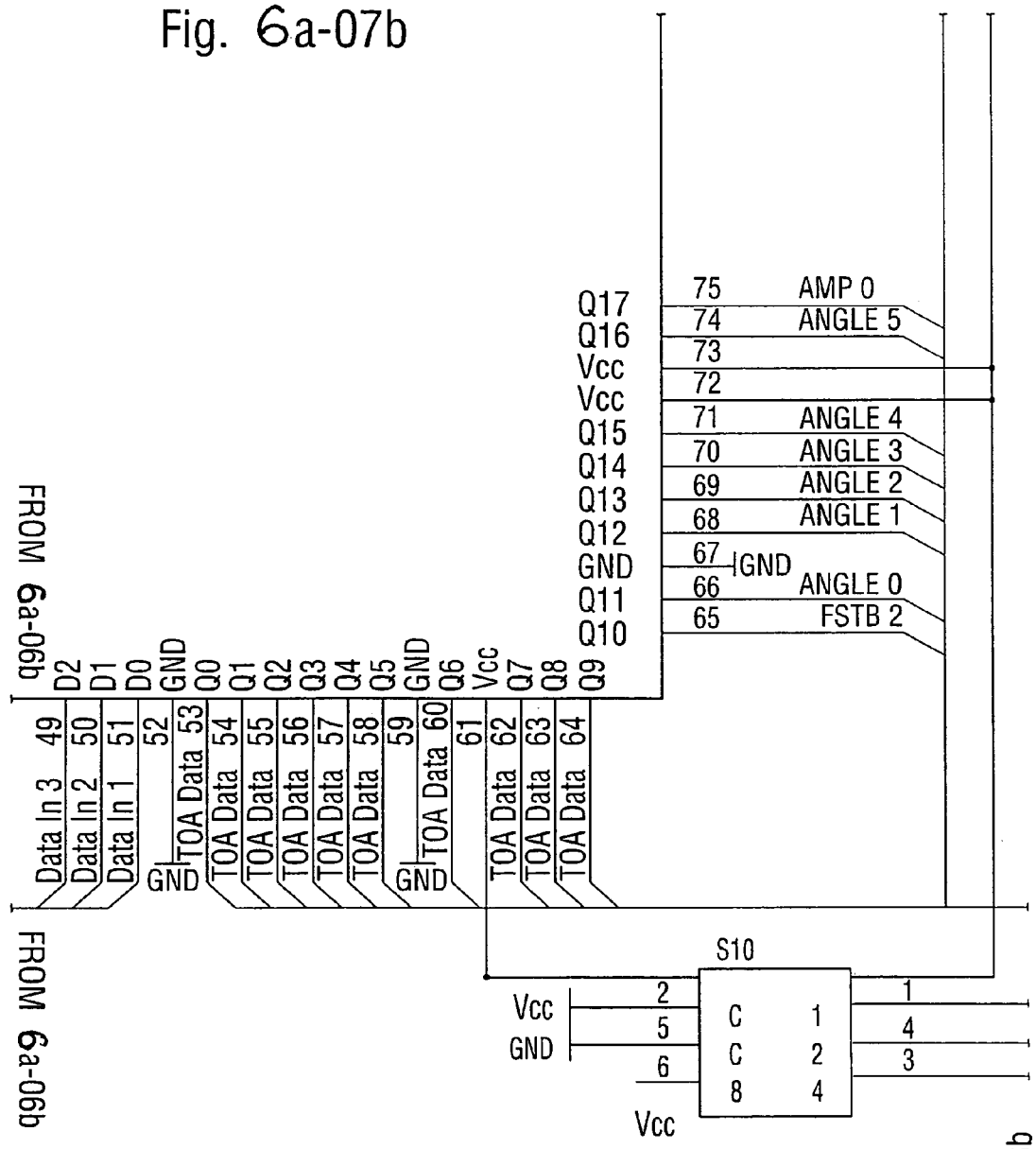
Figures 6, 6A, 7, 7C:
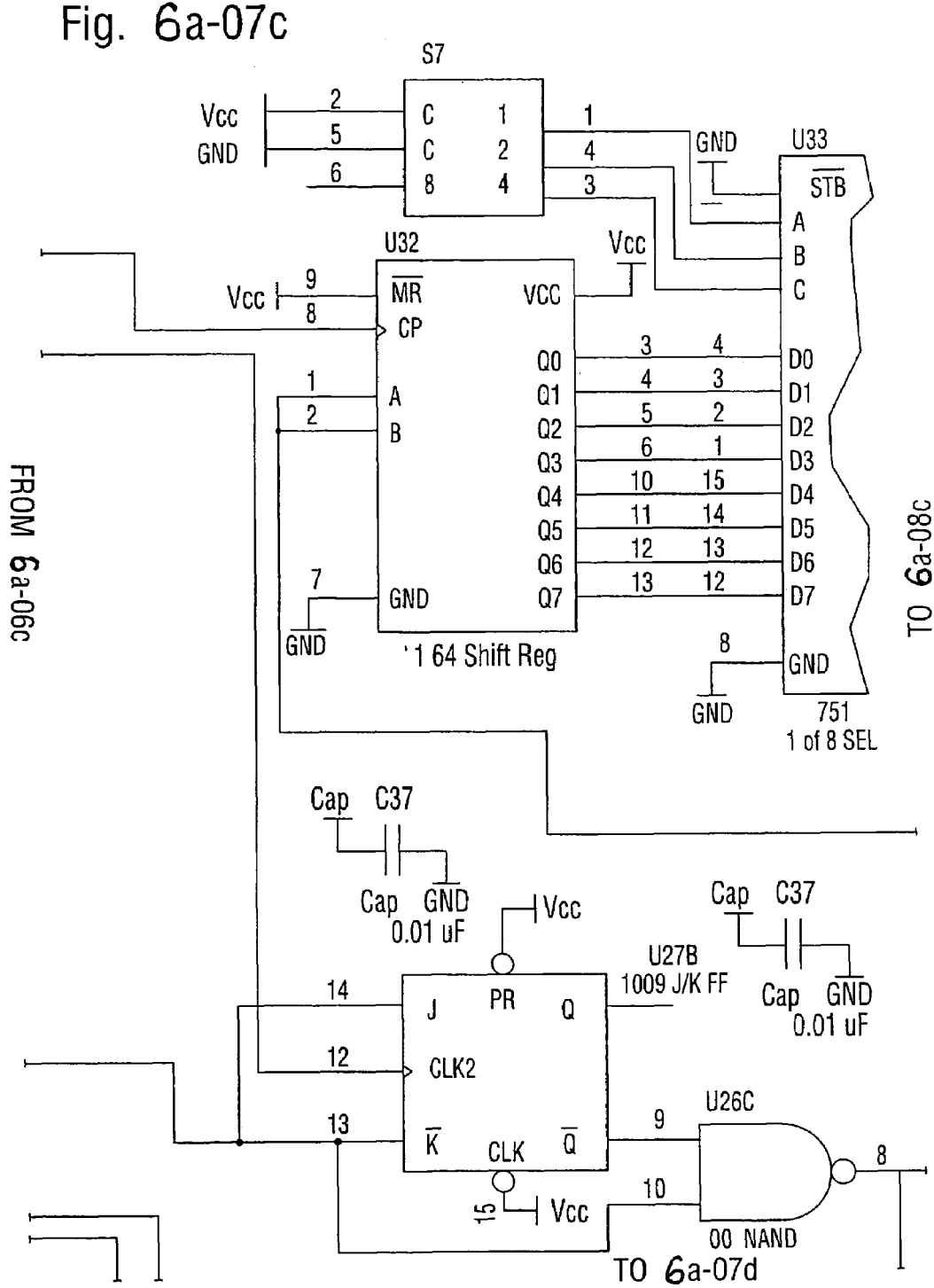
Figures 6, 6A, 7, 7D:
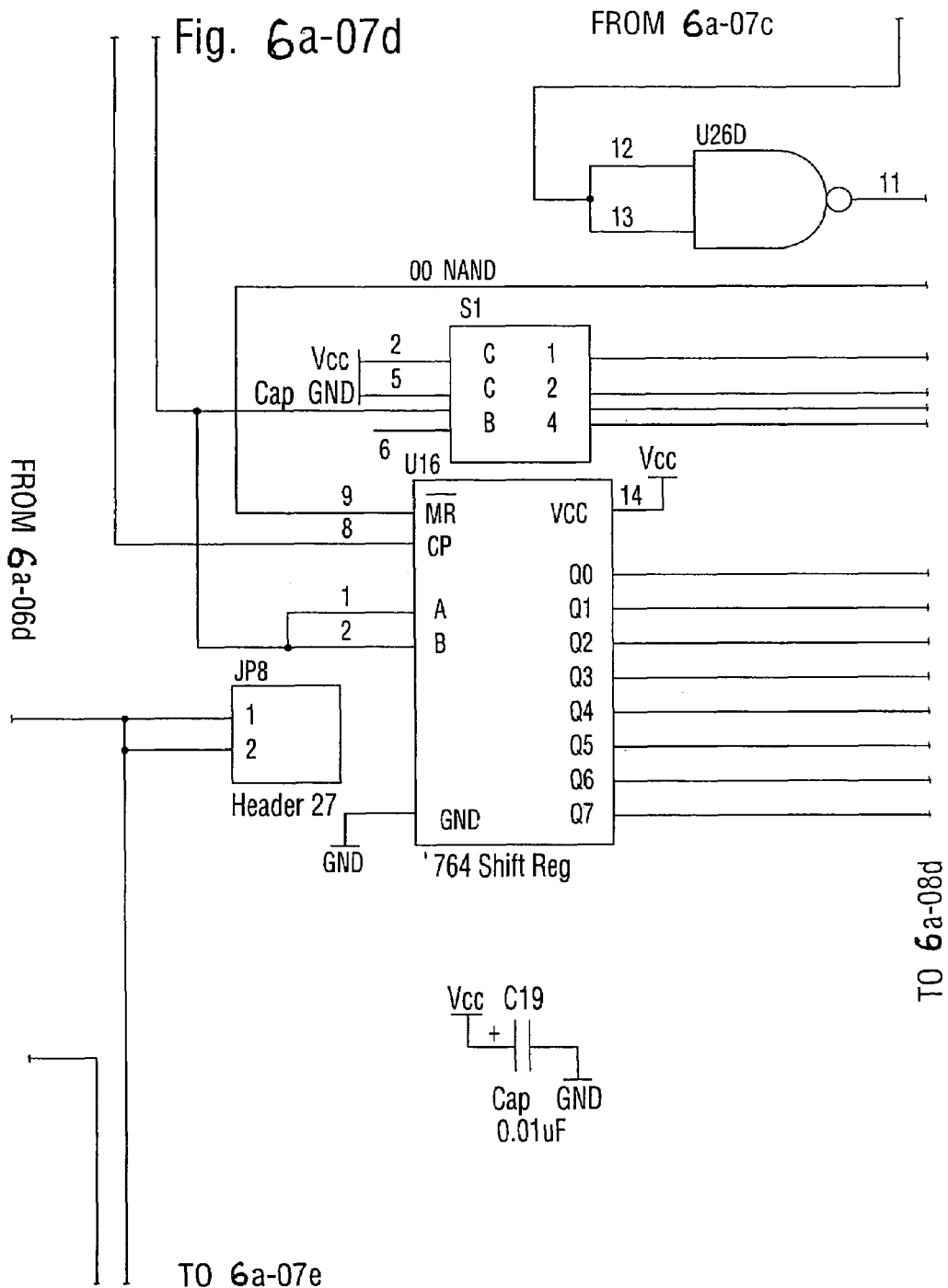
Figures 6, 6A, 7, 7E:
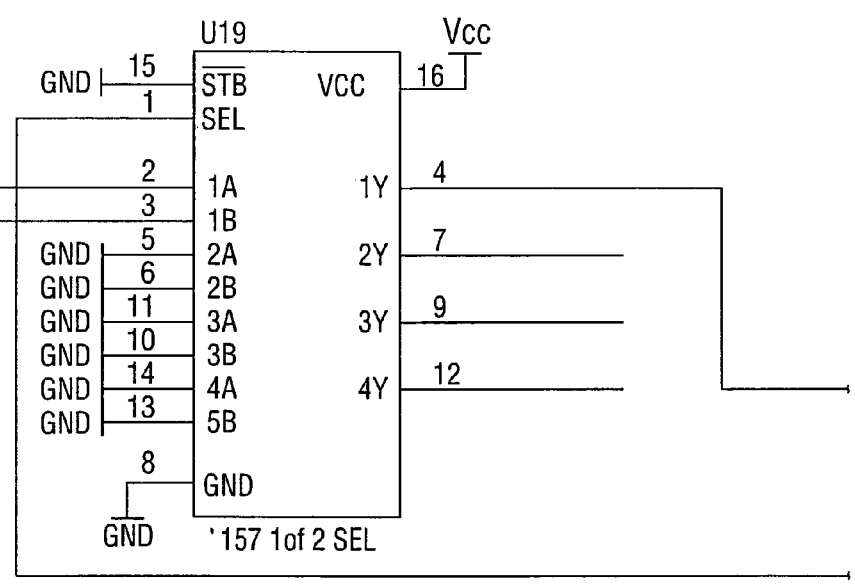
Figures 6, 6A, 7, 8, 8B:
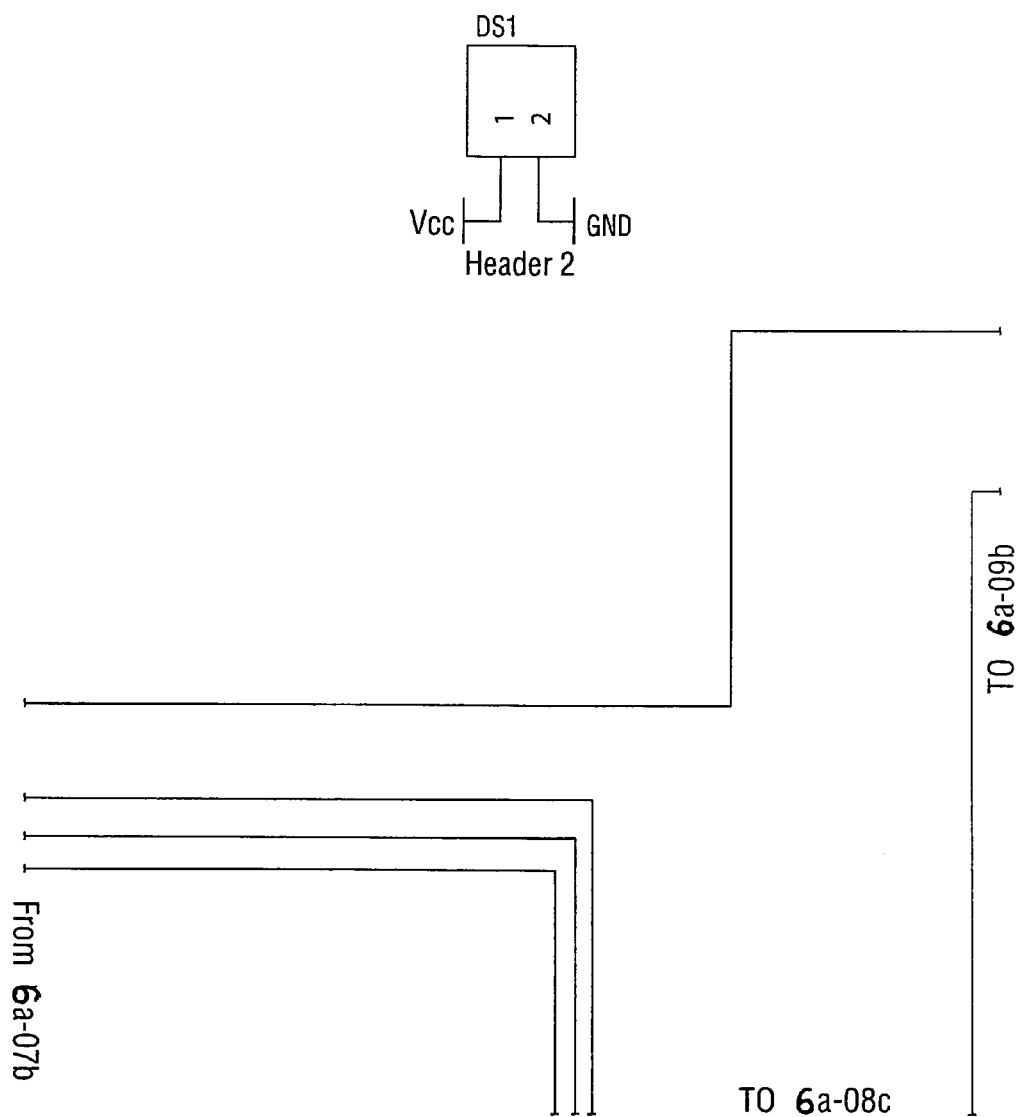
Figures 6, 6A, 7, 8, 8C:
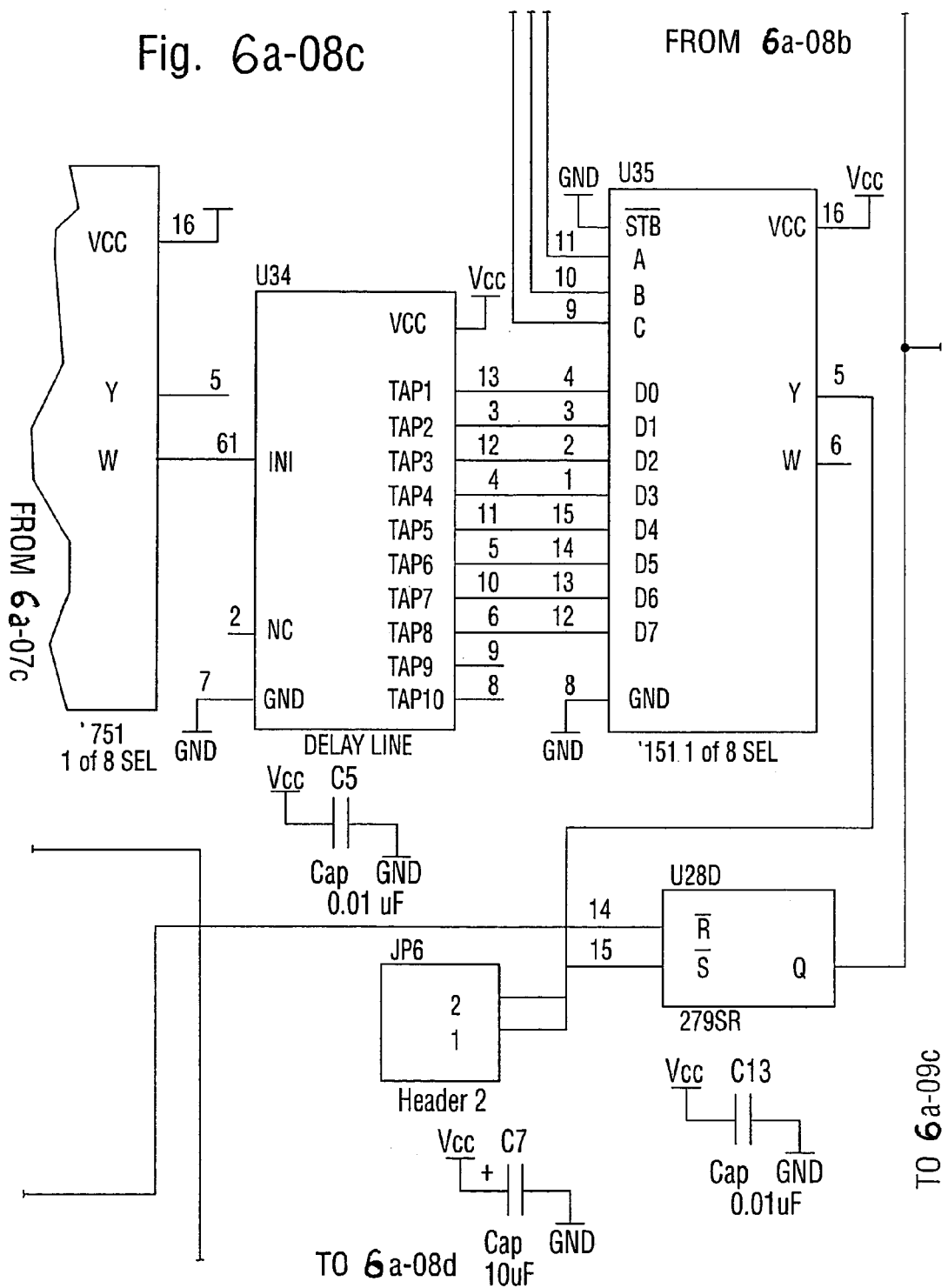
Figures 6, 6A, 7, 8, 8E:
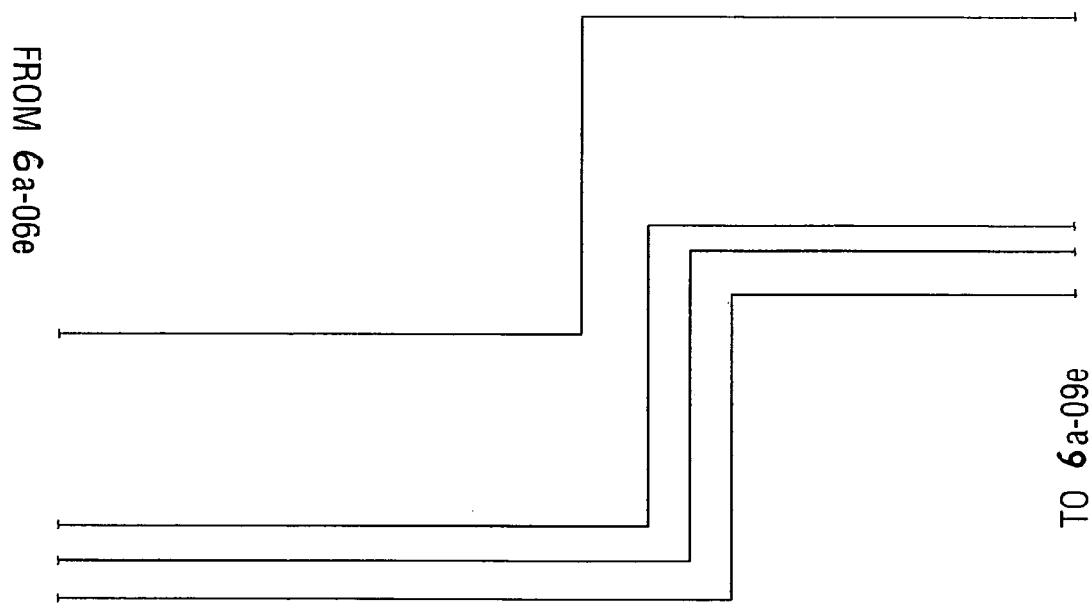
Figures 6, 6A, 7, 8, 9, 9A:
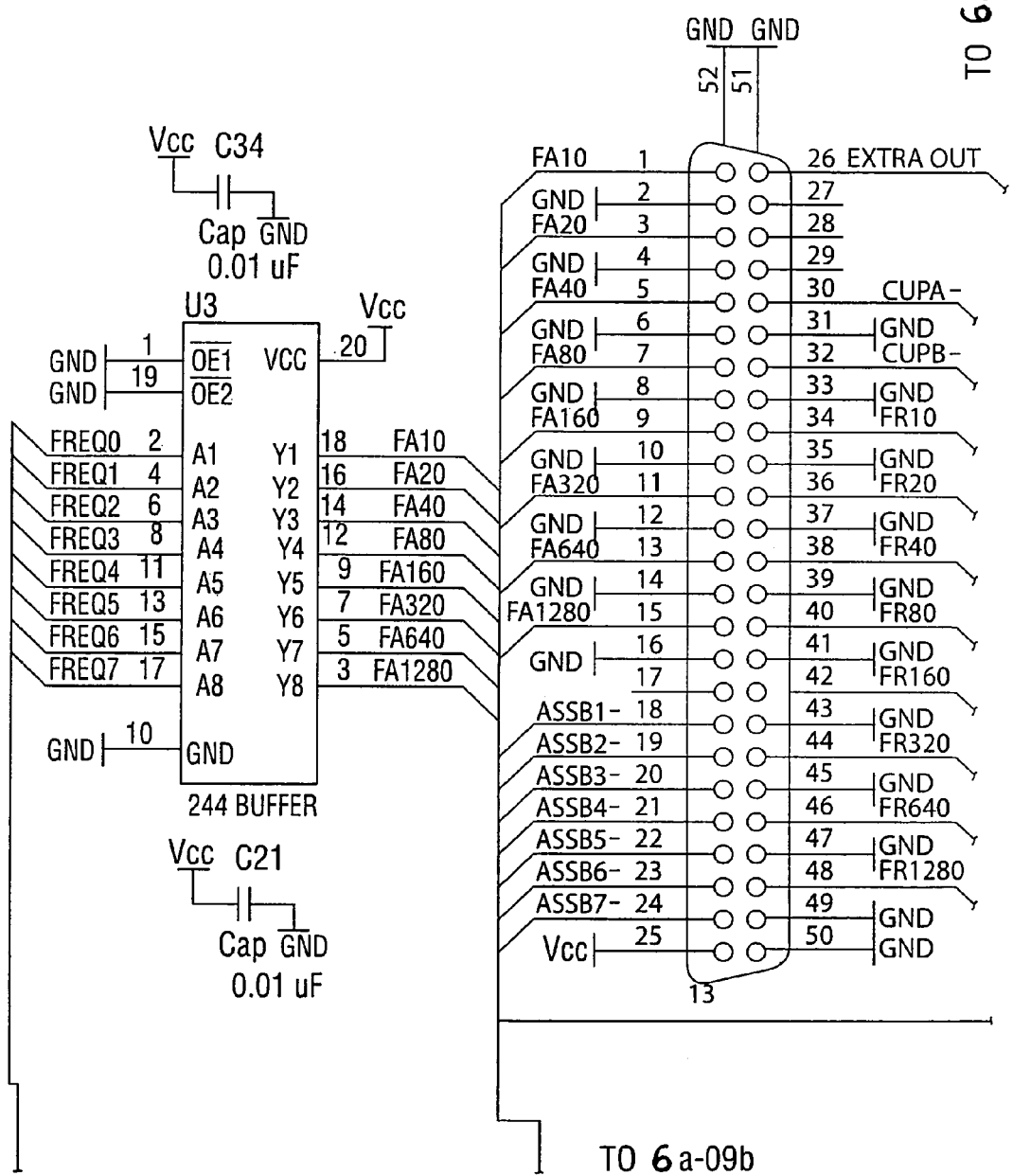
Figures 6, 6A, 7, 8, 9, 9B:
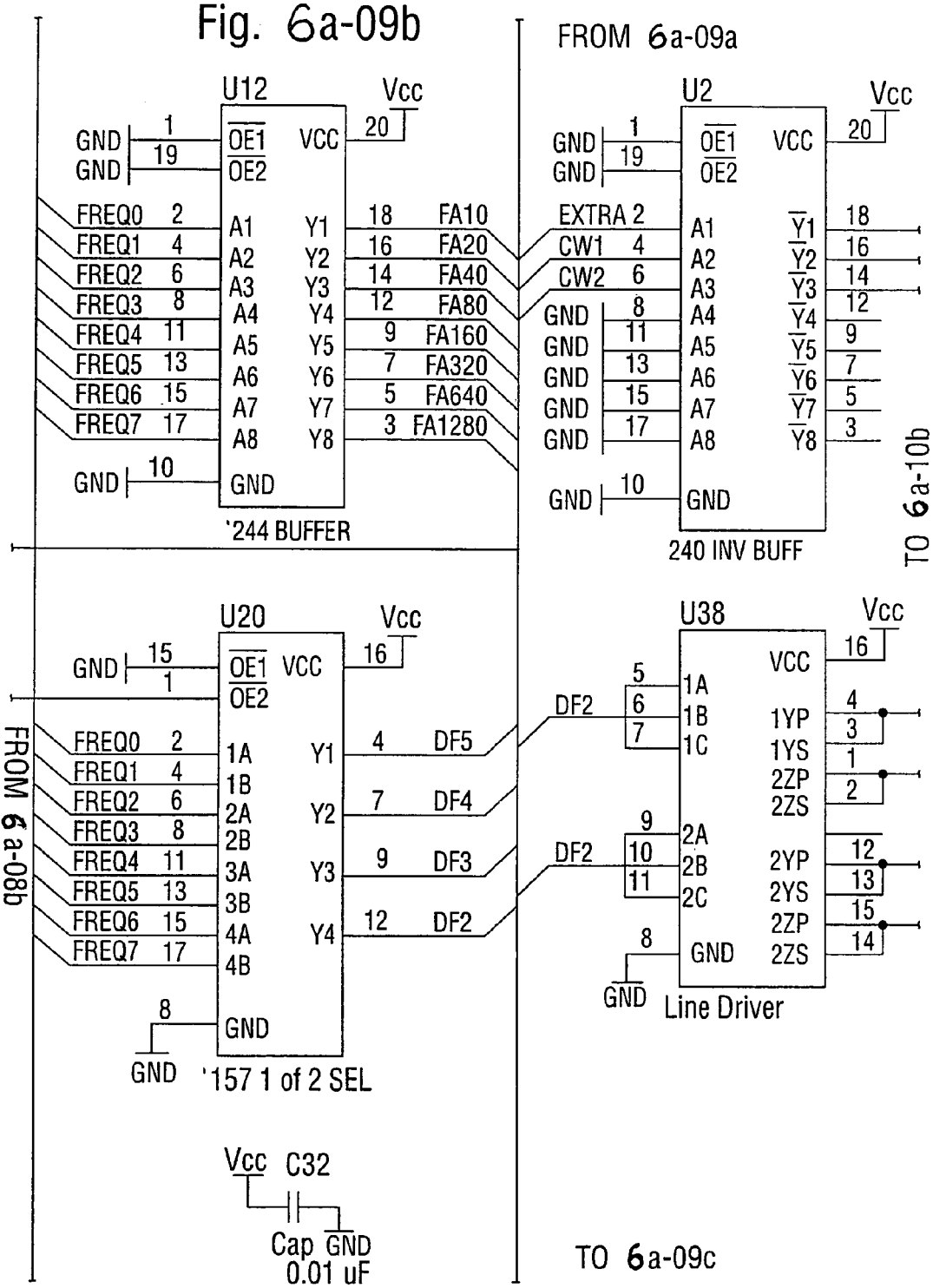
Figures 6, 6A, 7, 8, 9, 9D:
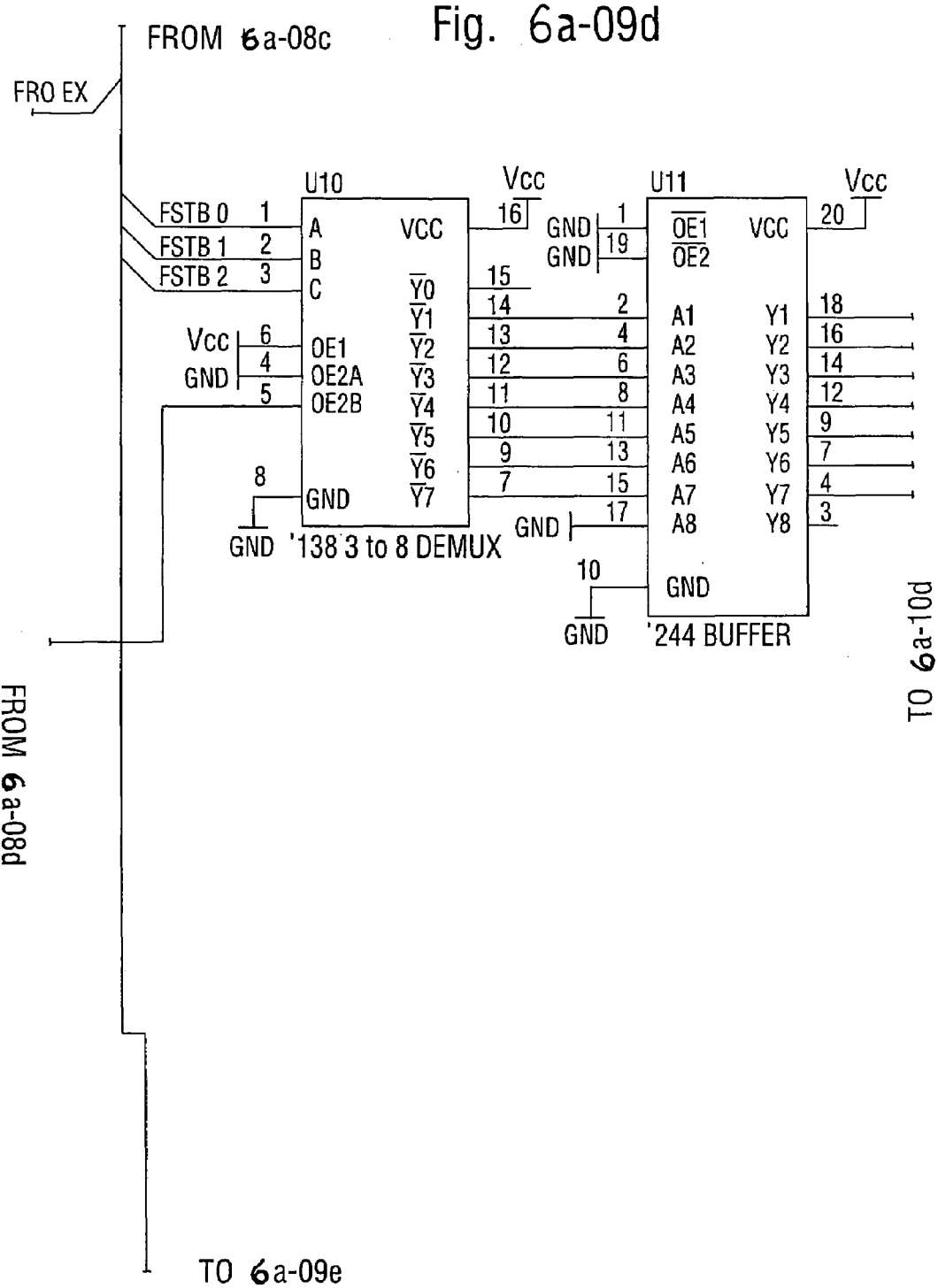
Figures 6, 6A, 7, 8, 9, 9E:
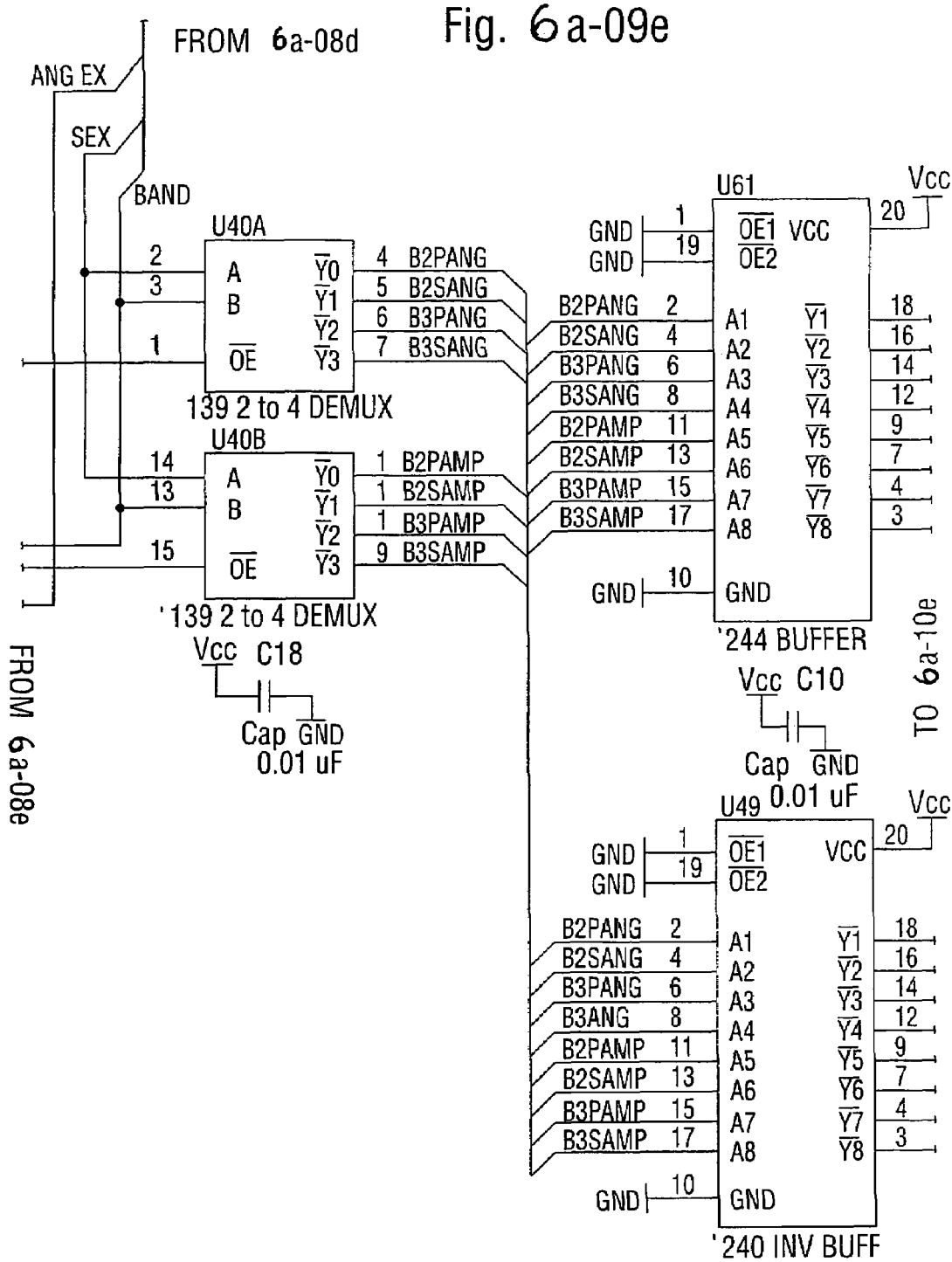
Figures 6, 6A, 7, 8, 9, 10, 10A:
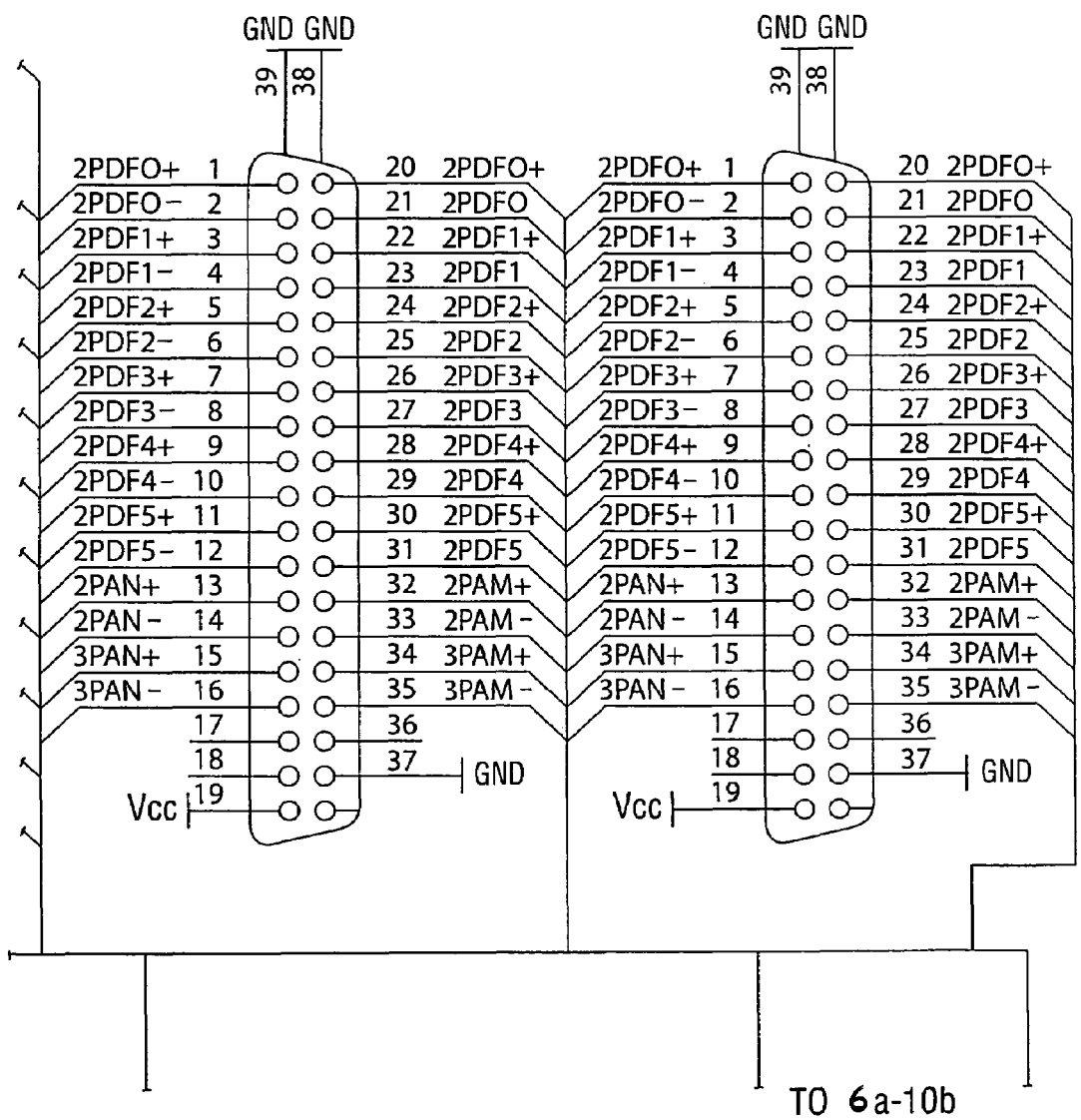
Figures 6, 6A, 7, 8, 9, 10, 10B:
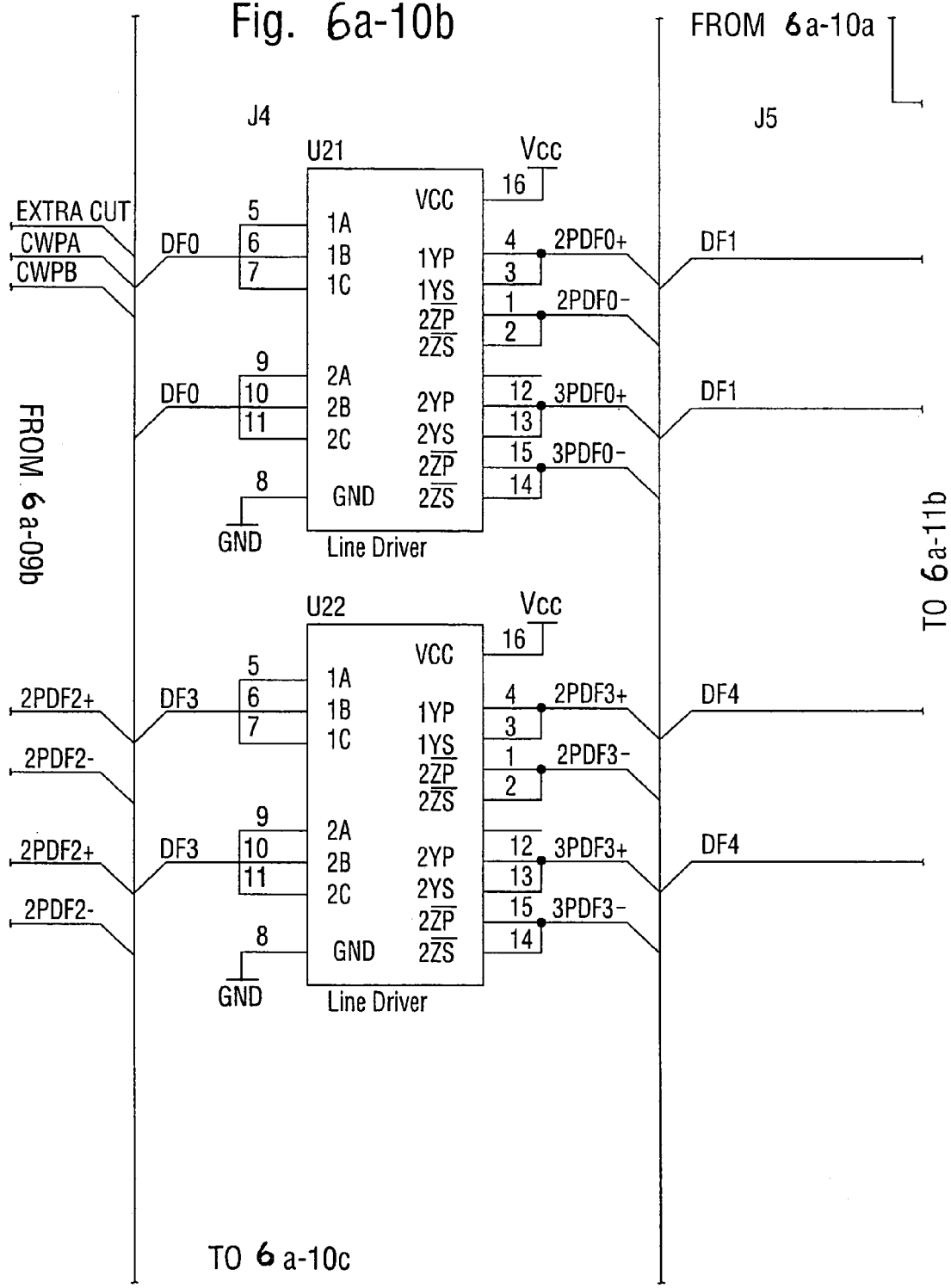
Figures 6, 6A, 7, 8, 9, 10, 11, 11B:
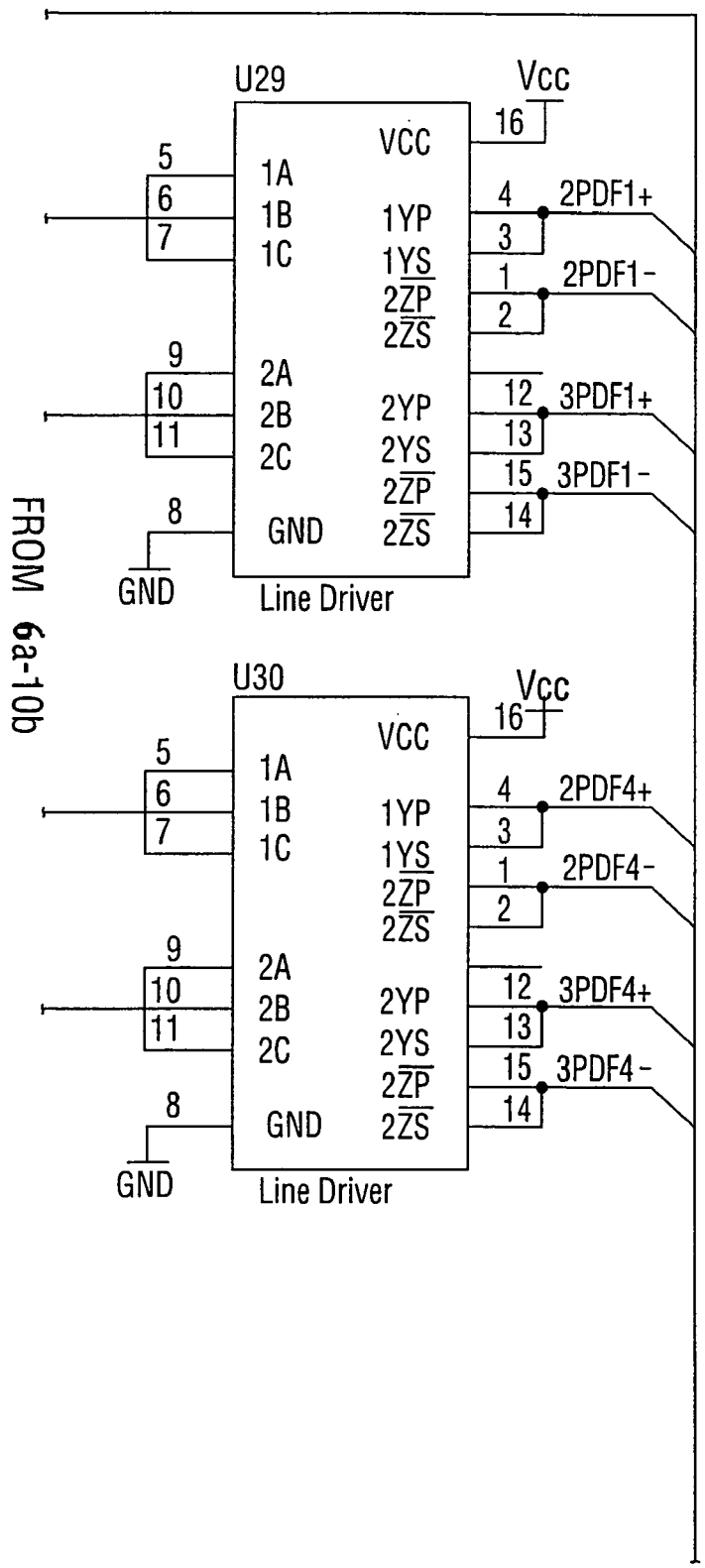
Figures 6, 6A, 7, 8, 9, 10, 11, 11D:
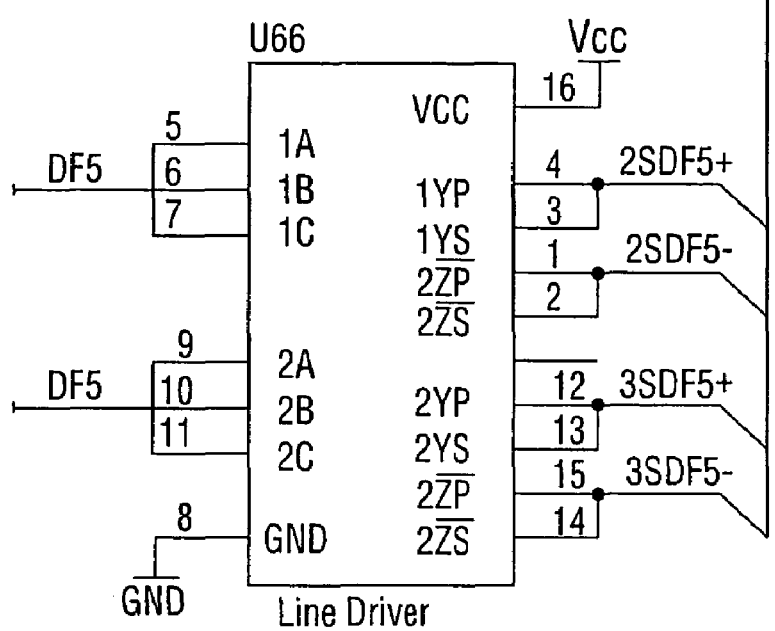
Figures 1A, 7A:
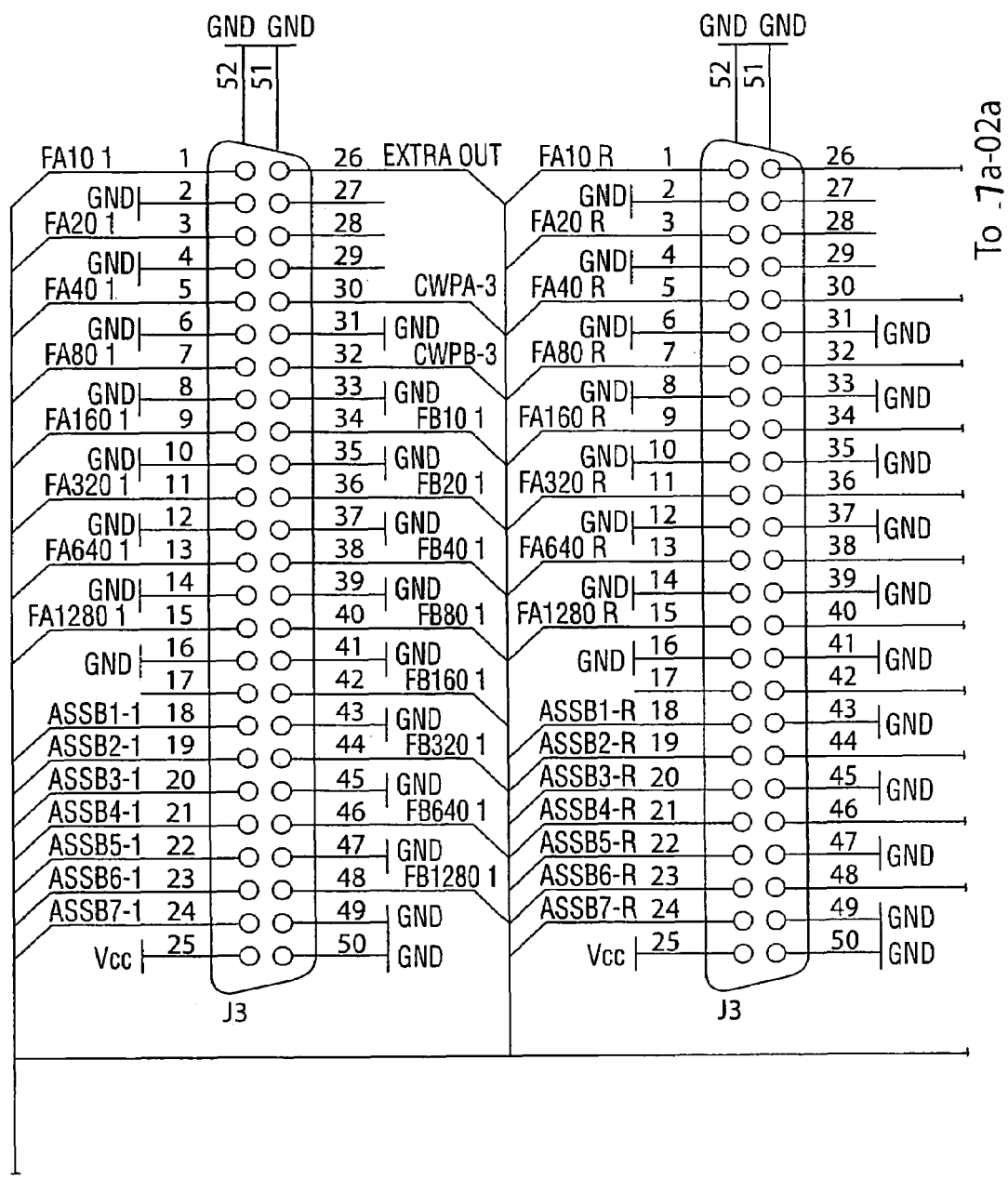
Figures 1B, 7A:
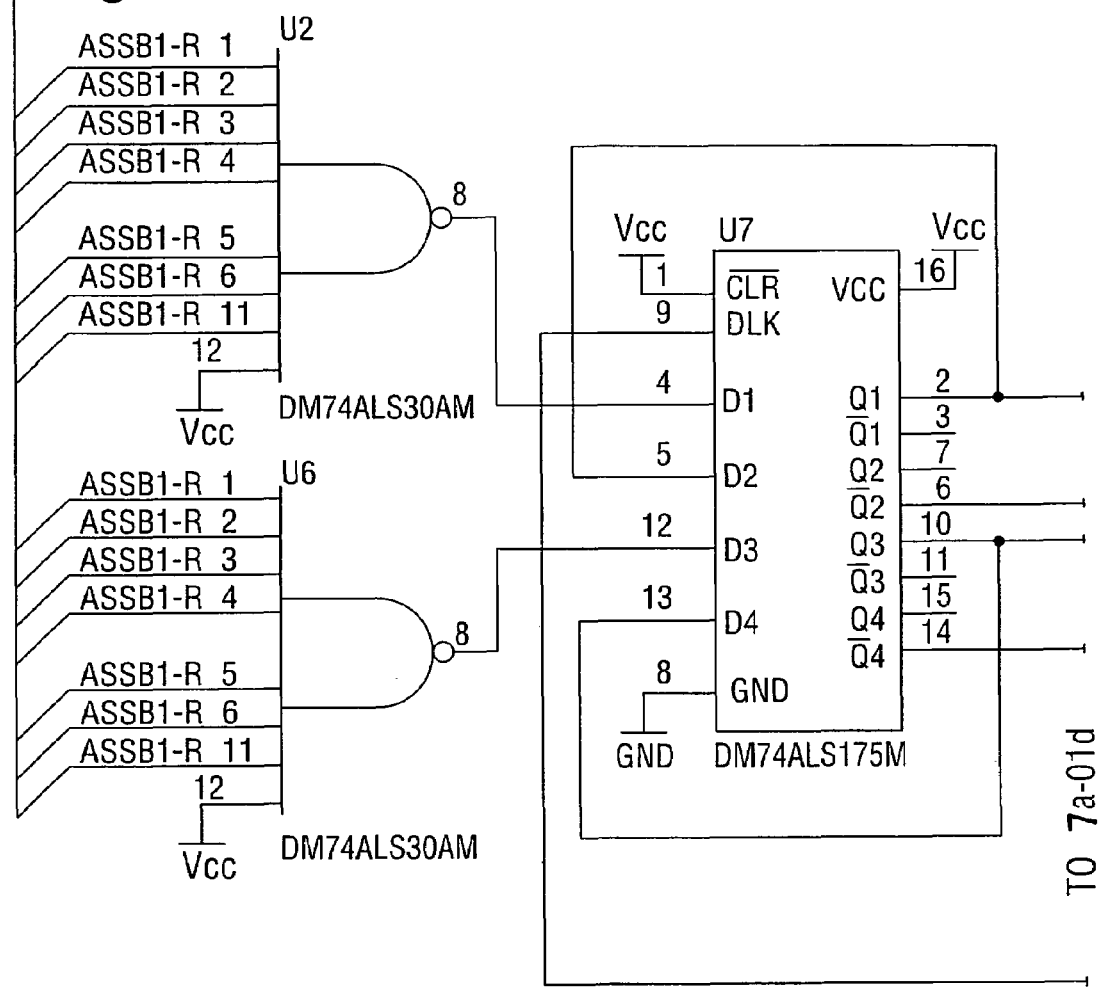
Figures 1D, 7A:
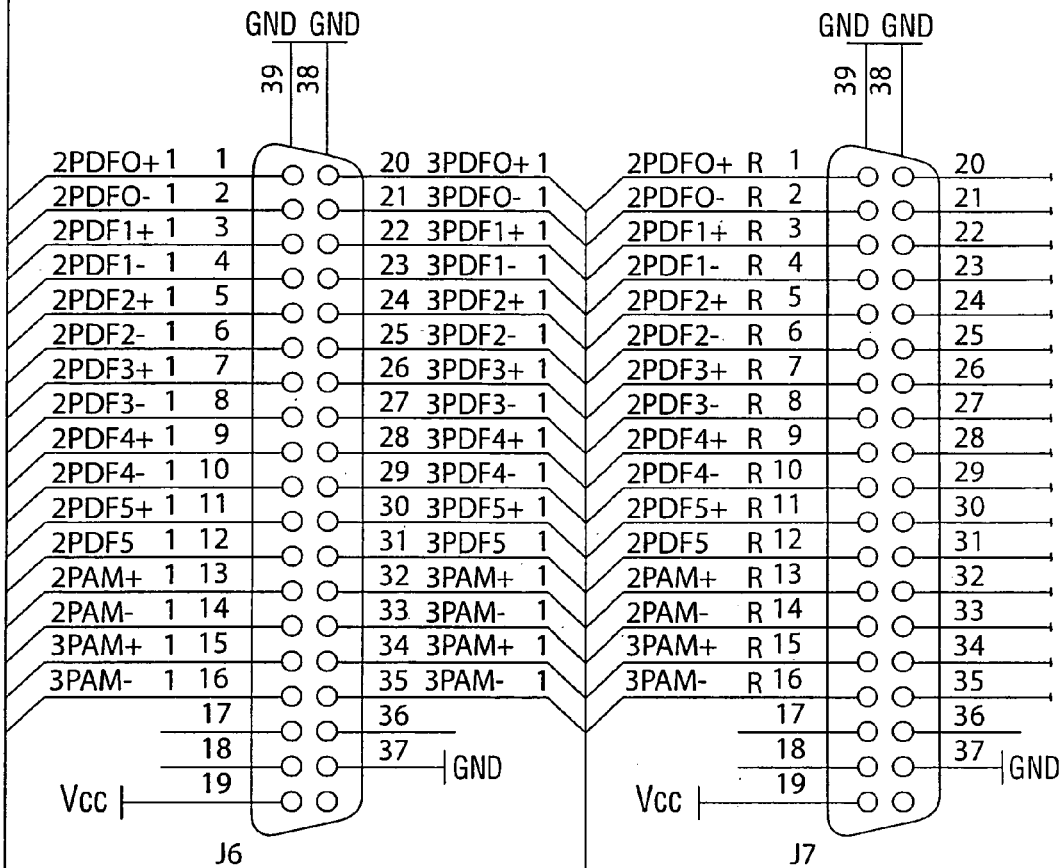
Figures 1E, 7A:
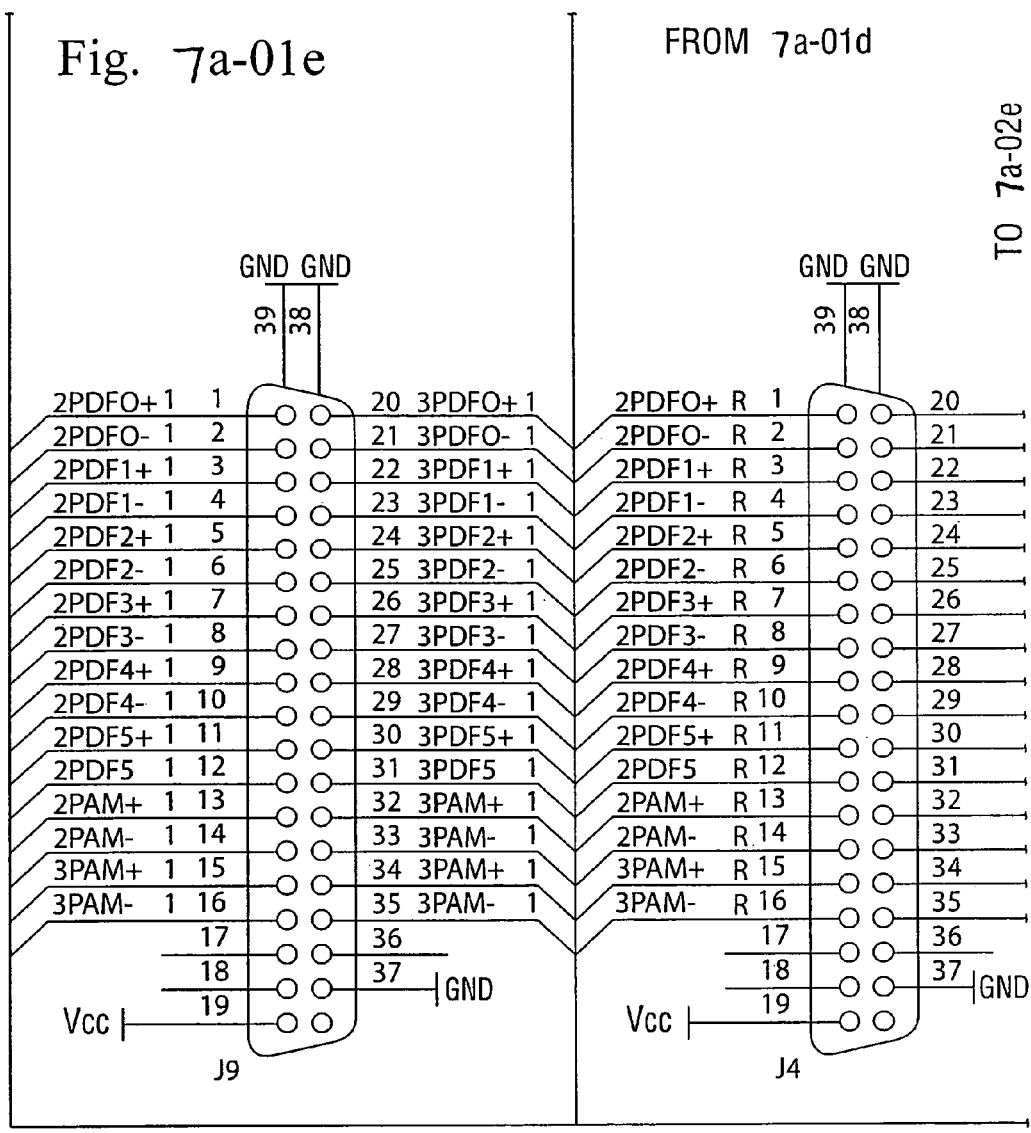
Figures 2A, 7A:
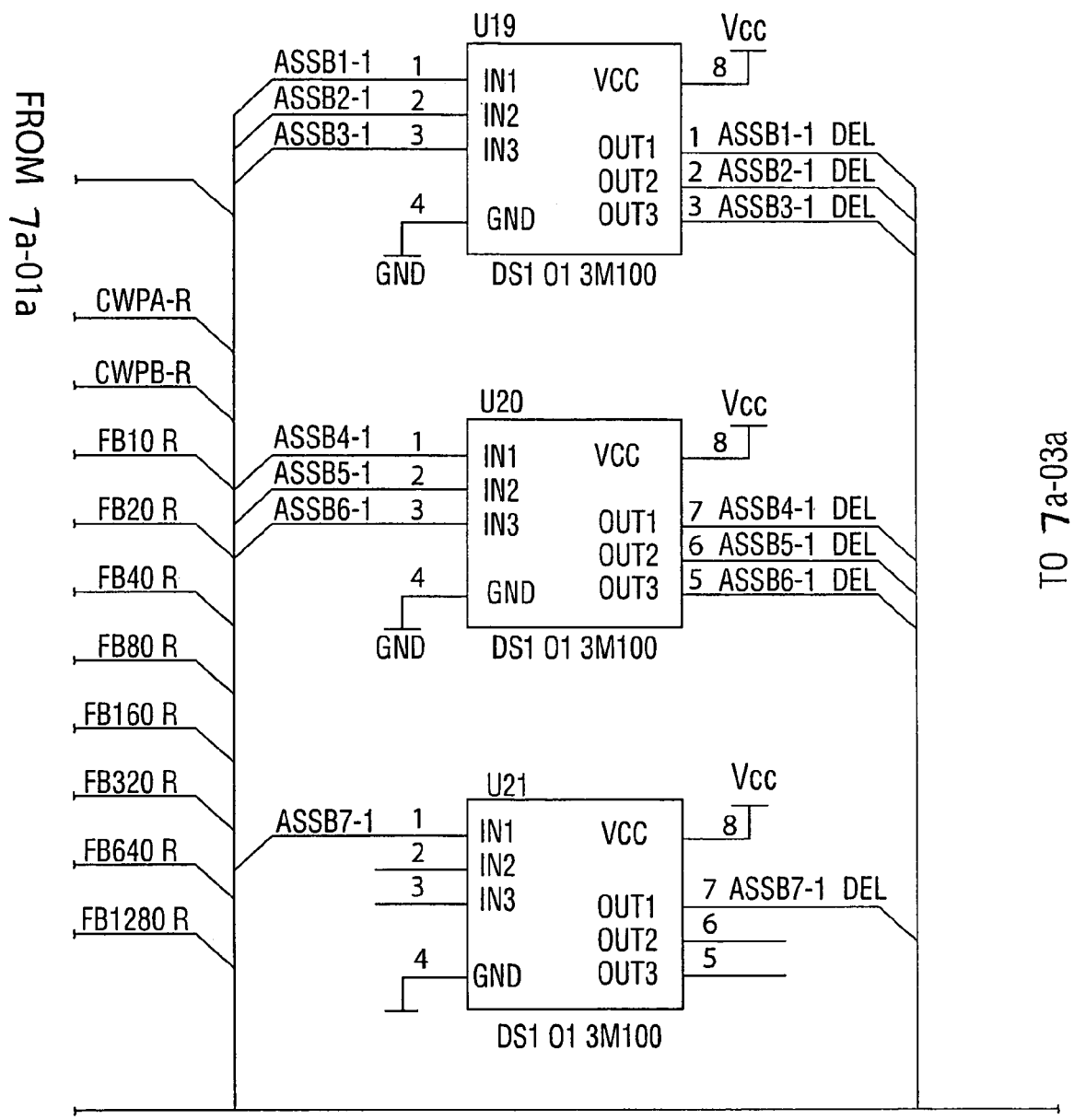
Figures 2C, 7A:
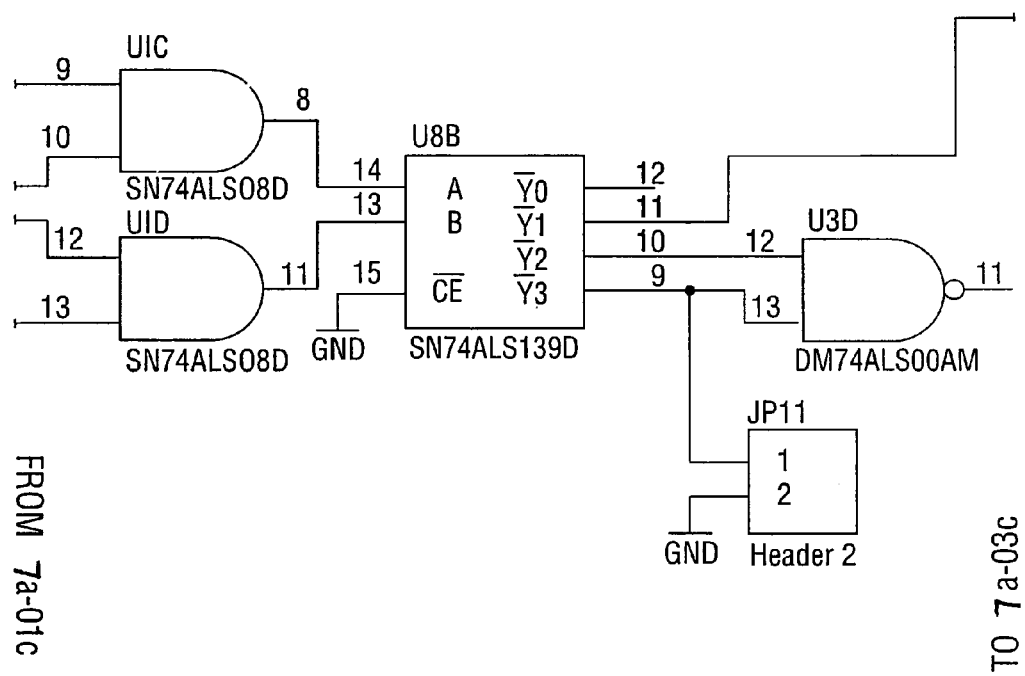
Figures 2E, 7A:
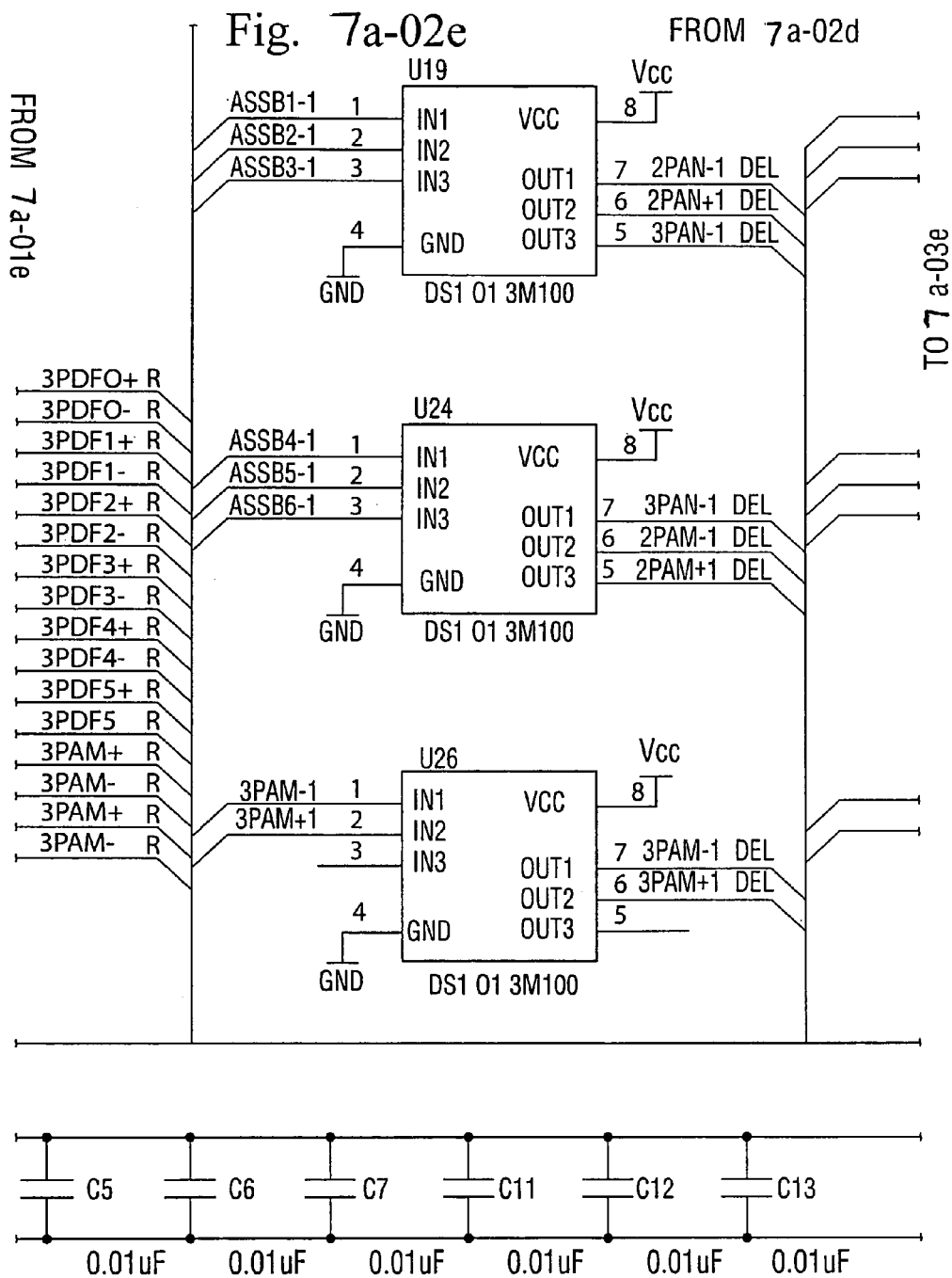
Figures 3A, 7A:
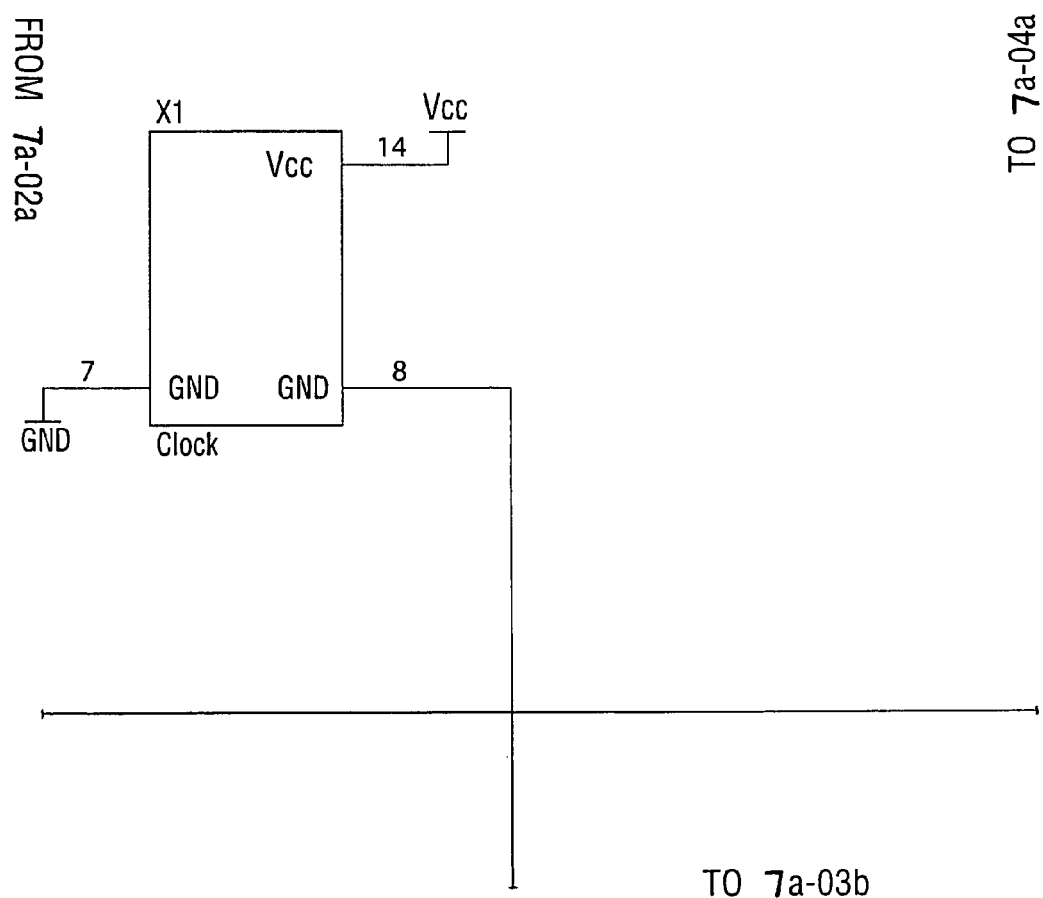
Figures 3B, 7A:
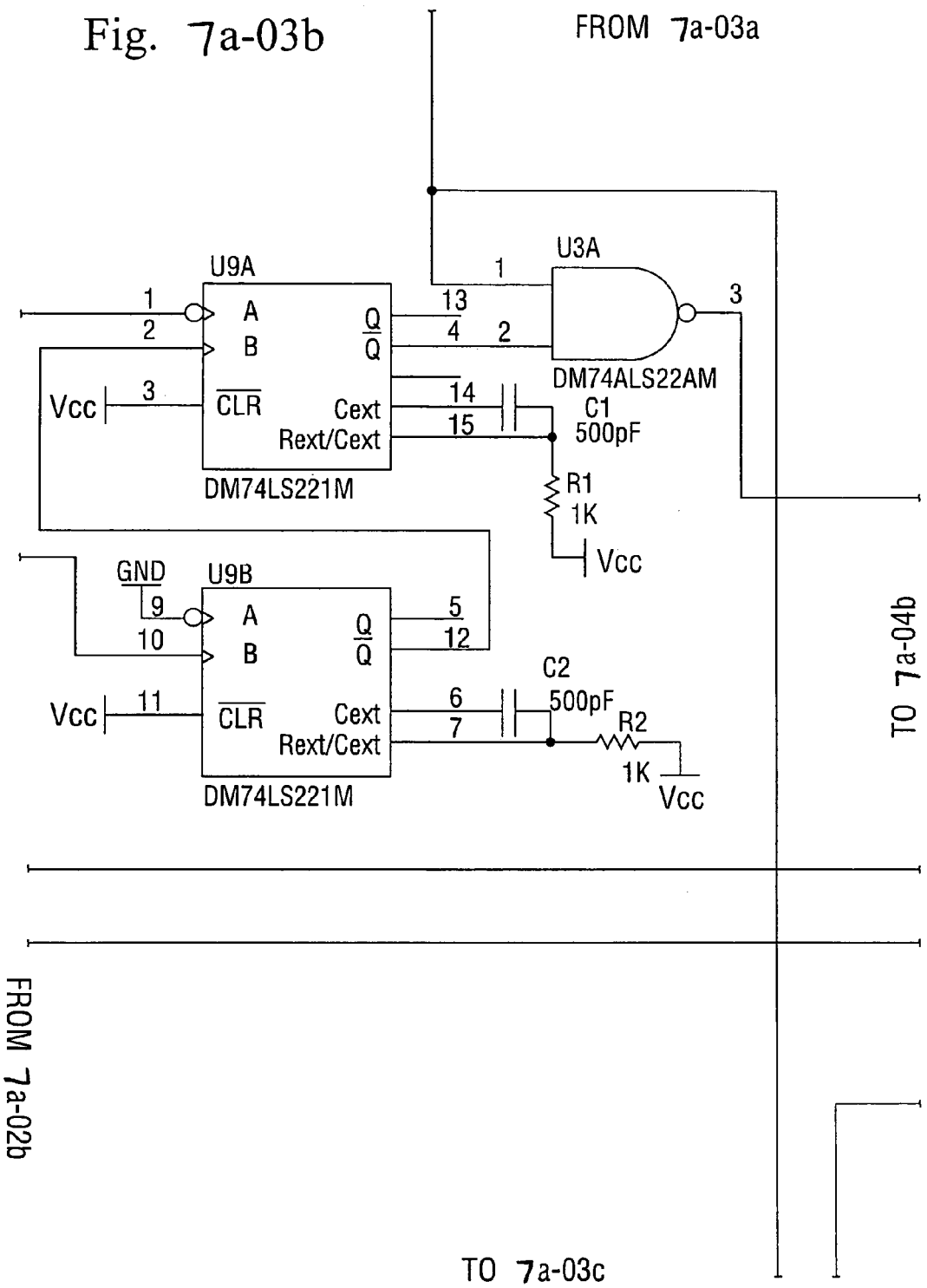
Figures 3C, 7A:
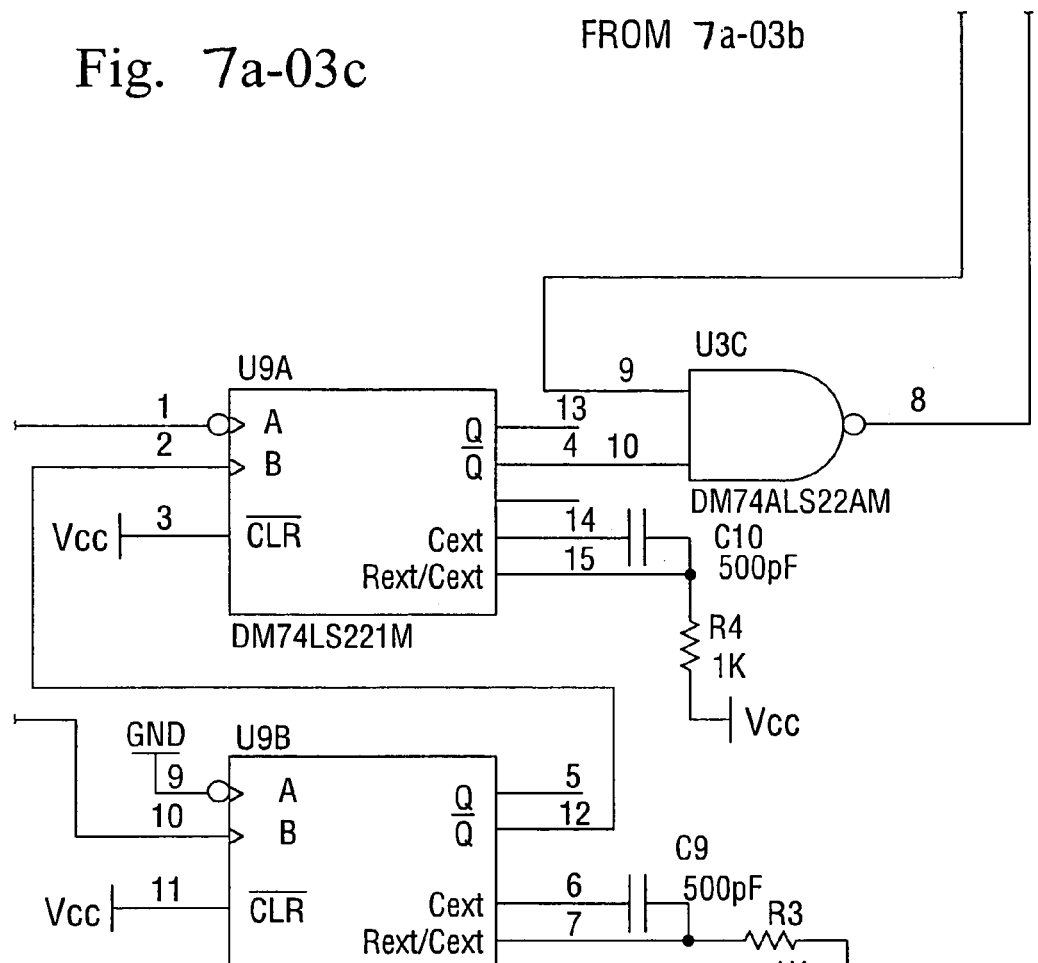
Figures 4A, 7A:
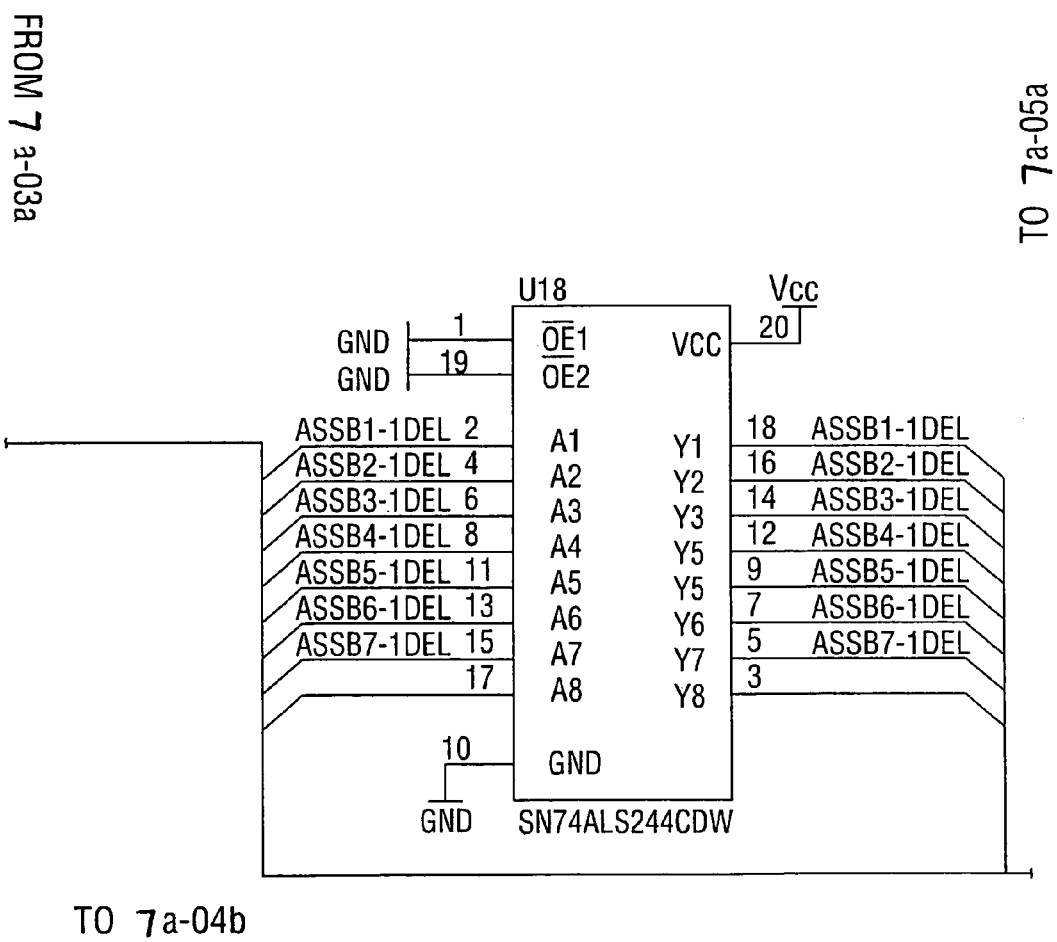
Figures 5A, 7A:
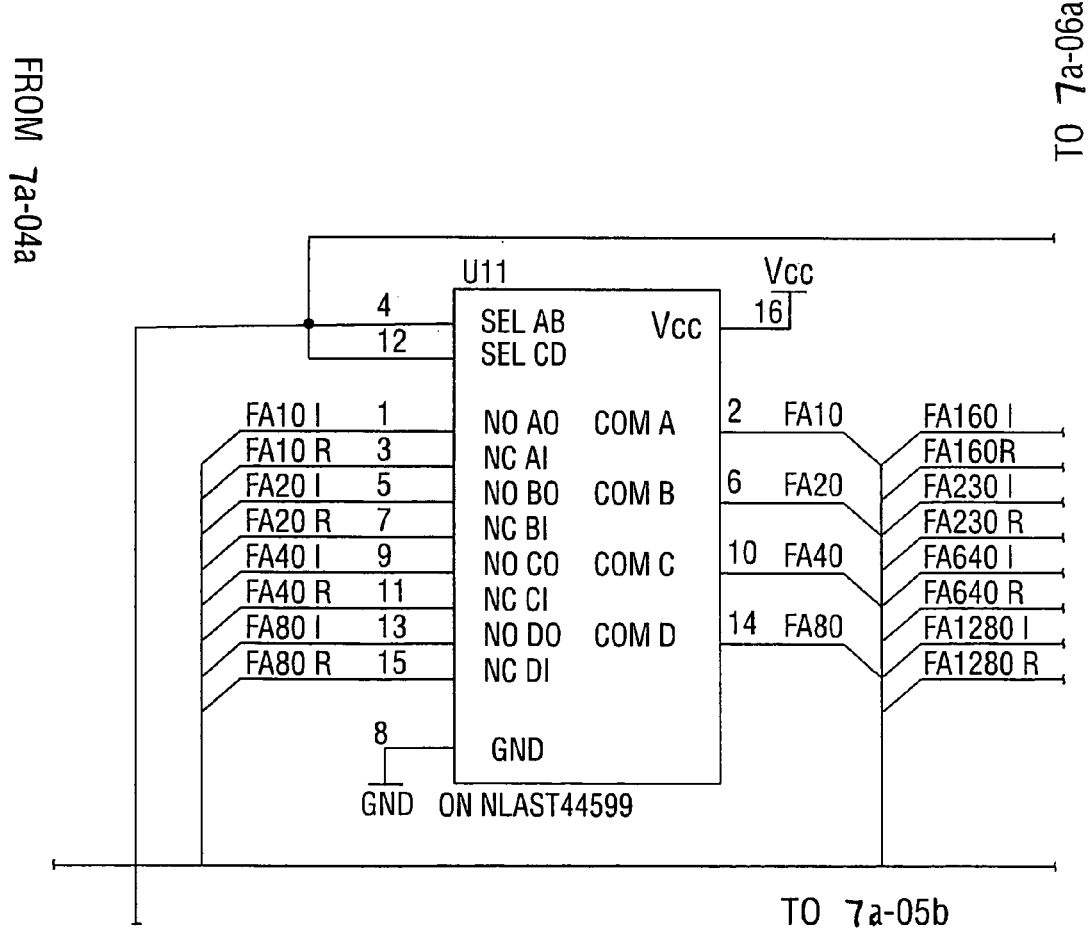
Figures 5B, 7A:
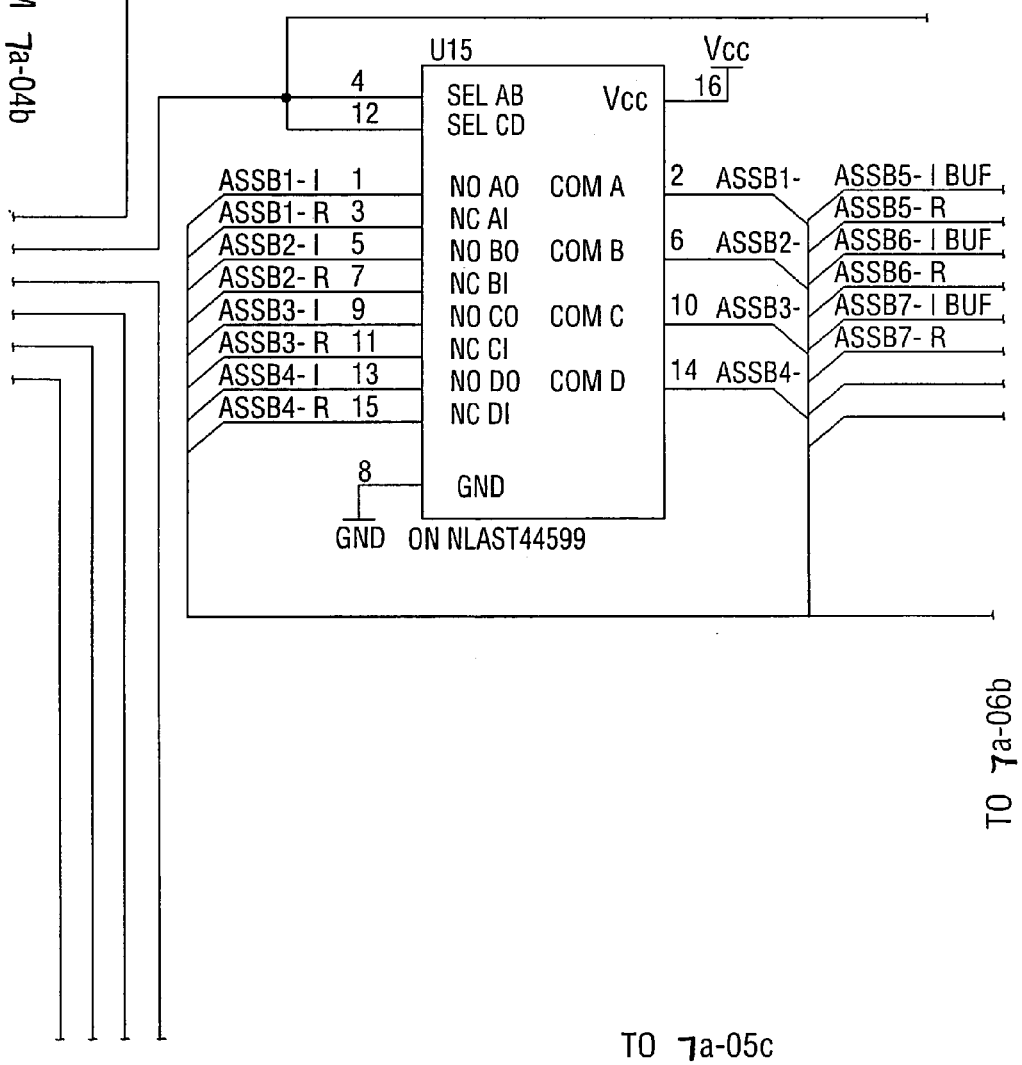
Figures 5D, 7A:
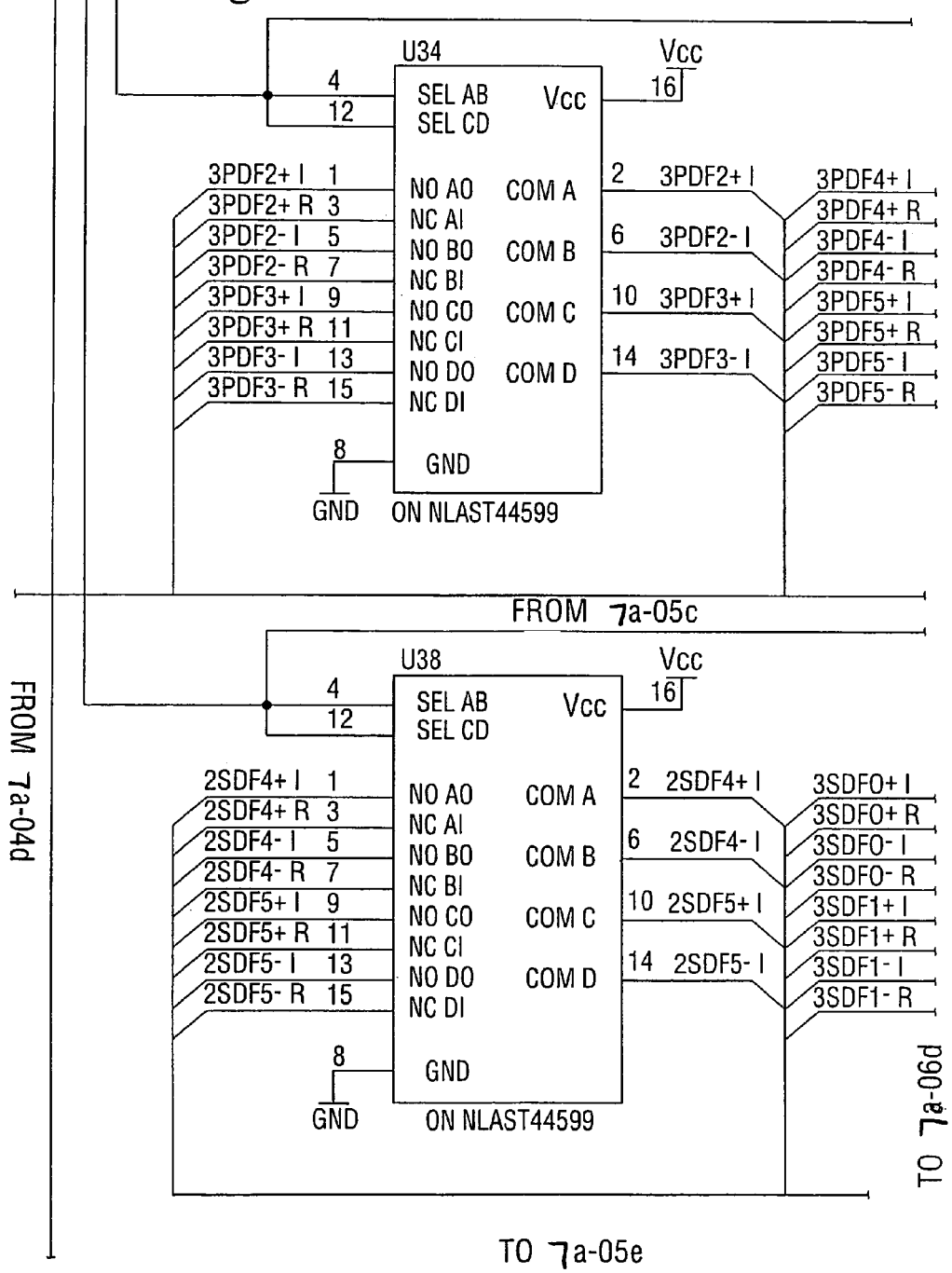
Figure 7A:
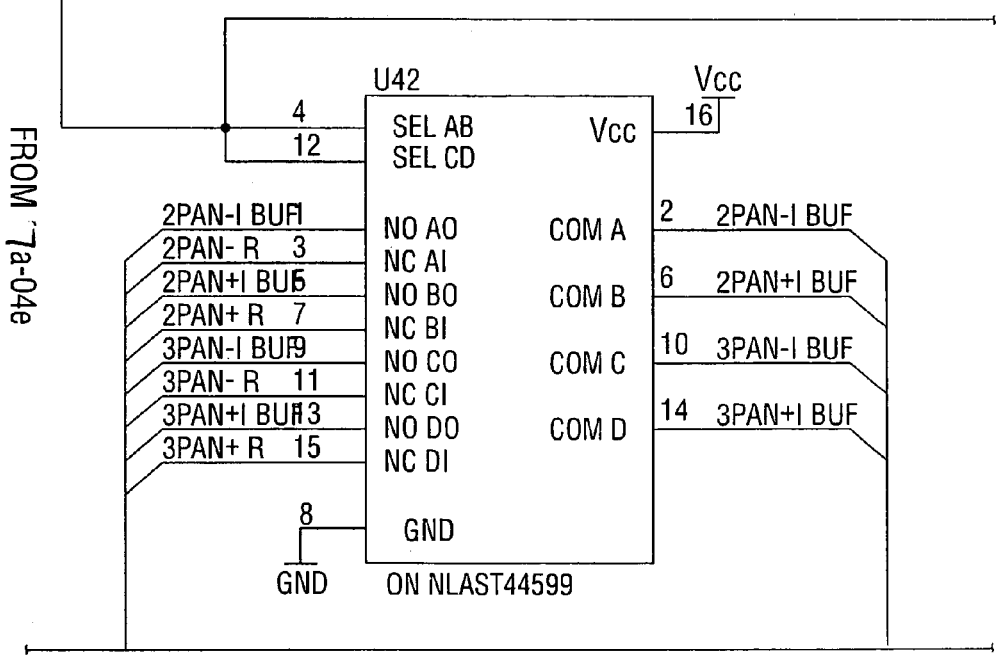
Figure 5E:
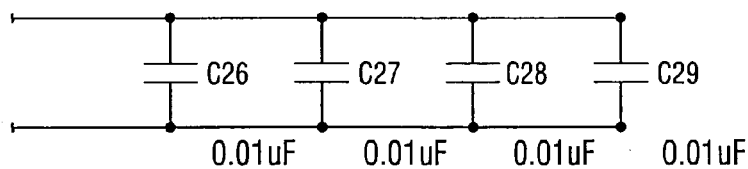
Figures 6A, 7A:
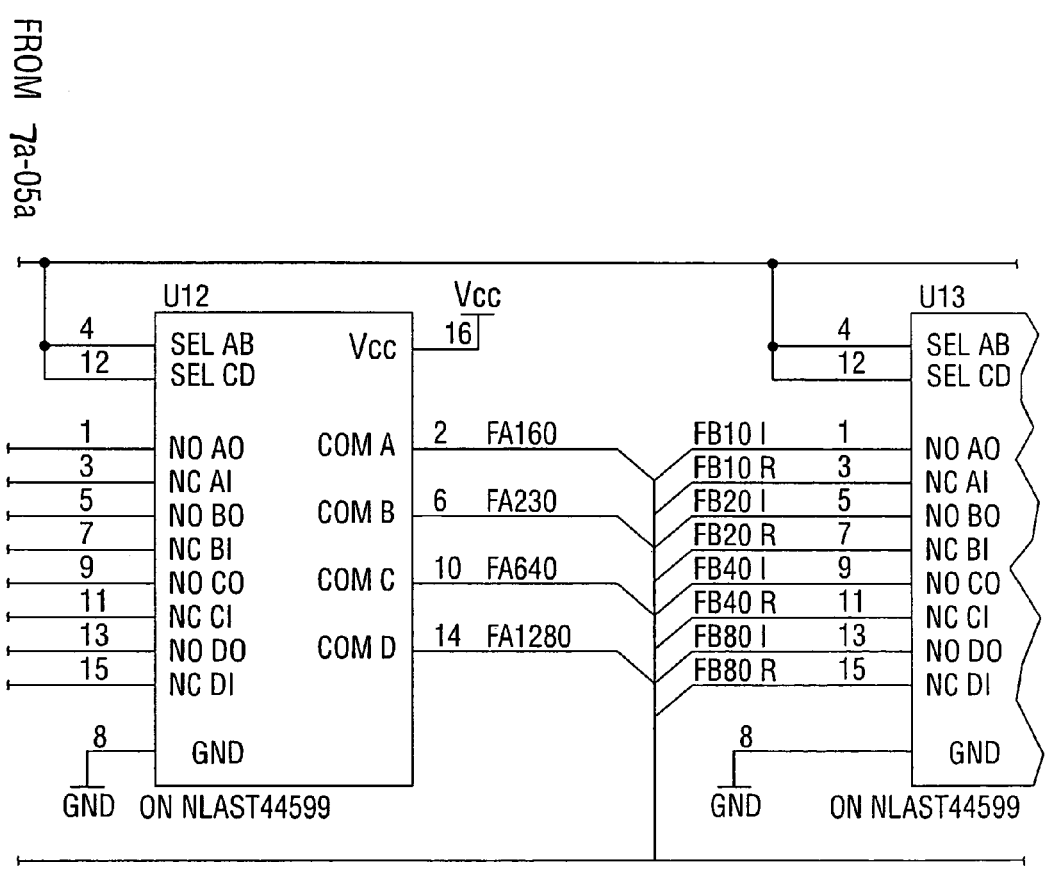
Figures 6C, 7A:
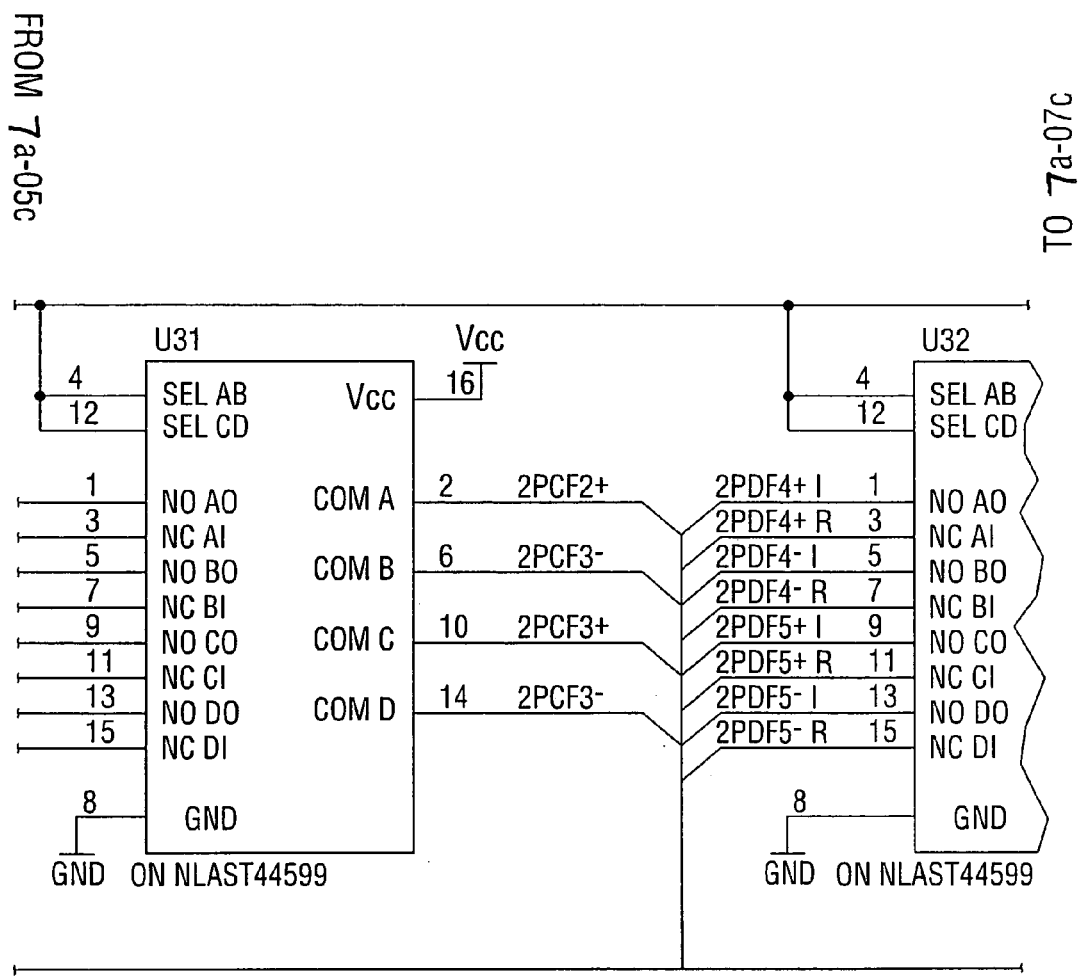
Figure 7A:
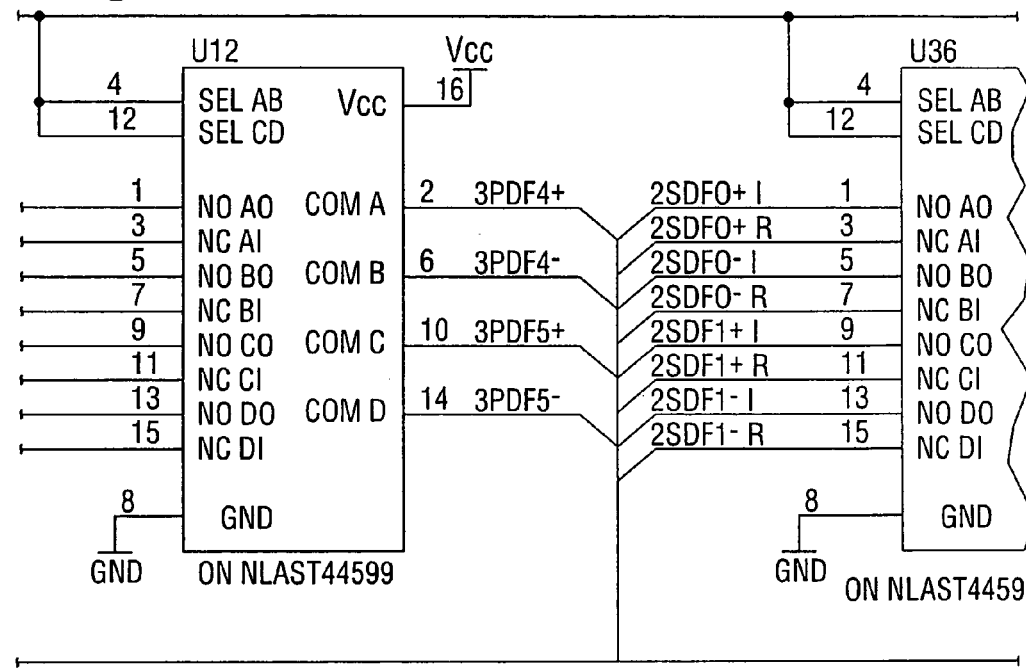
Figure 6D:
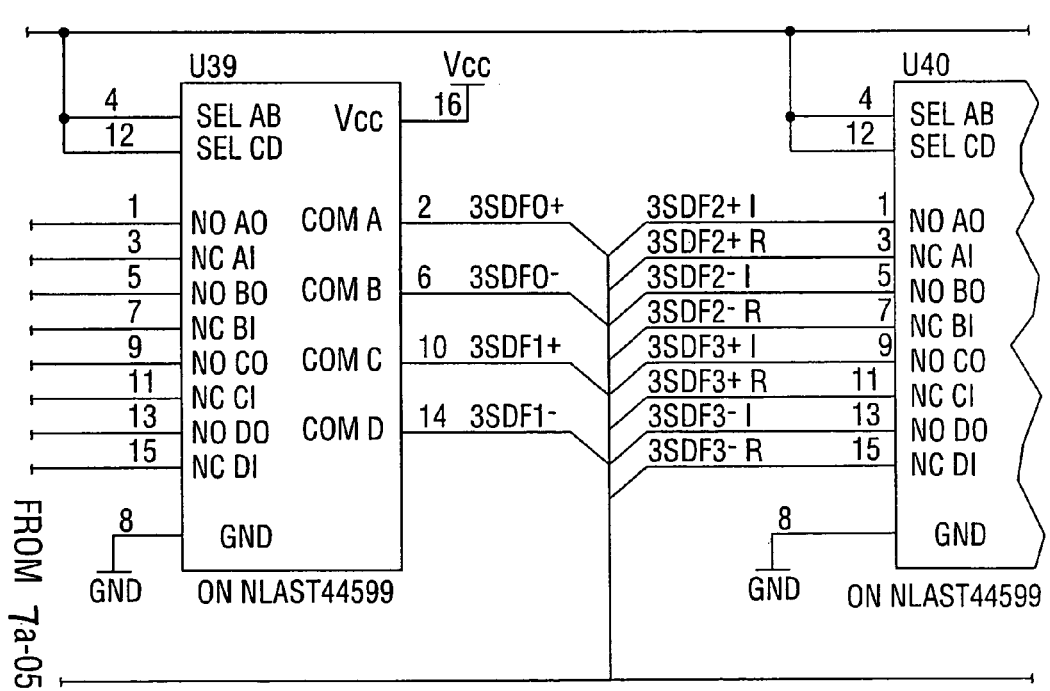
Figures 6E, 7A:
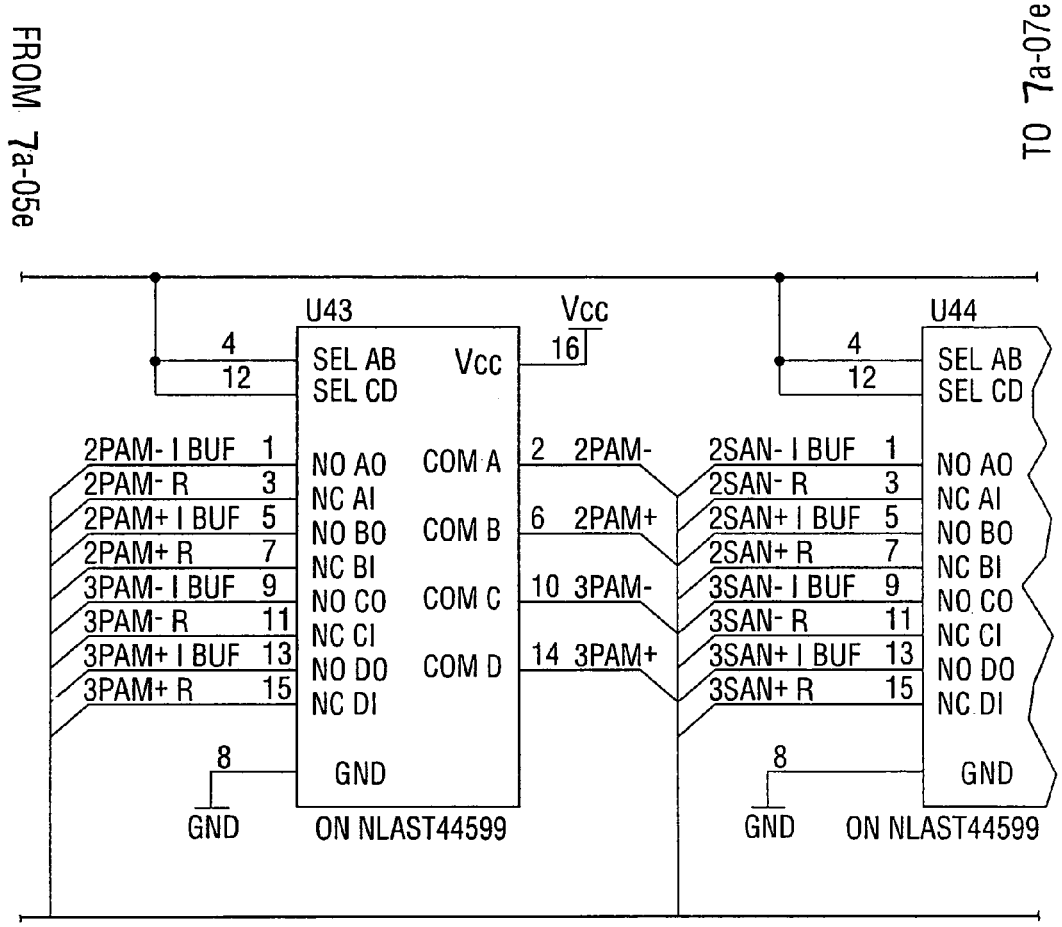
Figure 7A:
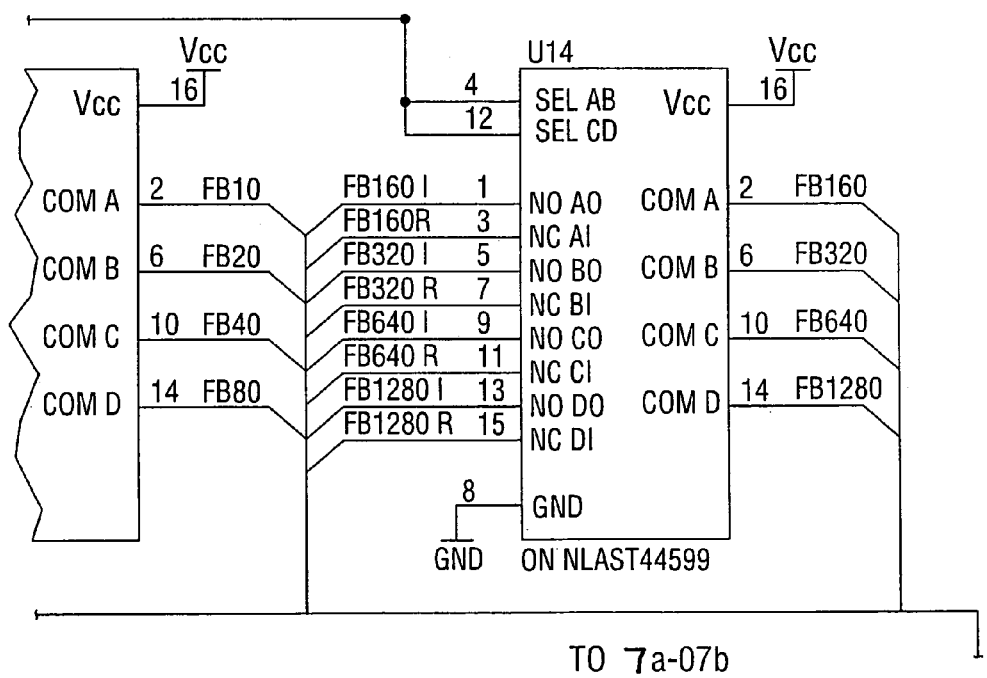
Figures 7A, 7B:
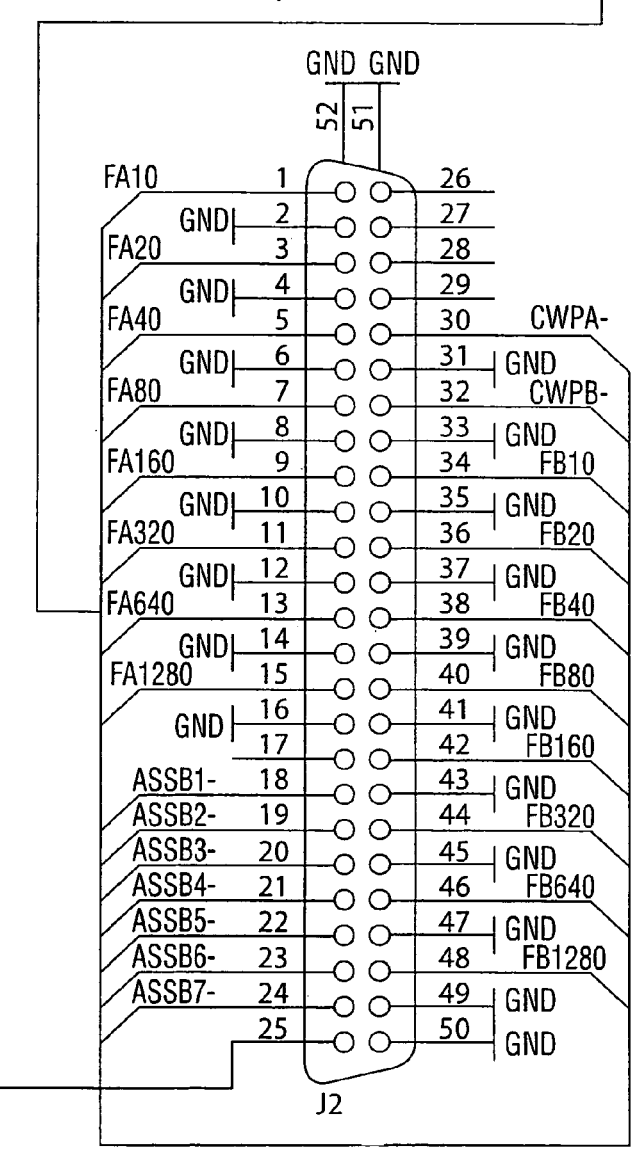
Figures 7A, 7B, 7C:
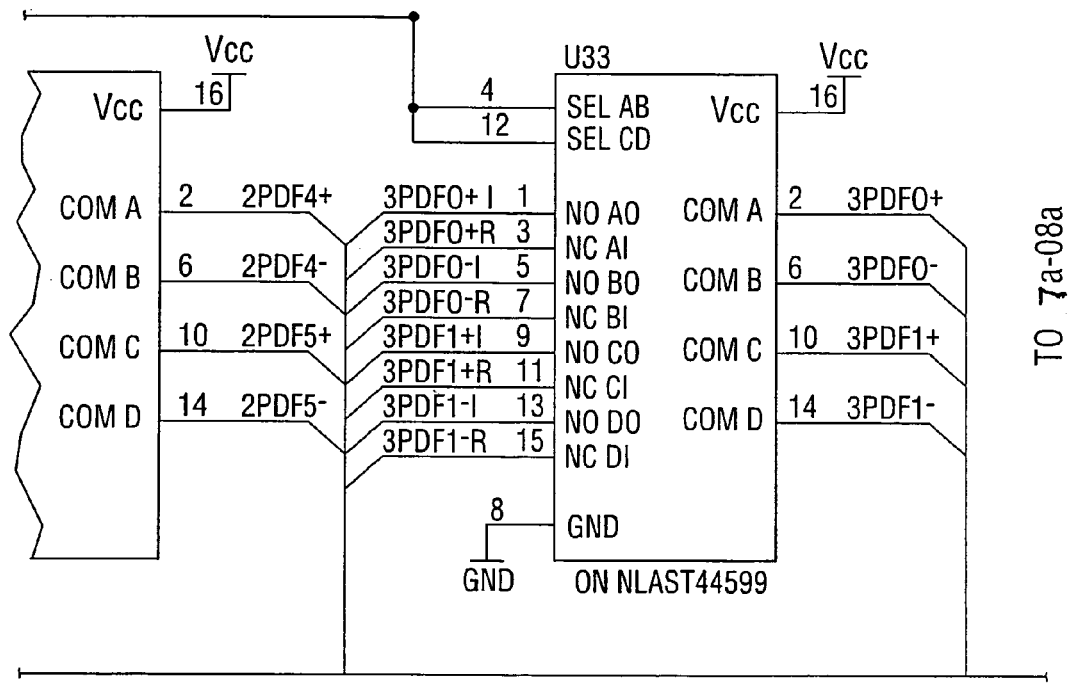
Figures 7A, 7B, 7C, 7D, 7E:
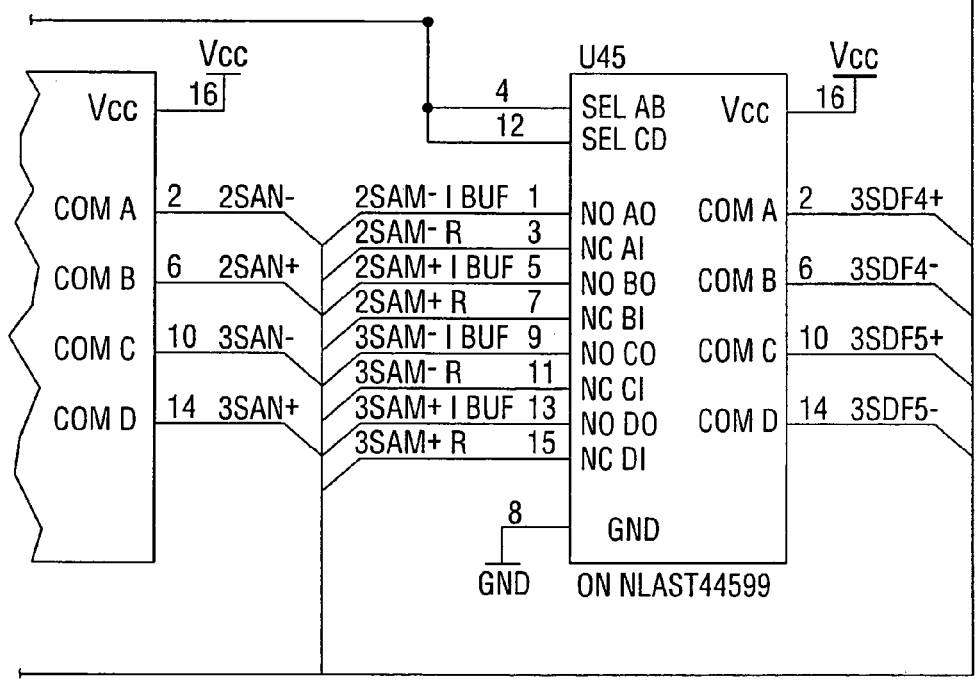
Figures 7, 7A, 8, 8A:
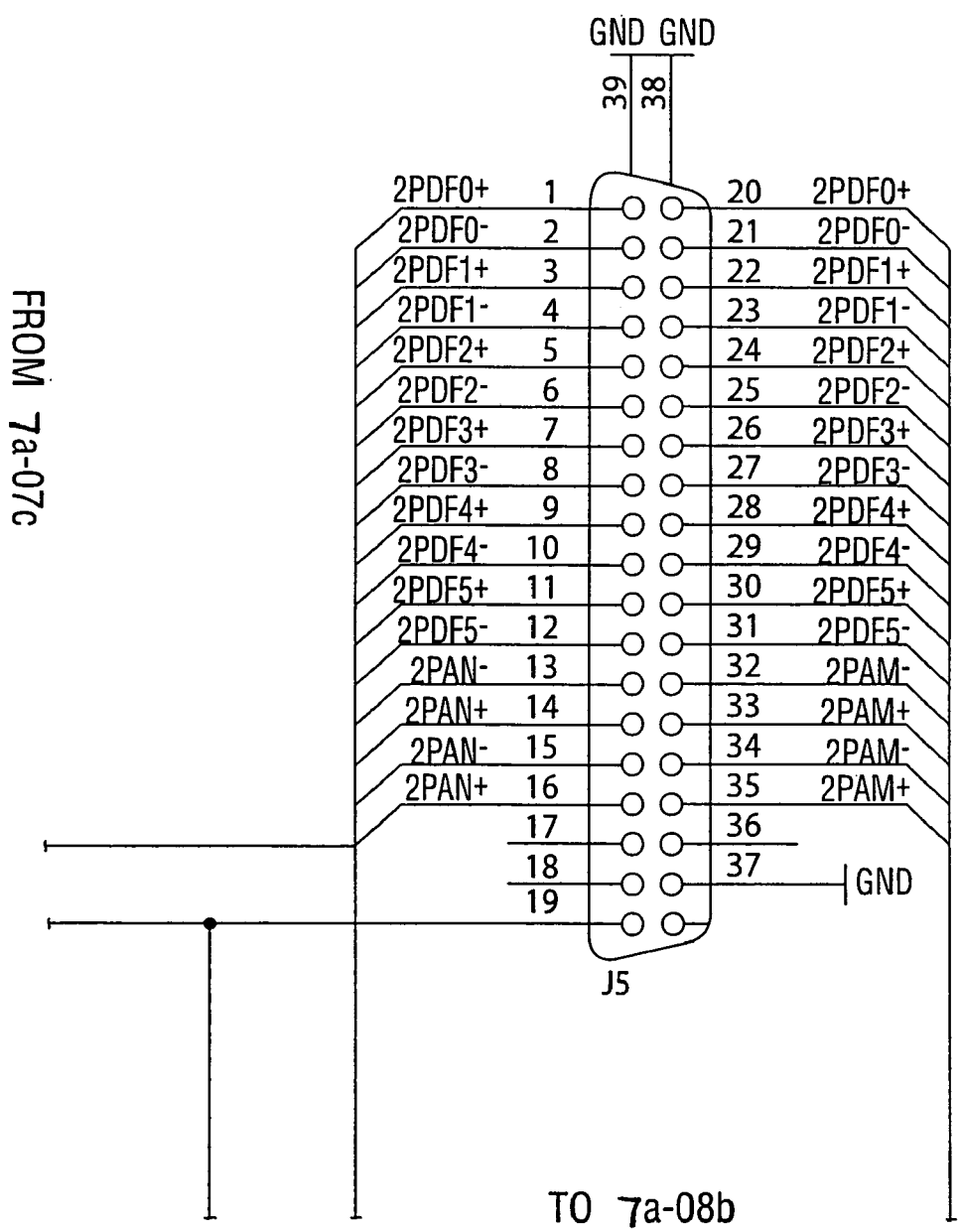
Figures 7, 7A, 8, 8B:
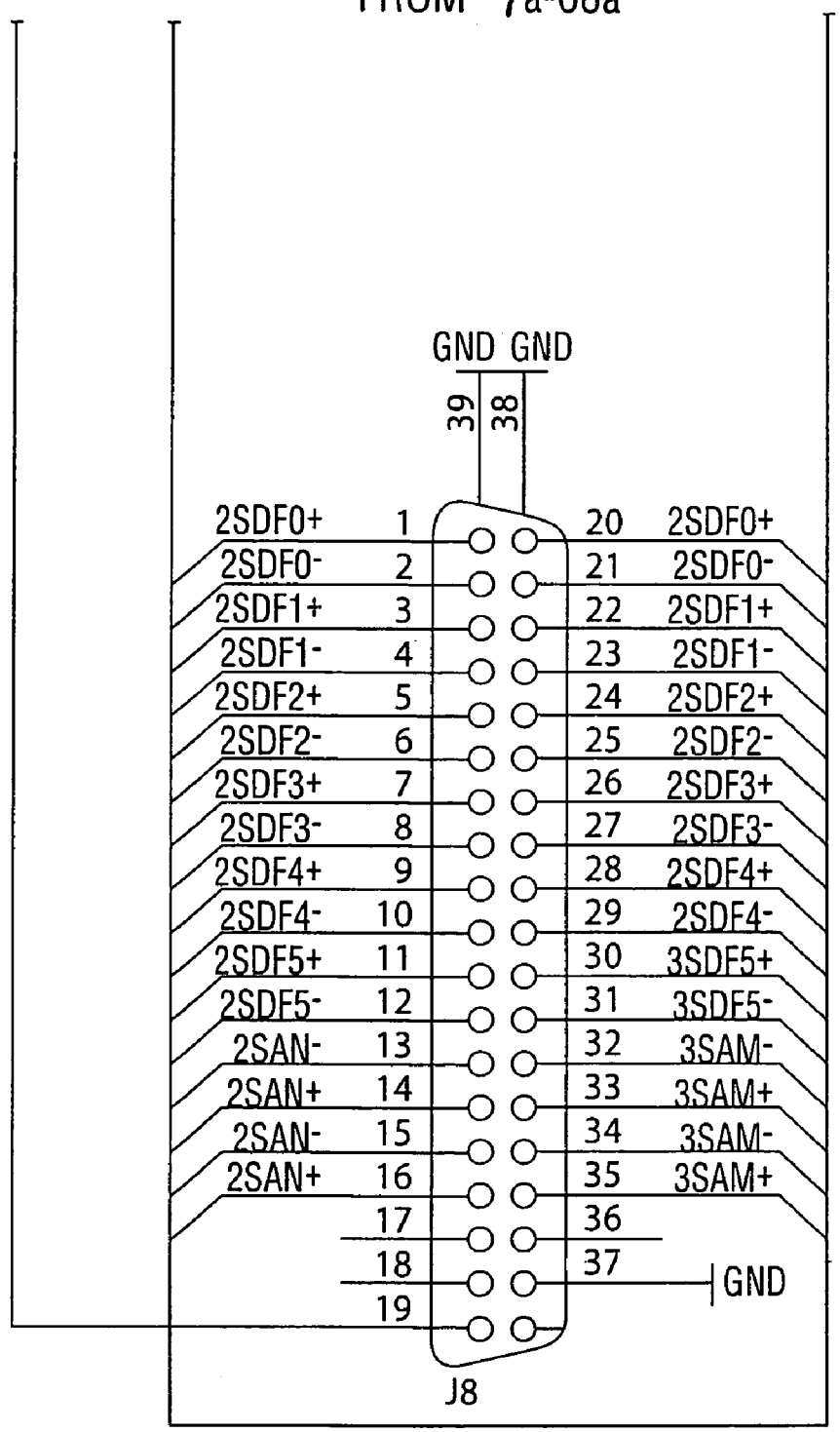
Figure 8:
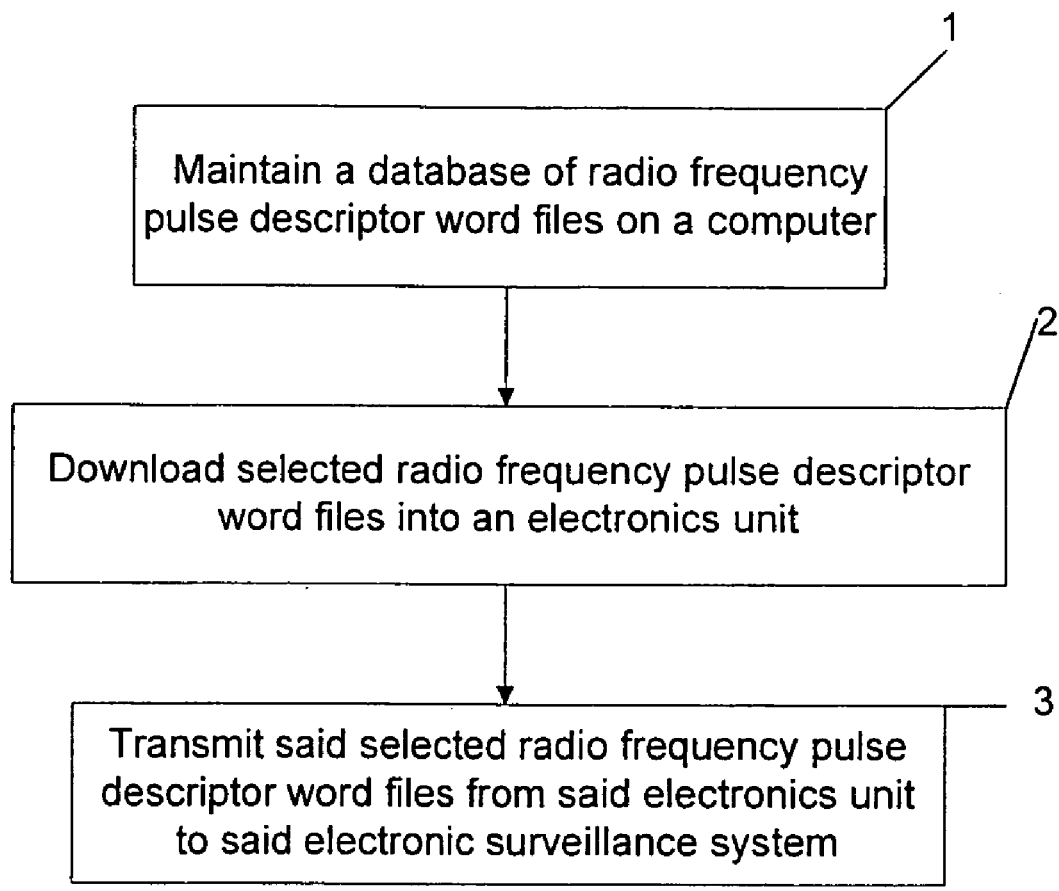

As illustrated in the flow chart of FIG. 8, the following method for inserting radio frequency pulse descriptor word data files into an electronic surveillance system in order to simulate a radio frequency signal environment is anticipated for use in conjunction with the device of present invention:

Step 1: Maintaining a database of radio frequency pulse descriptor word files on a computer (block 1). Step 1 is accomplished by establishing a database for pulse descriptor word data files, creating pulse descriptor word data files containing angle of arrival, amplitude, frequency, and time of arrival pulse descriptor word data and storing said files on said database (block 1.1). Radio frequency pulse descriptor word files may be created by: (1) downloading from a memory source pulse descriptor word data files containing actual angle of arrival, amplitude, frequency, and time of arrival pulse descriptor word data for radio frequency signals previously received by an electronic surveillance system and recorded and reformatting the downloaded file; (2) fabricating pulse descriptor word data; and, (3) combining previously stored pulse descriptor word data files (block 1.2).

Step 2: Downloading selected radio frequency pulse descriptor word files into and electronics unit integrated into an electronic surveillance system (block 2). Step 2 is accomplished by: (1) connecting the computer to an electronics unit and integrating the electronics unit into the electronic surveillance between the system receiver and pulse processor; (2) selecting a radio frequency pulse descriptor word data file for insertion into an electronic surveillance system and making a file read request; (3) transmitting pulse descriptor word data from the selected file in sections, as necessary depending on file size, from the computer to the electronics unit; and, (4) clocking in pulsed descriptor word data from the data file as it is received by the electronics unit so that it will appear to the electronic surveillance system to have been received in real time (block 2.1).

Step 3: Transmitting said selected radio frequency pulse descriptor word files from said electronics unit to said electronic surveillance system (block 3). Step 3 is accomplished by transmitting the pulse descriptor word data in a continuous stream on a first-in-first-out basis from the electronics unit to the pulse processor.

The above-described method and apparatus make it possible to insert previously recorded or fabricated digitized RF pulse data into an ES system (i.e. AN/SLQ-32(V)), including time of arrival, angle of arrival, amplitude, and frequency, to simulate an RF pulse environment. An analysis of either the ES system's response to the inserted data may be done to test the detection and identification capabilities of the ES system and to improve upon those detection and identification capabilities, or for use as an on-board troubleshooting tool for a ship's ES system. Additionally, an analysis of the crew's response to the simulated threat environment may be done to test and, if necessary, improve upon the crew's readiness.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

The invention claimed is:

1. In an electronic surveillance system of a type having antennas, a receiver for converting real radio frequency pulse signals into digitized radio frequency pulse descriptor word data and a pulse processor for filtering pulse descriptor word data, an apparatus that inserts continuous streams of supplied radio frequency pulse descriptor word data into the electronic surveillance system for the purpose of simulating a radio frequency pulse environment, said apparatus comprising:

an electronics unit configured for integration into the electronic surveillance system between the receiver and pulse processor for inserting supplied radio frequency pulse descriptor word data files into the pulse processor; and a computer including hardware for storing the pulse descriptor word data files and transmitting the pulse descriptor word data files to the electronics unit, and software for providing a graphical user interface to create pulse descriptor word data files, and for controlling the process by which said electronics unit inserts the pulse descriptor word data files into the pulse processor, wherein said computer is a standard personal computer including a hard drive, random access memory (RAM), a Digital Input/Output (DIO) card, a peripheral control interface (PCI) bus, an operating system, and at least one input/output connection for communication with said electronics unit and wherein said software comprises at least two databases for radio frequency pulse descriptor word data files including a first pulse descriptor word file database for storing real radio frequency pulse descriptor word data previously received by the electronic surveillance system, and a second pulse descriptor word file database for storing files created by reformatting data files from said first database into fabricated data files, whereby the fabricated files maintained in said second pulse descriptor word file database may be selected for transmission to said electronics unit and insertion into the electronic surveillance system.

2. The apparatus of claim 1, wherein said electronics unit is comprised of:

input/output connections for communication with the receiver, the pulse processor and the personal computer; and a plurality of pulse descriptor word data flow control buffers, including a first flow control buffer for frequency, angle, and amplitude pulse descriptor word data and a second flow control buffer for time of arrival pulse descriptor word data;

a plurality of data counters;

first-in-first-out control logic;

a data routing and control circuit;

a strobe generator and timer;

a plurality of output drivers; and a plurality of output buffers.

3. The apparatus of claim 2, wherein said personal computer is programmable to inhibit strobe generation on a pulse by pulse basis in the electronics unit to simulate receiver failures.

4. The apparatus of claim 2, wherein said electronics unit is further comprised of a switchboard for multiplexing both real radio frequency pulse descriptor word data and supplied radio frequency pulse descriptor word data thereby allowing both real and supplied radio frequency pulse descriptor word data to pass to the electronic surveillance system pulse processor for filtering.

5. A method for inserting radio frequency pulse descriptor word data files into an electronic surveillance system in order to simulate a radio frequency signal environment; said method comprising the steps of:

maintaining a database of radio frequency pulse descriptor word data files on a computer wherein said step of maintaining a database is comprised of the sub-steps of establishing a database for pulse descriptor word data files, creating pulse descriptor word data files containing angle of arrival, amplitude, frequency, and time of arrival pulse descriptor word data and storing the files on the database and wherein said sub-step of creating pulse descriptor word data files comprises downloading pulse descriptor word data files containing actual angle of arrival, amplitude, frequency, and time of arrival pulse descriptor word data for radio frequency signals previously received by the electronic surveillance system and recording and reformatting the downloaded file, fabricating pulse descriptor word data, and combining the fabricated pulse descriptor word data with previously stored pulse descriptor word data files;

downloading selected radio frequency pulse descriptor word data files into an electronics unit that is integrated into an electronic surveillance system; and transmitting the selected radio frequency pulse descriptor word data files from the electronics unit to the electronic surveillance system.

6. The method of claim 5, wherein said step of downloading selected radio frequency pulse descriptor word files further comprises of the sub-steps of:

connecting the computer to an electronics unit and integrating the electronics unit into the electronic surveillance between the system receiver and pulse processor;

selecting a pulse descriptor word data file for insertion into an electronic surveillance system and making a file read request;

transmitting pulse descriptor word data from the selected pulse descriptor word data file in sections, as necessary depending on file size, from the personal computer to the electronics unit; and clocking in said pulsed descriptor word data from the file as it is received by the electronics unit so that it will appear to the electronic surveillance system to have been received in real time.

7. The method of claim 6, where in said step of transmitting said selected radio frequency pulse descriptor word files from said electronics unit to said electronic surveillance system is further comprised of transmitting the pulse descriptor word data in a continuous stream on a first-in-first-out basis from the electronics unit to the pulse processor.

8. The method of claim 7, further comprising the step of multiplexing real pulse descriptor word data transmitted from the receiver to the electronics unit and the selected radio frequency pulse descriptor word files so that both may be transmitted to the pulse processor.

* * * * *